(12) United States Patent  (10) Patent No.: US 12,120,772 B2
Li et al.                   (45) Date of Patent:     Oct. 15, 2024

(54) NETWORK ACCESS CARD SWITCHING METHOD AND ELECTRONIC DEVICE

(71) Applicant: Huawei Technologies Co., Ltd., Shenzhen (CN)

(72) Inventors: Yuanfeng Li, Shanghai (CN); Bin Huang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 499 days.

(21) Appl. No.: 17/438,647

(22) PCT Filed: Mar. 19, 2020

(86) PCT No.: PCT/CN2020/080099
§ 371 (c)(1),
(2) Date: Sep. 13, 2021

(87) PCT Pub. No.: WO2020/192537
PCT Pub. Date: Oct. 1, 2020

(65) Prior Publication Data
US 2022/0191682 A1    Jun. 16, 2022

(30) Foreign Application Priority Data
Mar. 26, 2019 (CN) .......................... 201910233571.2

(51) Int. Cl.
*H04W 8/20* (2009.01)
*H04W 36/00* (2009.01)
(Continued)

(52) U.S. Cl.
CPC ........ *H04W 8/205* (2013.01); *H04W 36/0011* (2013.01); *H04W 36/0055* (2013.01);
(Continued)

(58) Field of Classification Search
None
See application file for complete search history.

(56) References Cited

U.S. PATENT DOCUMENTS 9,648,525 B2    5/2017  Ponukumati et al.
2002/0154362 A1* 10/2002 Oki .................. H04B 10/50
                                                      385/92

(Continued)

FOREIGN PATENT DOCUMENTS

CN    103024779 A    4/2013
CN    103281687 A    9/2013
(Continued)

OTHER PUBLICATIONS

Huawei Club, "Smart Switching Network Adapter", published Mar. 19, 2019 and submitted as Prior Art in the IDS by the Applicant in the IDS dated May 13, 2022 (Year: 2019).*

(Continued)

*Primary Examiner* — Jamaal Henson
(74) *Attorney, Agent, or Firm* — Conley Rose, P.C.

(57) ABSTRACT

A network access card switching method is performed by an electronic device on which a first network access card and a second network access card are installed. The first network access card is a default network access card of the electronic device. The network access card switching method includes determining that a user enables an intelligent network access card switching function, activating, by the electronic device, the first network access card, transmitting the data service using the first network access card, monitoring a network state of the first network access card in real time, and when determining that the network state of the first network access card meets a first preset condition, disconnecting the data service transmitted using the first network access card, (Continued)

activating the second network access card, and transmitting the data service by using the second network access card.

16 Claims, 45 Drawing Sheets

(51) Int. Cl.
*H04W 36/14* (2009.01)
*H04W 36/30* (2009.01)
*H04W 88/06* (2009.01)

(52) U.S. Cl.
CPC ........... *H04W 36/14* (2013.01); *H04W 36/30* (2013.01); *H04W 88/06* (2013.01)

(56) References Cited

U.S. PATENT DOCUMENTS

| | | | | |
|---|---|---|---|---|
| 2002/0154632 | A1* | 10/2002 | Wang | H04W 48/18 370/466 |
| 2007/0184858 | A1* | 8/2007 | Landschaft | H04W 8/183 709/206 |
| 2008/0020773 | A1* | 1/2008 | Black | H04W 8/183 455/445 |
| 2011/0269503 | A1* | 11/2011 | Park | H04W 8/183 455/552.1 |
| 2011/0306318 | A1* | 12/2011 | Rodgers | H04L 67/51 455/410 |
| 2012/0135715 | A1* | 5/2012 | Kang | H04W 4/16 455/418 |
| 2013/0053010 | A1* | 2/2013 | Kim | H04W 48/18 455/418 |
| 2013/0303139 | A1* | 11/2013 | Helfre | H04W 52/028 455/417 |
| 2014/0080485 | A1* | 3/2014 | Park | H04W 36/14 455/436 |
| 2015/0237497 | A1* | 8/2015 | Chen | H04W 8/183 455/558 |
| 2015/0304506 | A1 | 10/2015 | Zhu et al. | |
| 2015/0334761 | A1* | 11/2015 | Liao | H04W 76/15 455/552.1 |
| 2016/0044178 | A1 | 2/2016 | Narayanaswamy et al. | |
| 2017/0070877 | A1* | 3/2017 | Shi | H04W 8/183 |
| 2017/0127217 | A1* | 5/2017 | Miao | H04W 76/15 |
| 2018/0027406 | A1* | 1/2018 | Murray | H04M 1/724 455/558 |
| 2018/0191913 | A1* | 7/2018 | Zhang | H04M 15/88 |

FOREIGN PATENT DOCUMENTS

| | | | |
|---|---|---|---|
| CN | 104219653 | A | 12/2014 |
| CN | 105813147 | A | 7/2016 |
| CN | 106330231 | A * | 1/2017 |
| CN | 106341856 | A | 1/2017 |
| CN | 107295594 | A | 10/2017 |
| CN | 107465821 | A | 12/2017 |
| CN | 108366403 | A | 8/2018 |
| CN | 108668324 | A | 10/2018 |
| CN | 108696859 | A | 10/2018 |
| CN | 110072263 | A | 7/2019 |
| EP | 1503606 | A1 | 2/2005 |
| EP | 2757835 | A1 | 7/2014 |
| WO | 2015179069 | A1 | 11/2015 |

OTHER PUBLICATIONS

Huawei Club, "Smart Switching Network Adapter", published Mar. 19, 2019 and submitted as Prior Art in the IDS by the Applicant (Year: 2019).*

Blakegripling: "A Lenovo smartphone with two SIM card slots," Dual Sim, Wikipedia, Mar. 11, 2019, 6 pages.

Paul Sawers, "Google confirms Android 5.1 is rolling out today, will support multi-SIM devices and HD calls," VentureBeat, Mar. 9, 2015, XP093010646, 3 pages.

Huawei Club, "Smart Switching Network Adapter," published on Mar. 19, 2019, from Huawei Mate 20, with an English Translation Version, total 6 pages.

* cited by examiner

1600

1601 Detect an operation that a user enables intelligent network access card switching 1602 In response to the operation that the user enables intelligent network access card switching, remind the user to set a package limit of a card 2

1603 Detect that the user does not set the package limit of the card 2

1604 When one or more parameters of a card 1 meet a first preset condition, the electronic device disconnects a data service from the card 1, activates the card 2, and transmits the data service by using the card 2

1605 When traffic used through the card 2 reaches a second threshold, remind the user about network access card switching from the card 2 back to the card 1, or remind the user to set the package limit of the card 2

FIG. 16

NETWORK ACCESS CARD SWITCHING METHOD AND ELECTRONIC DEVICE

CROSS-REFERENCE TO RELATED APPLICATIONS

This application is a National Stage of International Patent Application No. PCT/CN2020/080099 filed on Mar. 19, 2020, which claims priority to Chinese Patent Application No. 201910233571.2 filed on Mar. 26, 2019. All of the aforementioned patent applications are hereby incorporated by reference in their entireties.

TECHNICAL FIELD

This application relates to the field of electronic devices, and more specifically, to a network access card switching method and an electronic device.

BACKGROUND

Currently, dual-card smartphones are widely used in China, Africa, and some regions in Europe. A fixed secondary card in a dual-card smartphone, after an upgrade, can further support 4G now, no longer only 2G and 3G as before. Only one card in the dual-card smartphone can be used by a user to access a network at a time. When the user wants to use the other card to access the network, the user needs to select the other card through menu setting. This may cause a complex operation and result in poor user experience.

SUMMARY

This application provides a network access card switching method and an electronic device, to help improve operation efficiency of a user and intelligence of an electronic device, and help improve user experience.

According to a first aspect, a network access card switching method is provided. The method is applied to an electronic device. At least a first network access card and a second network access card are installed on the electronic device, and the first network access card is a default mobile data card of the electronic device. The method includes: The electronic device activates the first network access card. The electronic device detects a first operation of a user, where the first operation is an operation that the user enables an automatic network access card switching function. In response to the first operation, the electronic device enables the automatic network access card switching function. The electronic device transmits a data service by using the first network access card. The electronic device determines that a network state of the first network access card meets a first preset condition. In response to the case that the network state of the first network access card meets the first preset condition, the electronic device automatically disconnects the data service transmitted by using the first network access card, activates the second network access card, and transmits the data service by using the second network access card.

According to the network access card switching method in this embodiment of this application, when the network state of the first network access card meets the first preset condition, the electronic device may automatically perform network access card switching from the first network access card to the second network access card. This can fully utilize an advantage of a plurality of cards to ensure continuity of a communications service, avoid a cumbersome manual switching operation of the user, and help improve user experience.

In some possible implementations, when the electronic device determines that the network state of the first network access card meets the first preset condition and a network state of the second network access card meets a preset condition, the electronic device automatically disconnects the data service transmitted by using the first network access card, activates the second network access card, and transmits the data service by using the second network access card.

According to the network access card switching method in this embodiment of this application, when the network state of the first network access card and the network state of the second network access card respectively meet corresponding preset conditions, the electronic device may automatically perform network access card switching from the first network access card to the second network access card. This can improve continuity of the communications service after the electronic device performs network access card switching, avoid the cumbersome manual switching operation of the user, and help improve user experience.

With reference to the first aspect, in some possible implementations of the first aspect, the method further includes: in response to the case that the first network access card meets the first preset condition, the electronic device displays first prompt information, where the first prompt information is used to remind the user that the second network access card is being used.

According to the network access card switching method in this embodiment of this application, when the electronic device automatically performs network access card switching from the first network access card to the second network access card, the electronic device may remind the user that the second network access card is being used. This helps the user learn of, in time, the network access card that is being used.

With reference to the first aspect, in some possible implementations of the first aspect, the method further includes: The electronic device detects a second operation of the user, where the second operation is an operation that the user sets a mobile data limit of the second network access card. In response to the second operation, the electronic device determines the mobile data limit of the second network access card.

According to the network access card switching method in this embodiment of this application, the user sets the mobile data limit of the second network access card in advance, so that the electronic device can learn of the mobile data limit of the second network access card in time, and the electronic device can remind the user in time when mobile data consumed through the second network access card reaches a specific value. This helps avoid generating extra fees.

In some possible implementations, the electronic device may parse an SMS message that is sent by an operator to which the second network access card belongs and that is received by the user, and determine the mobile data limit of the second network access card.

In some possible implementations, the electronic device may exchange information with a network of the operator to which the second network access card belongs, to determine the mobile data limit of the second network access card.

With reference to the first aspect, in some possible implementations of the first aspect, after the electronic device activates the second network access card and transmits the data service by using the second network access card, the method further includes: The electronic device displays second prompt information when determining that mobile data consumed through the second network access card is equal to a first threshold, where the second prompt information is used to remind the user about network access card switching, or remind the user that the mobile data consumed through the second network access card reaches the first threshold.

According to the network access card switching method in this embodiment of this application, when the mobile data consumed by the electronic device through the second network access card reaches a specific value, the electronic device may remind the user in time about the mobile data consumed through the second network access card. This helps avoid generating extra fees.

In some possible implementations, when determining that the mobile data consumed through the second network access card is equal to the first threshold, the electronic device reminds the user about remaining mobile data of the second network access card.

With reference to the first aspect, in some possible implementations of the first aspect, after the electronic device activates the second network access card and transmits the data service by using the second network access card, the method further includes: When determining that the mobile data consumed through the second network access card is equal to a second threshold, the electronic device automatically disconnects the data service transmitted by using the second network access card, activates the first network access card, and transmits the data service by using the first network access card.

According to the network access card switching method in this embodiment of this application, when the mobile data consumed by the electronic device through the second network access card reaches a specific value, the electronic device may automatically perform network access card switching from the second network access card to the first network access card. This helps avoid generating extra fees.

In some possible implementations, when determining that the mobile data consumed through the second network access card is equal to the second threshold, the electronic device reminds the user about the remaining mobile data of the second network card, automatically disconnects the data service transmitted by using the second network access card, activates the first network access card, and transmits the data service by using the first network access card.

With reference to the first aspect, in some possible implementations of the first aspect, before the electronic device determines that the network state of the first network access card meets the first preset condition, the method further includes: The electronic device determines that the user does not set a mobile data limit of the second network access card. After the electronic device activates the second network access card and transmits the data service by using the second network access card, the method further includes: The electronic device displays third prompt information when determining that mobile data consumed through the second network access card is equal to a third threshold, where the third prompt information is used to remind the user about network access card switching, or remind the user to set the mobile data limit of the second network access card.

According to the network access card switching method in this embodiment of this application, when the electronic device does not learn of the mobile data limit of the second network access card, and when the mobile data consumed through the second network access card reaches the third threshold, the electronic device may remind the user about switching back to the first network access card or remind the user to set the mobile data limit of the second network access card. This helps avoid generating extra fees.

With reference to the first aspect, in some possible implementations of the first aspect, the method further includes: The electronic device determines that the network state of the first network access card meets a second preset condition. In response to the case that the first network access card meets the second preset condition, the electronic device automatically disconnects the data service transmitted by using the second network access card, activates the first network access card, and transmits the data service by using the first network access card.

According to the network access card switching method in this embodiment of this application, when the network state of the first network access card meets the second preset condition, the electronic device may switch to the first network access card to transmit the data service. This can fully utilize the advantage of the plurality of cards to ensure continuity of the communications service, avoid the cumbersome manual switching operation of the user, and help improve user experience.

In some possible implementations, before the electronic device detects the first operation of the user, the method further includes: The electronic device reminds the user to enable the automatic network access card switching function.

According to the network access card switching method in this embodiment of this application, when the electronic device transmits the data service by using a first network access card, if the electronic device determines that network quality of the first network access card deteriorates, the electronic device may remind the user to enable the automatic network access card switching function. This can fully utilize the advantage of the plurality of cards to ensure continuity of the communications service.

With reference to the first aspect, in some possible implementations of the first aspect, the network state of the first network access card includes one or more of signal strength, signal quality, a network standard, a transmission latency for the data service, or a transmission rate for the data service during use of the first network access card by the electronic device.

According to the network access card switching method in this embodiment of this application, when the one or more parameters of the signal strength, the signal quality, the network standard, the transmission latency for the data service, and the transmission rate for the data service when the first network access card is used meet the first preset condition, the electronic device may perform network access card switching from the first network access card to the second network access card. This can fully utilize the advantage of the plurality of cards to ensure continuity of the communications service, avoid the cumbersome manual switching operation of the user, and help improve user experience.

With reference to the first aspect, in some possible implementations of the first aspect, the first preset condition includes one or more of the following: the signal strength is less than or equal to a preset strength threshold; the signal quality is less than or equal to a preset quality threshold; the network standard changes from a first-priority network standard to a second-priority network standard; and the transmission latency is greater than or equal to a preset latency threshold.

In some possible implementations, before the electronic device determines that the network state of the first network access card meets the first preset condition, the method further includes: The electronic device determines that the electronic device is in a first application scenario.

According to the network access card switching method in this embodiment of this application, the user may select that the intelligent network access card switching method is valid for some applications. For some specified applications, the user may select not to use the intelligent network access card switching function. This helps improve user experience in some specified application scenarios.

According to a second aspect, a network access card switching method is provided. The method is applied to an electronic device. At least a first network access card and a second network access card are installed on the electronic device, and the first network access card is a default mobile data card of the electronic device. The method includes: The electronic device activates the first network access card. The electronic device detects a first operation of a user, where the first operation is an operation that the user enables an automatic network access card switching function. In response to the first operation, the electronic device enables the automatic network access card switching function. The electronic device transmits a data service by using the first network access card. The electronic device determines that a network state of the first network access card meets a first preset condition. In response to the case that the network state of the first network access card meets the first preset condition, the electronic device automatically disconnects the data service transmitted by using the first network access card, activates the second network access card, and transmits the data service by using the second network access card. The electronic device determines that the network state of the first network access card meets a second preset condition. In response to the case that the first network access card meets the second preset condition, the electronic device automatically disconnects the data service transmitted by using the second network access card, activates the first network access card, and transmits the data service by using the first network access card.

According to the network access card switching method in this embodiment of this application, when the network state of the first network access card meets the second preset condition, the electronic device may switch to the first network access card to transmit the data service. This can fully utilize an advantage of a plurality of cards to ensure continuity of a communications service, avoid a cumbersome manual switching operation of the user, and help improve user experience.

With reference to the second aspect, in some possible implementations of the second aspect, the method further includes: in response to the case that the first network access card meets the first preset condition, the electronic device remind the user that the second network access card is being used.

With reference to the second aspect, in some possible implementations of the second aspect, the method further includes: The electronic device detects a second operation of the user, where the second operation is an operation that the user sets a mobile data limit of the second network access card. In response to the second operation, the electronic device determines the mobile data limit of the second network access card.

With reference to the second aspect, in some possible implementations of the second aspect, after the electronic device activates the second network access card and transmits the data service by using the second network access card, the method further includes: When determining that mobile data consumed through the second network access card is equal to a first threshold, the electronic device reminds the user about network access card switching, or remind the user that the mobile data consumed through the second network access card reaches the first threshold.

With reference to the second aspect, in some possible implementations of the second aspect, after the electronic device activates the second network access card and transmits the data service by using the second network access card, the method further includes: When determining that the mobile data consumed through the second network access card is equal to a second threshold, the electronic device automatically disconnects the data service transmitted by using the second network access card, activates the first network access card, and transmits the data service by using the first network access card.

With reference to the second aspect, in some possible implementations of the second aspect, before the electronic device determines that the network state of the first network access card meets the first preset condition, the method further includes: The electronic device determines that the user does not set a mobile data limit of the second network access card. After the electronic device activates the second network access card and transmits the data service by using the second network access card, the method further includes: When determining that mobile data consumed through the second network access card is equal to a third threshold, the electronic device reminds the user about network access card switching, or remind the user to set the mobile data limit of the second network access card.

With reference to the second aspect, in some possible implementations of the second aspect, the network state of the first network access card includes one or more of signal strength, signal quality, a network standard, a transmission latency for the data service, or a transmission rate for the data service during use of the first network access card by the electronic device.

With reference to the second aspect, in some possible implementations of the second aspect, the first preset condition includes one or more of the following: the signal strength is less than or equal to a preset strength threshold; the signal quality is less than or equal to a preset quality threshold; the network standard changes from a first-priority network standard to a second-priority network standard; and the transmission latency is greater than or equal to a preset latency threshold.

According to a third aspect, the technical solutions provide a network access card switching apparatus. The apparatus is included in an electronic device, and the apparatus has a function of implementing behavior of the electronic device according to the foregoing aspects and the possible implementations of the foregoing aspects. The function may be implemented by hardware, or may be implemented by hardware by executing corresponding software. The hardware or the software includes one or more modules or units corresponding to the foregoing function.

According to a fourth aspect, the technical solutions provide an electronic device, including one or more processors, a memory, a plurality of applications, and one or more computer programs. The one or more computer programs are stored in the memory, and the one or more computer programs include instructions. When the instructions are executed by the electronic device, the electronic device is enabled to perform the network access card switching method according to any one of the foregoing aspects or the possible implementations.

According to a fifth aspect, the technical solutions provide an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the network access card switching method according to any one of the foregoing aspects or the possible implementations.

According to a sixth aspect, the technical solutions provide a computer storage medium, including computer instructions. When the computer instructions are run on an electronic device, the electronic device is enabled to perform the network access card switching method according to any one of the foregoing aspects or the possible implementations.

According to a seventh aspect, the technical solutions provide a computer program product. When the computer program product runs on an electronic device, the electronic device is enabled to perform the network access card switching method according to any one of the foregoing aspects or the possible implementations.

According to an eighth aspect, the technical solutions provide a chip system, including a processor, configured to invoke computer programs from a memory and run the computer programs, so that an electronic device on which the chip system is installed performs the method according to any one of the first aspect or the second aspect or the possible implementations of the first aspect or the second aspect. Optionally, the chip system further includes the memory.

BRIEF DESCRIPTION OF DRAWINGS

FIG. 16 is a schematic flowchart of another network access card switching method according to an embodiment of this application;

DESCRIPTION OF EMBODIMENTS

Terms used in the following embodiments are merely intended to describe specific embodiments, but are not intended to limit this application. Terms "one", "a", "the", "the foregoing", "this", and "the one" in singular forms used in this specification and the appended claims of this application are also intended to include forms like "one or more", unless otherwise specified in the context clearly. It should be further understood that, in the following embodiments of this application, "at least one" or "one or more" means one, two, or more. The term "and/or" is used to describe an association relationship between associated objects and indicates that three relationships may exist. For example, A and/or B may indicate the following three cases: Only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referencing a same embodiment. Instead, the statements mean "one or more but not all of the embodiments", unless otherwise specifically emphasized in other ways. The terms "include", "comprise", "have", and variants of the terms all mean "include but are not limited to", unless otherwise specifically emphasized in other ways.

The following describes an electronic device having an NFC function, a user interface used for such an electronic device, and embodiments for using such an electronic device. In some embodiments, the electronic device may be a portable electronic device that further includes other functions such as a personal digital assistant function and/or a music player function, for example, a mobile phone, a tablet computer, or a wearable electronic device having a wireless communication function (for example, a smartwatch). An example embodiment of the portable electronic device includes but is not limited to a portable electronic device using iOS®, Android®, Microsoft®, or another operating system. The portable electronic device may alternatively be another portable electronic device, for example, a laptop (Laptop) computer. It should be further understood that, in some other embodiments, the electronic device may not be a portable electronic device but a desktop computer.

Figure 1:
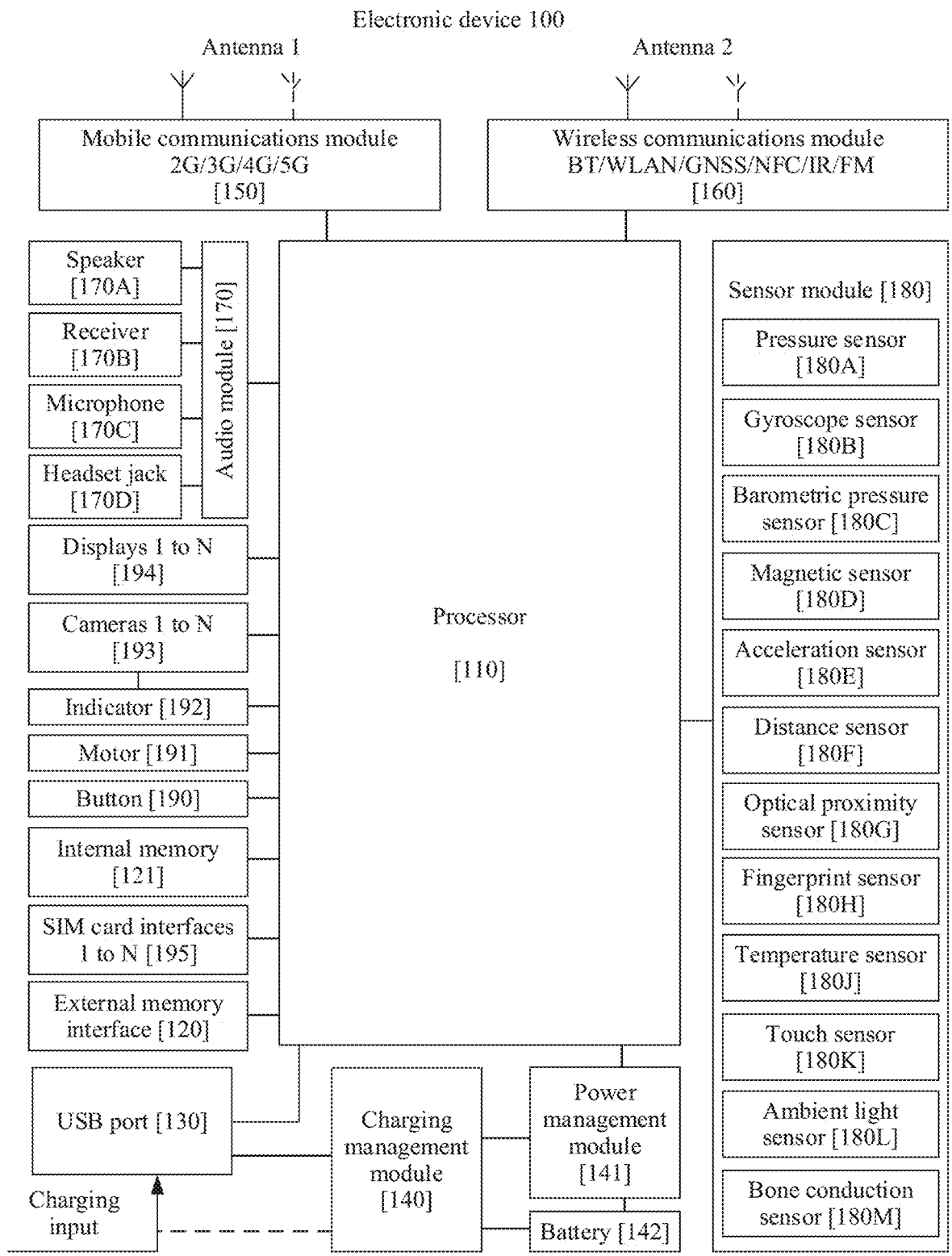
FIG. 1 is a schematic diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identity module (subscriber identity module, SIM) card interface 195, and the like.

It may be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NP U), and/or the like. Different processing units may be independent components, or may be integrated into one or more processors. In some embodiments, the electronic device 100 may alternatively include one or more processors 110. The controller may generate an operation control signal based on instruction operation code and a time sequence signal, to complete control of instruction reading and instruction execution. In some other embodiments, a memory may be further disposed in the processor 110, to store instructions and data. For example, the memory in the processor 110 may be a cache. The memory may store instructions or data that has been used or is cyclically used by the processor 110. If the processor 110 needs to use the instructions or the data again, the processor may directly invoke the instructions or the data from the memory. In this way, repeated access is avoided, waiting time of the processor 110 is reduced, and efficiency of processing data or executing instructions by the electronic device 100 is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB port, and/or the like. The USB port 130 is a port that conforms to a USB standard specification, and may be specifically a mini USB port, a micro USB port, a USB type-C port, or the like. The USB port 130 may be used to connect to a charger for charging the electronic device 100, or may be used to transmit data between the electronic device 100 and a peripheral device. The USB port 130 may alternatively be used to connect to a headset for playing audio by using the headset.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from an interface connection manner in this embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some functional modules of the mobile communications module 150 may be disposed in the processor 110. In some embodiments, at least some functional modules of the mobile communications module 150 and at least some modules of the processor 110 may be disposed in a same device.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth. BT), a global navigation satellite system (global navigation satellite system. GNSS), frequency modulation (frequency modulation, FM), a near field communication (near field communication, NFC) technology, an infrared (infrared, IR) technology, and the like and that is applied to the electronic device 100. The wireless communications module 160 may be one or more components integrating at least one communication processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave by using the antenna 2 for radiation.

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display. LCD), an organic light-emitting diode (organic light-emitting diode, OLED), an active-matrix organic light emitting diode or active-matrix organic light emitting diode (active-matrix organic light emitting diode, AMOLED), a flexible light-emitting diode (flexible light-emitting diode, FLED), a mini-LED, a micro-LED, a micro-OLED, quantum dot light emitting diodes (quantum dot light emitting diodes, QLED), or the like. In some embodiments, the electronic device 100 may include one or more displays 194.

In some embodiments of this application, when the display panel is made of a material such as an OLED, an AMOLED, or an FLED, the display 194 in FIG. 1 may be bent. Herein, that the display 194 may be bent means that the display may be bent to any angle at any part and may be maintained at the angle. For example, the display 194 may be folded from left to right in the middle, or may be folded from up to down in the middle. In this application, the display that may be bent is referred to as a foldable display. The touch display may be a screen, or may be a display formed by combining a plurality of screens. This is not limited herein.

The display 194 of the electronic device 100 may be a flexible screen. Currently, the flexible screen attracts much attention due to unique features and huge potential of the flexible screen. Compared with a conventional screen, the flexible screen has features of strong flexibility and bendability, and can provide a user with a new interaction mode based on the feature of bendability, to meet more requirements of the user for an electronic device. For an electronic device with a foldable display, the foldable display on the electronic device may be switched between a small screen in a folded form and a large screen in an expanded form at any time. Therefore, the user uses a split-screen function more frequently on the electronic device with the foldable display.

The electronic device 100 can implement a shooting function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal oxide semiconductor (complementary metal oxide semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referencing a structure of a biological neural network, for example, by referencing a mode of transmission between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external storage card.

The internal memory 121 may be configured to store one or more computer programs, and the one or more computer programs include instructions. The processor 110 may run the instructions stored in the internal memory 121, so that the electronic device 100 performs a network access card switching method provided in some embodiments of this application, various applications, data processing, and the like. The internal memory 121 may include a program storage area and a data storage area. The program storage area may store an operating system. The program storage area may further store one or more applications (for example, "Gallery" and "Contacts"), and the like. The data storage area may store data (for example, a photo and a contact) created during use of the electronic device 100, and the like. In addition, the internal memory 121 may include a high-speed random access memory, or may include a nonvolatile memory, for example, one or more magnetic disk storage devices, a flash memory, or a universal flash storage (universal flash storage, UFS). In some embodiments, the processor 110 may run the instructions stored in the internal memory 121 and/or the instructions stored in the memory that is disposed in the processor 110, so that the electronic device 100 performs the network access card switching method provided in this embodiment of this application, other applications, and data processing. The electronic device 100 may implement an audio function, for example, music playing and recording, through the audio module 170, the speaker 170A, the receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 1803, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detected signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a "Messages" application icon, an instruction for viewing an SMS message is executed. When a touch operation whose touch operation intensity is greater than or equal to the first pressure threshold is performed on a "Messages" application icon, an instruction for creating an SMS message is executed.

The gyroscope sensor 180B may be configured to determine a motion posture of the electronic device 100. In some embodiments, an angular velocity of the electronic device 100 around three axes (namely, axes X, Y, and Z) may be determined by using the gyroscope sensor 180B. The gyroscope sensor 180B may be configured to implement image stabilization during shooting. For example, when the shutter is pressed, the gyroscope sensor 180B detects an angle at which the electronic device 100 shakes, calculates, based on the angle, a distance for which a lens module needs to compensate, and allows the lens to cancel the shake of the electronic device 100 through reverse motion, to implement image stabilization. The gyroscope sensor 180B may be further used in a navigation scenario and a motion-sensing game scenario.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is applied to switching between a landscape mode and a portrait mode, a pedometer, or the like.

The ambient light sensor 180L is configured to sense ambient light brightness. The electronic device 100 may adaptively adjust brightness of the display 194 based on the sensed ambient light brightness. The ambient light sensor 180L may be further configured to automatically adjust a white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 1803. For example, when the temperature reported by the temperature sensor 180J exceeds a threshold, the electronic device 100 degrades performance of a processor located near the temperature sensor 180J, to reduce power consumption and implement thermal protection. In some other embodiments, when the temperature is less than another threshold, the electronic device 100 heats the battery 142 to prevent the electronic device 100 from being shut down abnormally due to the low temperature. In some other embodiments, when the temperature is less than still another threshold, the electronic device 100 boosts an output voltage of the battery 142, to avoid abnormal shutdown due to the low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the electronic device 100 at a location different from a location of the display 194.

The button 190 includes a power button, a volume button, and the like. The button 190 may be a mechanical button, or may be a touch button. The electronic device 100 may receive a button input, and generate a button signal input related to a user setting and function control of the electronic device 100.

Figure 2:
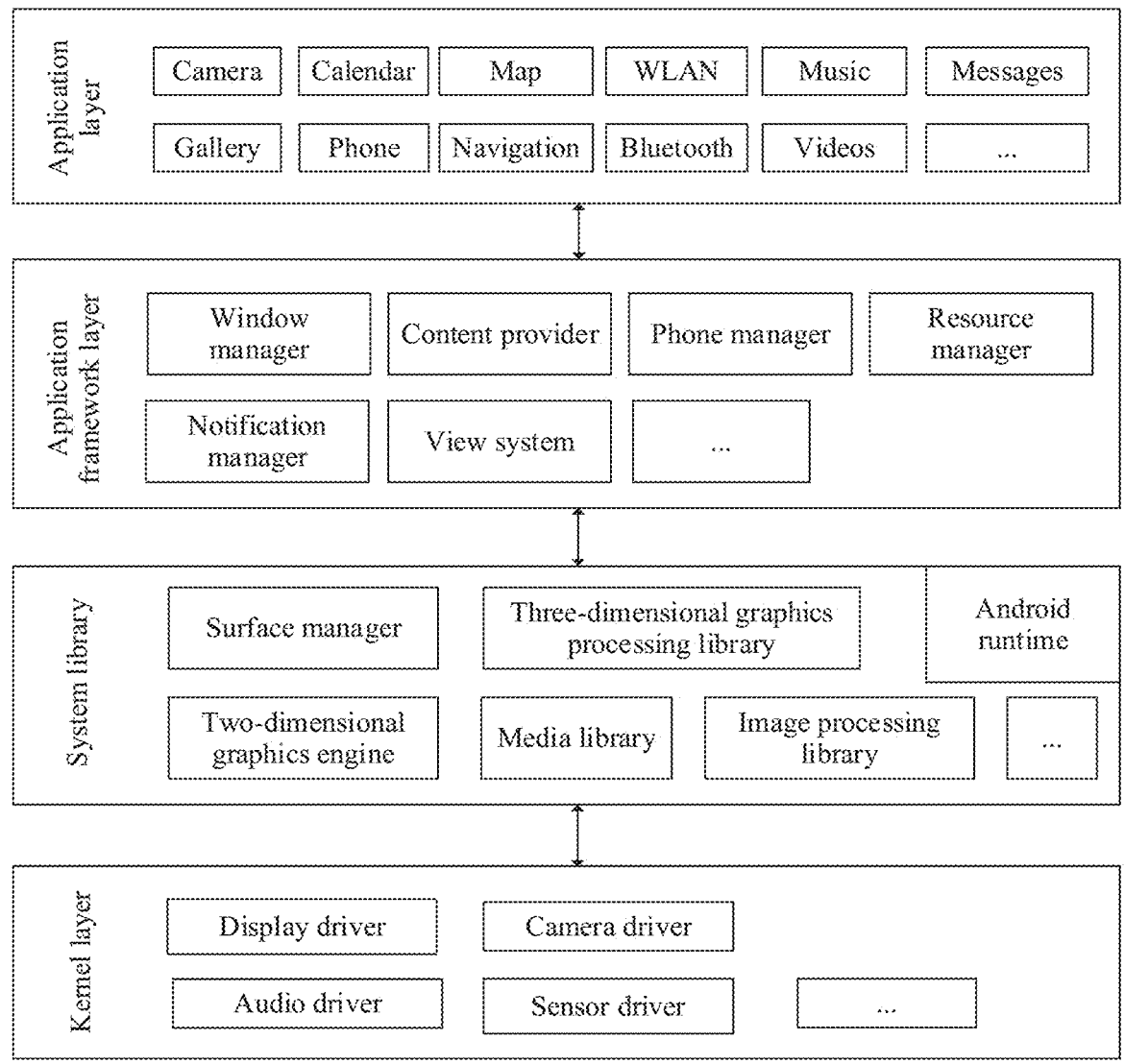
FIG. 2 is a block diagram of a software structure of an electronic device according to an embodiment of this application.

FIG. 2 is a block diagram of a software structure of an electronic device 100 according to an embodiment of this application. In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom. The application layer may include a series of application packages.

As shown in FIG. 2, the application packages may include applications such as "Camera", "Gallery", "Calendar", "Phone", "Map", "Navigation", "WLAN", "Bluetooth", "Music", "Videos", and "Messages".

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a message notification icon, and may include a text display view and a picture display view.

The phone manager is configured to provide a communication function of the electronic device 100, for example, management of a call status (including answering or declining a call).

The resource manager provides various resources for an application, such as a localized character string, an icon, a picture, a layout file, and a video file.

The notification manager enables an application to display notification information in a status bar, and may be configured to convey a notification type message. The notification manager may automatically disappear after a short pause without user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playing and recording of a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

FIG. 3(*a*) to FIG. 3(*j*) are schematic diagrams of a network access card switching method according to an embodiment of this application.

Refer to a GUI shown in FIG. 3(*a*). The GUI is a home screen of a mobile phone. The GUI includes a plurality of application icons, and the plurality of application icons include a "Settings" icon 301. After detecting an operation that a user taps the "Settings" icon 301 on the home screen, the mobile phone may enable a setting related function of the mobile phone, and display a GUI shown in FIG. 3(*b*).

Refer to the GUI shown in FIG. 3(*b*). The GUI is a setting interface of the mobile phone. The GUI includes a plurality of function options, and the plurality of function options include "Wireless & Network", "Device connection", "Screen & Wallpaper", "Sounds", and the like. The user may set functions such as WLAN, dual-card management, and a wireless network by using the "Wireless & Network" function. After detecting an operation that the user taps the "Wireless & Network" function 302, the mobile phone displays a GUI shown in FIG. 3(c).

Figure 3A:
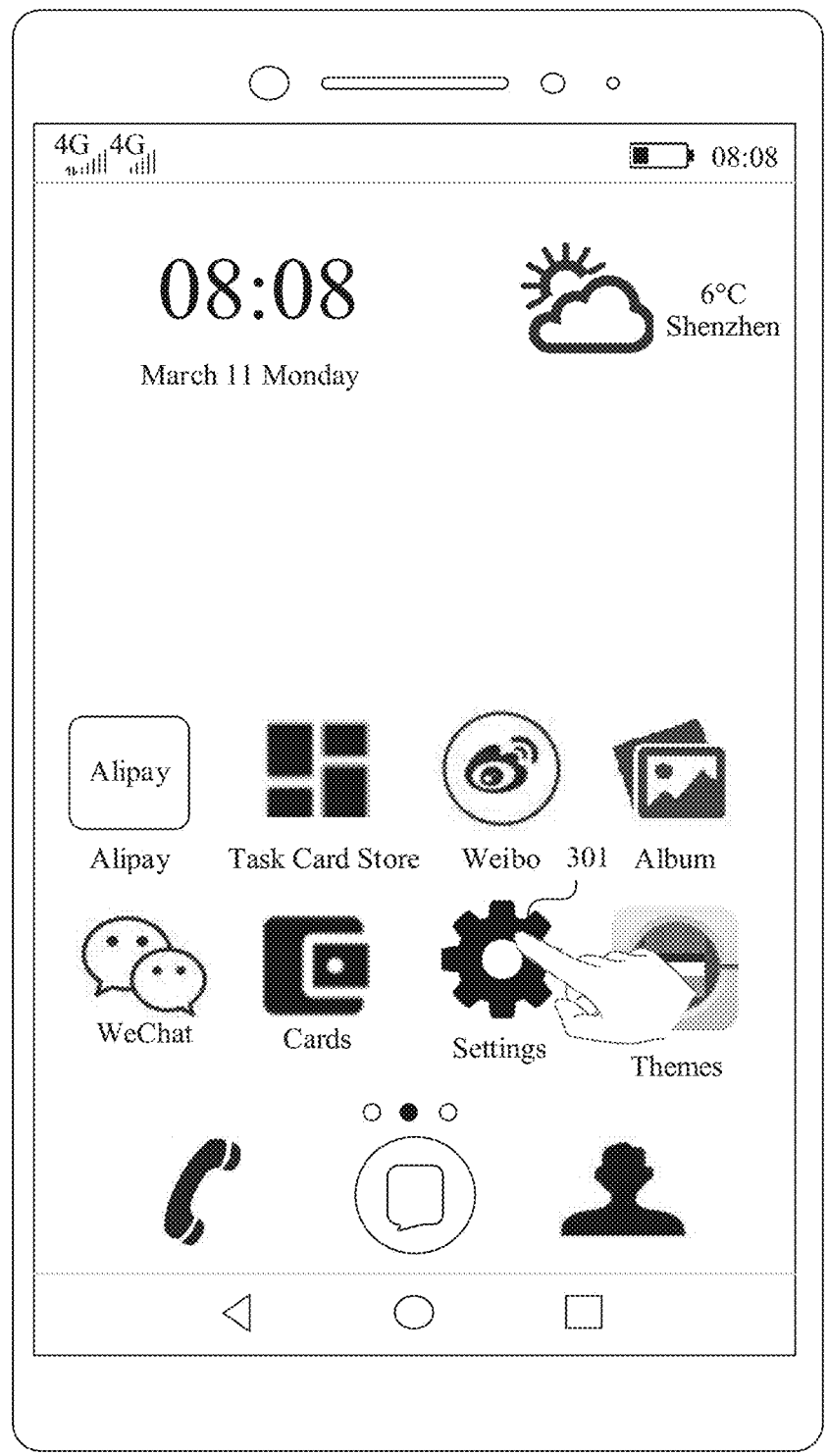
FIG. 3(a) to FIG. 3(j) are schematic diagrams of a network access card switching method according to an embodiment of this application.
Figure 3B:
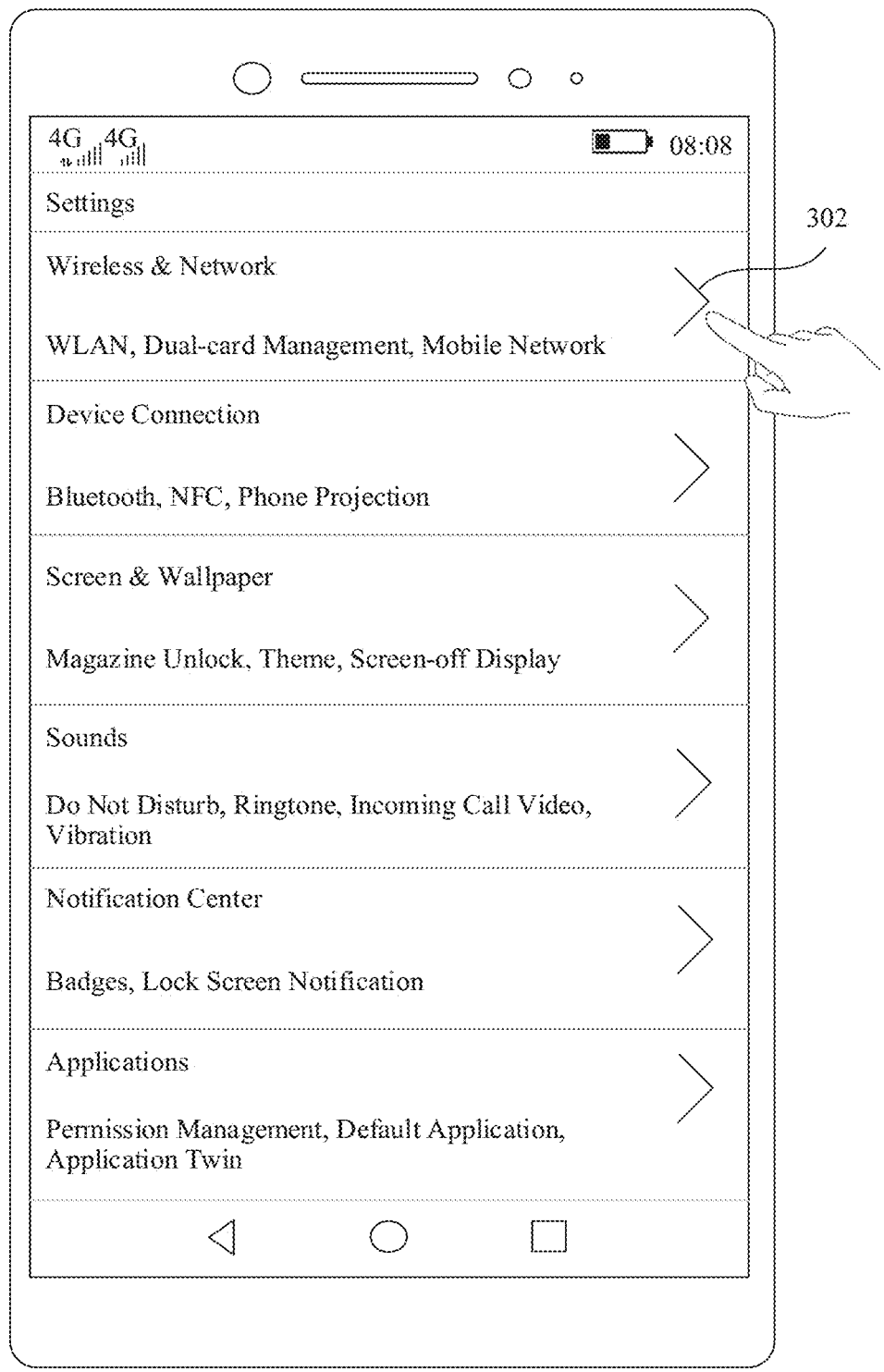
Figure 3C:
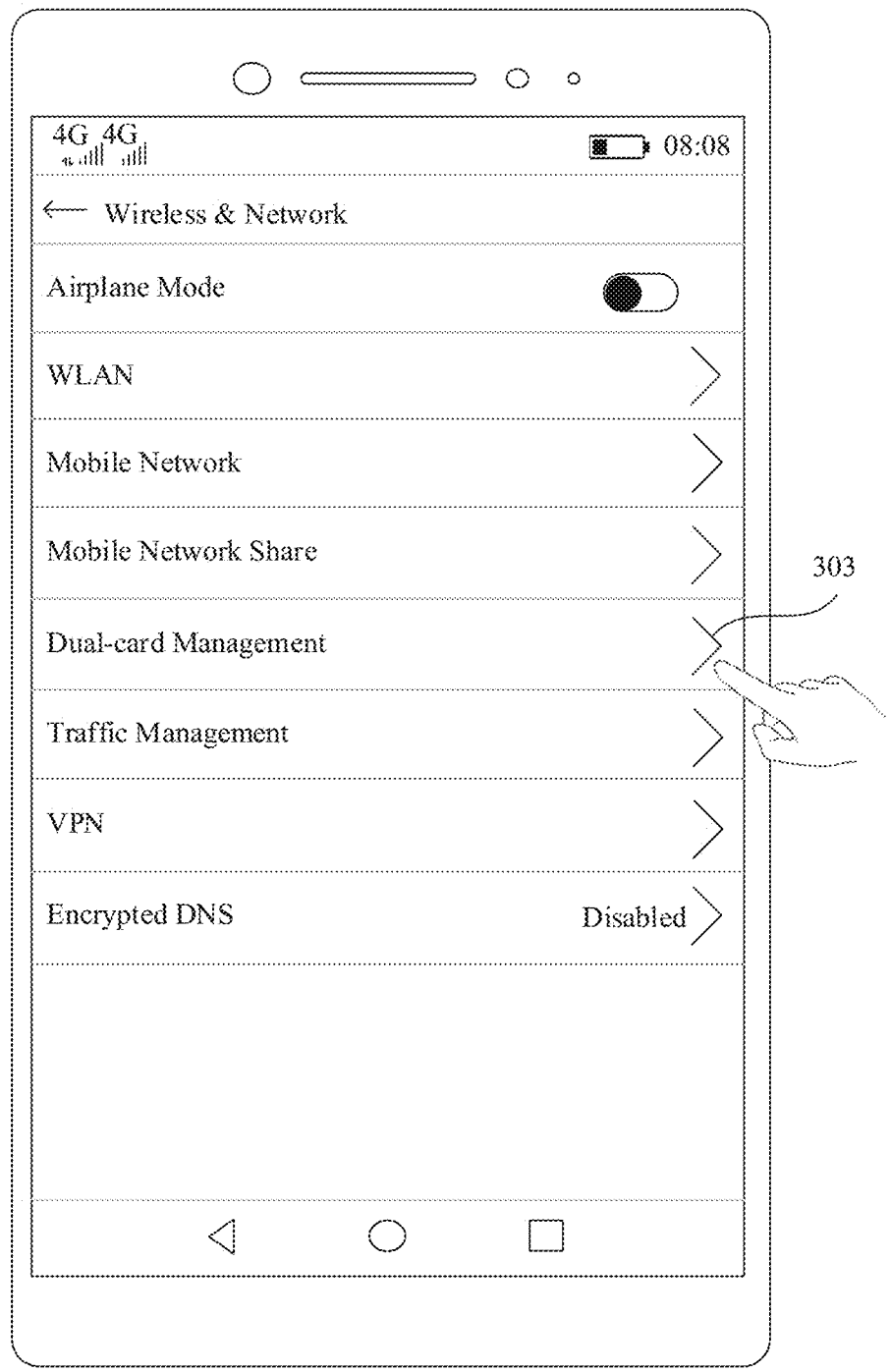

Refer to the GUI shown in FIG. 3(c). The GUI is a wireless and network function setting interface of the mobile phone. The GUI includes a plurality of function options belonging to "Wireless & Network", and the plurality of function options include "Airplane mode", "WLAN", "Mobile network", "Dual-card management", and the like. After detecting an operation that the user taps the "Dual-card management" function 303, the mobile phone displays a GUI shown in FIG. 3(d).

Figure 3D:
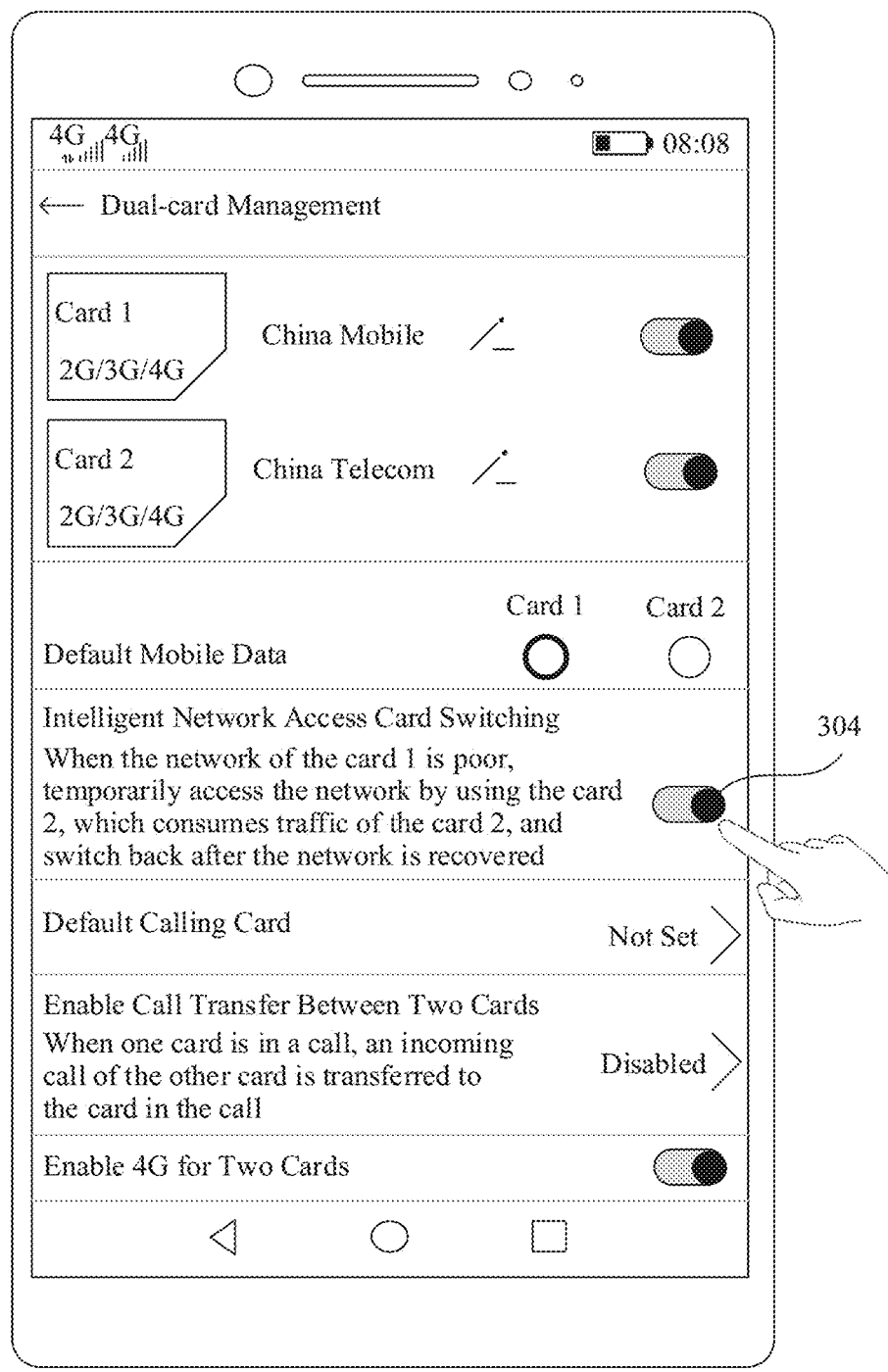

Refer to the GUI shown in FIG. 3(d). The GUI is a dual-card management function setting interface of the mobile phone. The user can manage two cards in the setting interface. As shown in FIG. 3(d), the function setting interface includes an intelligent network access card switching function. The intelligent network access card switching function is used when a network of a card 1 is relatively poor and the mobile phone temporarily uses a card 2 to access a network. This may generate extra fees. After the mobile phone detects an operation that the user slides a control 304 to the right or taps a control 304, the mobile phone enables the intelligent network access card switching function, and displays a GUI shown in FIG. 3(e).

Figure 3E:
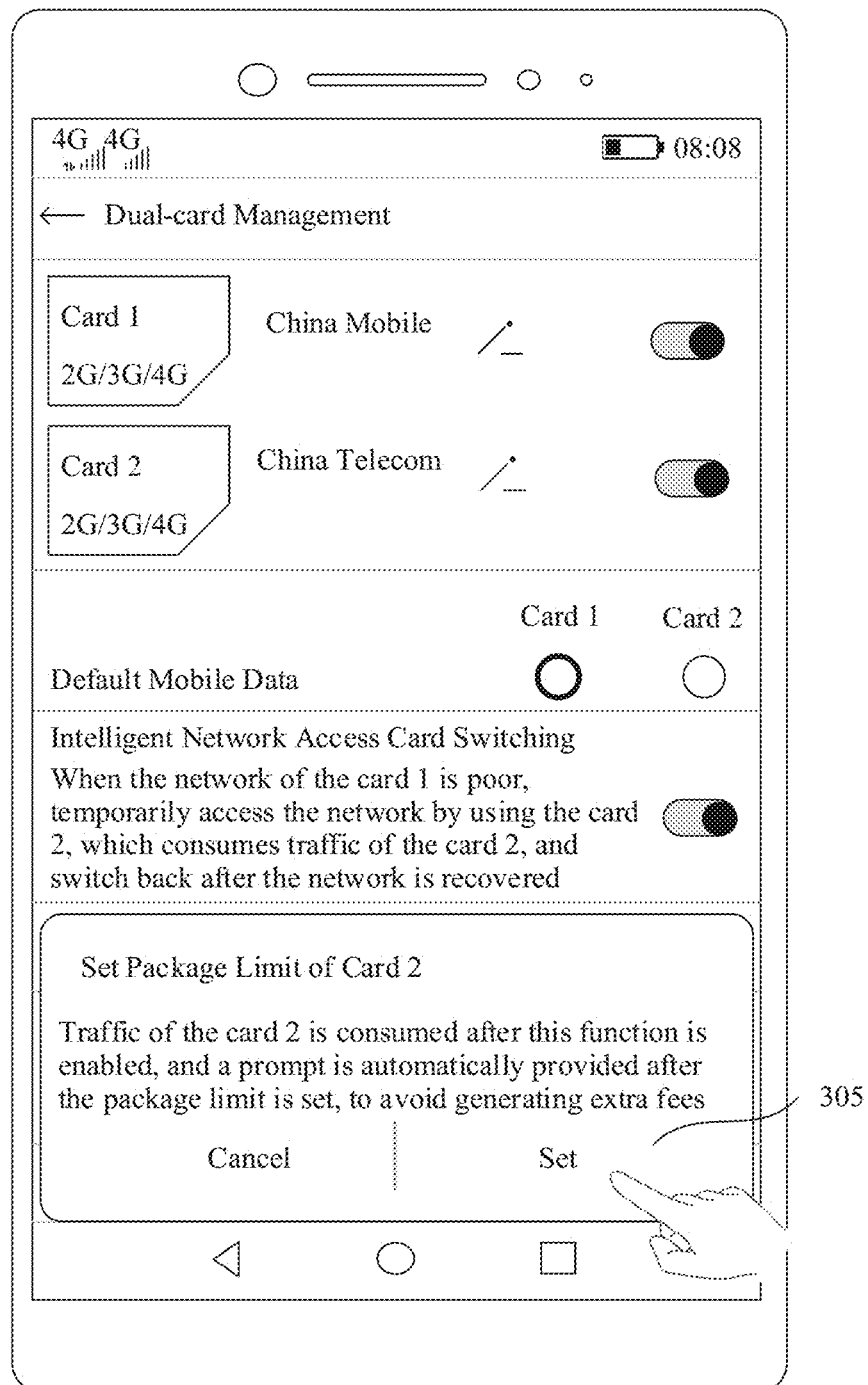

Refer to the GUI shown in FIG. 3(e). The GUI includes a system prompt window. The system alert window is a prompt window "Set package limit of card 2" and is used to remind the user to set the package limit of the card 2. The window may further include introduction to the prompt window "Set package limit of card 2": Traffic of the card 2 is consumed after this function is enabled, and a prompt is automatically provided after the package limit is set, to avoid generating extra fees. After detecting that the user taps a control 305, the mobile phone displays a GUI shown in FIG. 3(f).

Figure 3F:
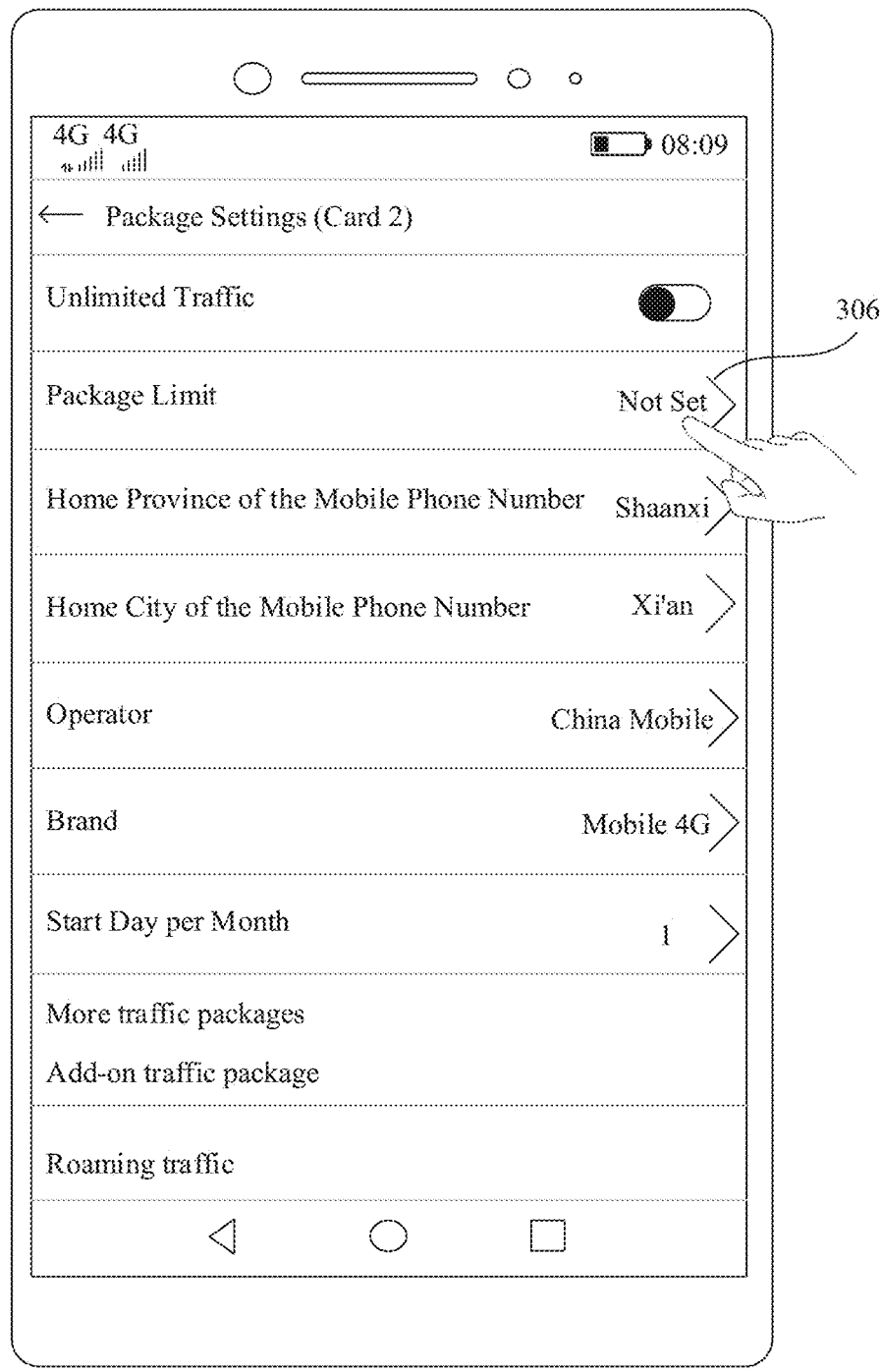

Refer to the GUI shown in FIG. 3(f). The GUI is a package setting interface for the card 2. The user may specify whether the card 2 has unlimited traffic, the package limit of the card 2, the home province of the mobile phone number of the card 2, the home city of the mobile phone number of the card 2, an operator to which the card 2 belongs, a network to which the card 2 belongs, and the like in the package setting interface for the card 2. After detecting an operation that the user taps a control 306, the mobile phone displays a GUI shown in FIG. 3(g).

Figure 3G:
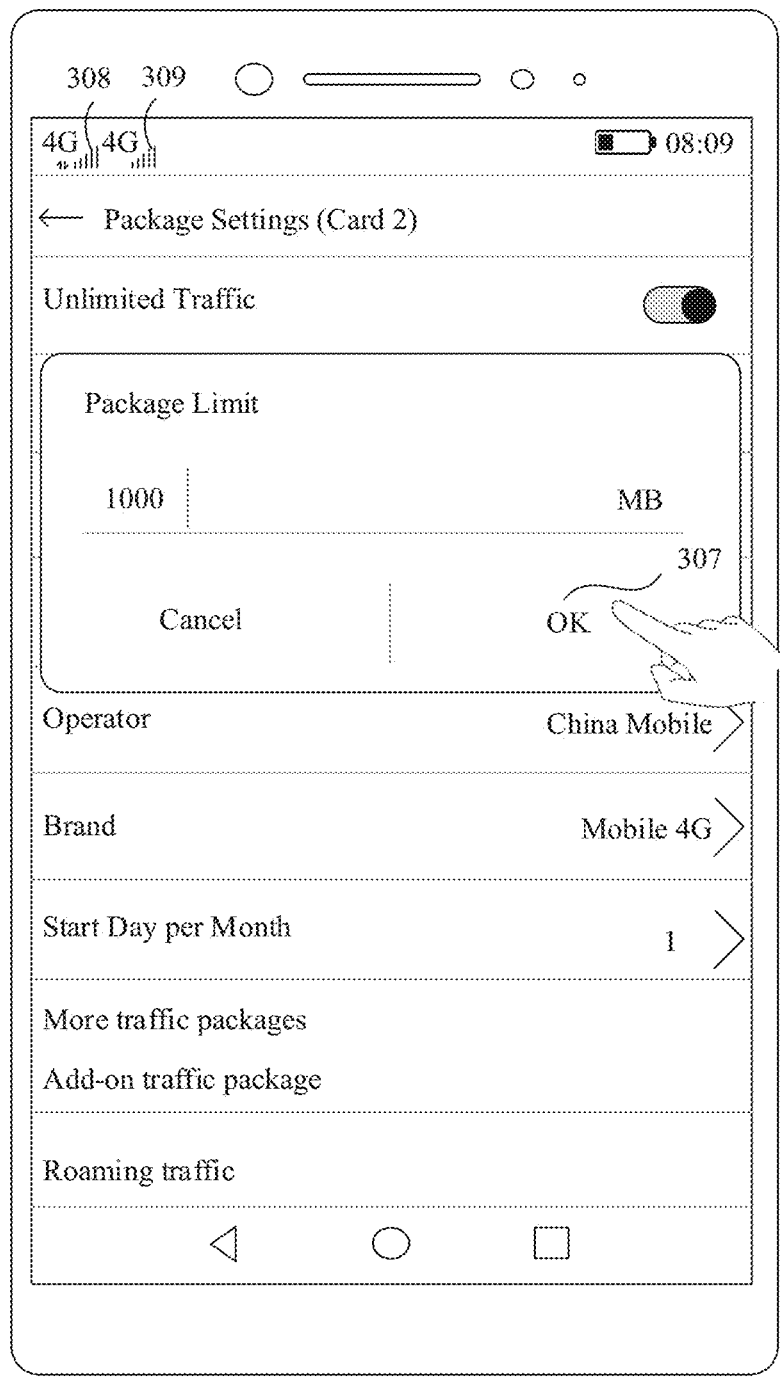

Refer to the GUI shown in FIG. 3(g). The GUI includes a window for entering a package limit. The user can enter the package limit of the card 2 in the window (for example, the package limit of the card 2 is 1000 MB). When the mobile phone detects an operation that the user taps a control 307, the mobile phone may determine that the package limit of the card 2 is 1000 MB in a current month.

In an embodiment, after detecting the operation that the user slides the control 304 to the right or taps the control 304, the mobile phone may enable the intelligent network access card switching function without reminding the user to set the package limit of the card 2. The mobile phone may automatically obtain the package limit of the card 2 in the following manners.

(1) Determine the package limit of the card 2 by parsing content from a "Messages" application.

For example, the mobile phone parses an SMS message content sent by the operator, and extracts a keyword in the SMS message content, and determines the package limit of the card 2 by extracting the keyword in the SMS message content.

For example, when the operator to which the card 2 belongs is China Mobile, the mobile phone may parse an SMS message content sent by 10086, obtain keywords such as "150 MB traffic is used" and "850 MB traffic is remaining", and then determine that the package limit of the card 2 is 1000 MB, 150 MB traffic is used in this month, and 850 MB traffic is remaining in this month.

(2) Obtain the package limit of the card 2 through an interface between the mobile phone and the operator.

For example, the mobile phone may send request information to each of network devices of operators to which the card 1 and the card 2 belong on the first day of each month. The request information is used to request to obtain a package limit of each of the card 1 and the card 2. The mobile phone may receive response information sent by the network device of the operator to which the card 1 belongs, to learn of a package limit of the card 1 in a current month. The mobile phone may receive response information sent by the network device of the operator to which the card 2 belongs, to learn of the package limit of the card 2 in a current month.

Figure 3H:
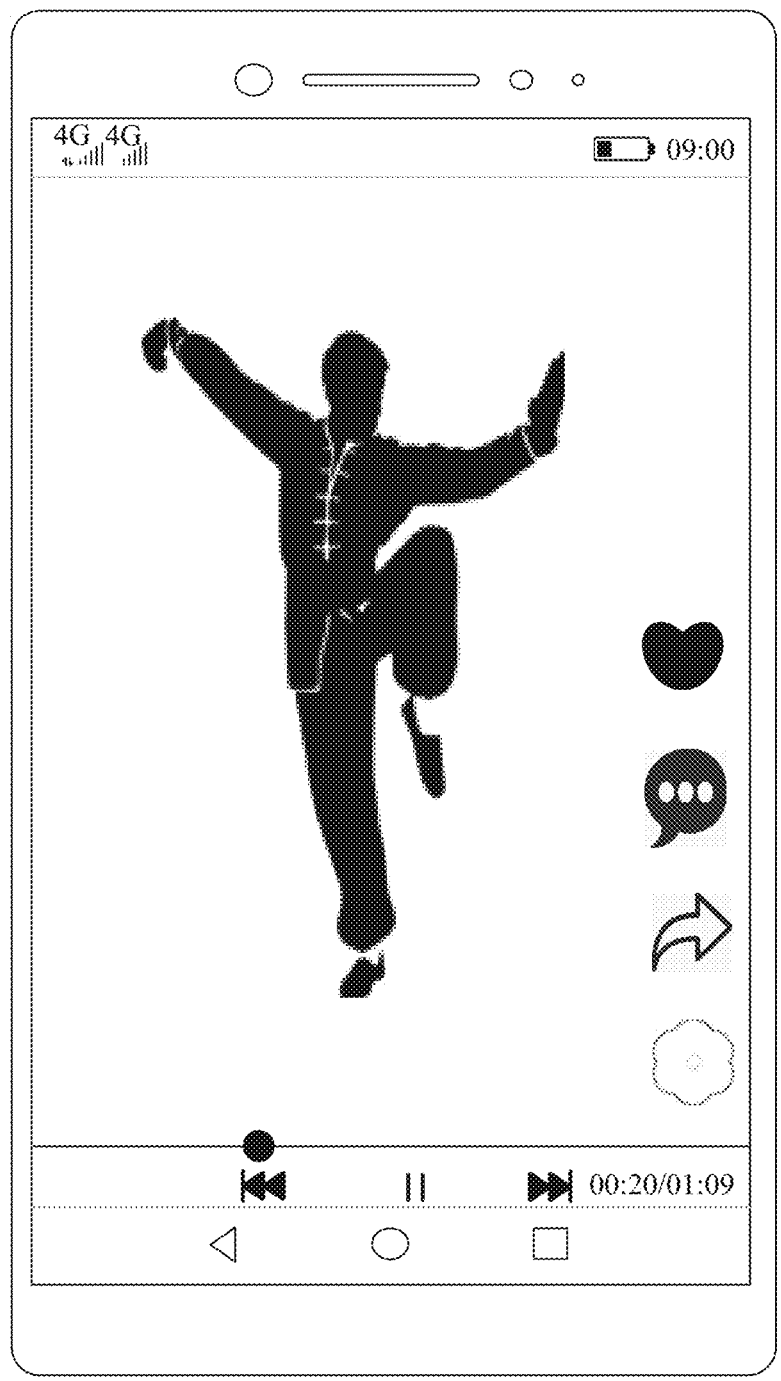

Refer to a GUI shown in FIG. 3(h). The GUI is a video playing interface of a video application on the mobile phone. Signal strength of the card 1 is greater than a first preset value, and a signal indication component 308 of the card 1 in the GUI indicates that the card 1 has five signal bars. Signal strength of the card 2 is greater than a second preset value, and a signal indication component 309 of the card 2 in the GUI indicates that the card 2 has five signal bars. The mobile phone is using a default mobile data card (the card 1) to transmit a video service.

For example, the first preset value and the second preset value may be preset signal strength values in the mobile phone. Different preset signal strength values may be set in the mobile phone for different network standards.

Figure 3I:
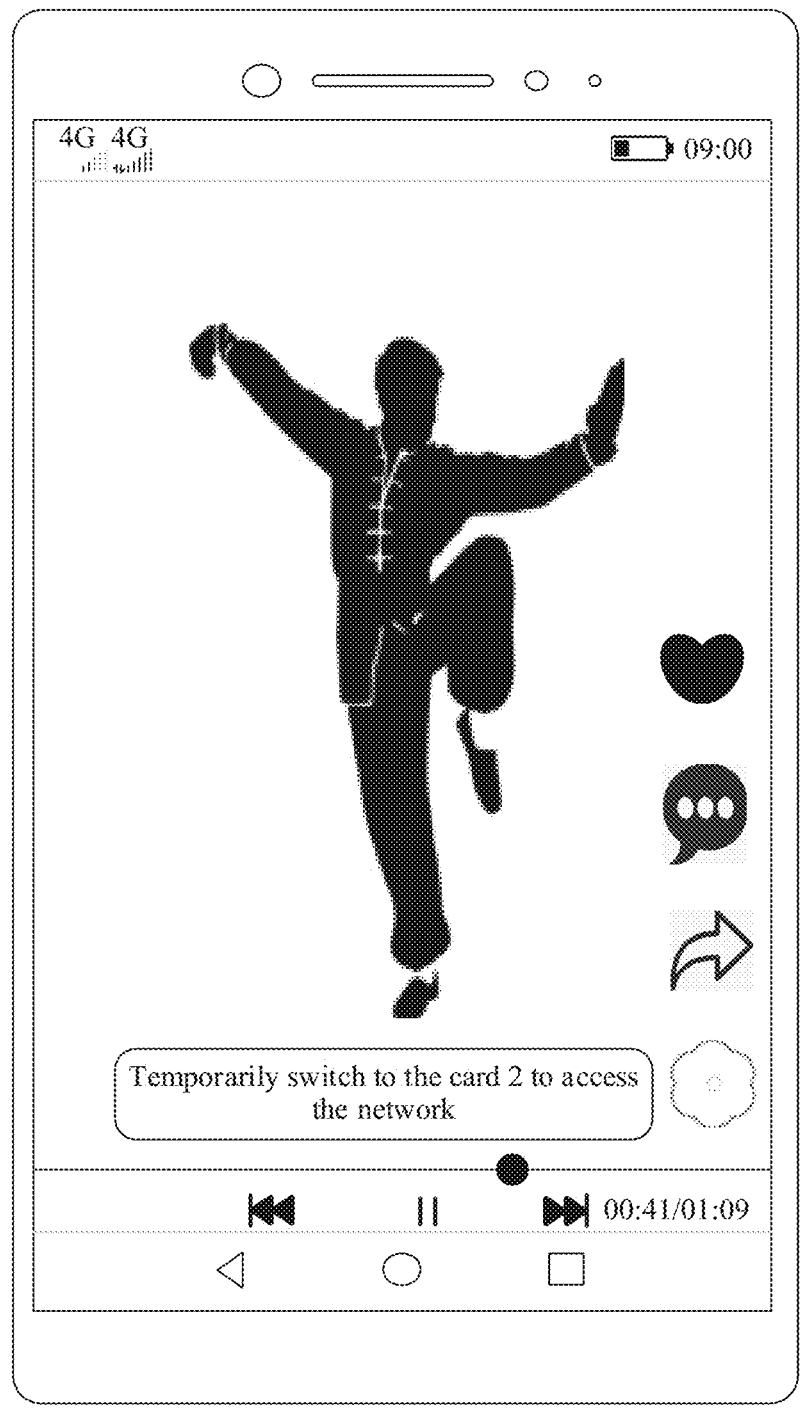

Refer to FIG. 3(i). When the user watches a video through the video application, and the signal strength of the card 1 is less than the first preset value (as shown in FIG. 3(f), the signal indication component of the card 1 indicates that signal bars of the card 1 currently change from five bars to two bars), or the signal strength of the card 2 is greater than the second preset value (as shown in FIG. 3(f), the signal indication component of the card 2 indicates that the card 2 currently has five signal bars), the mobile phone may automatically perform network access card switching from the card 1 to the card 2. At the same time, the mobile phone may remind the user "Temporarily switch to the card 2 to access the network" in the video playing interface, and the mobile phone transmits the video service by using the card 2.

Figure 3J:
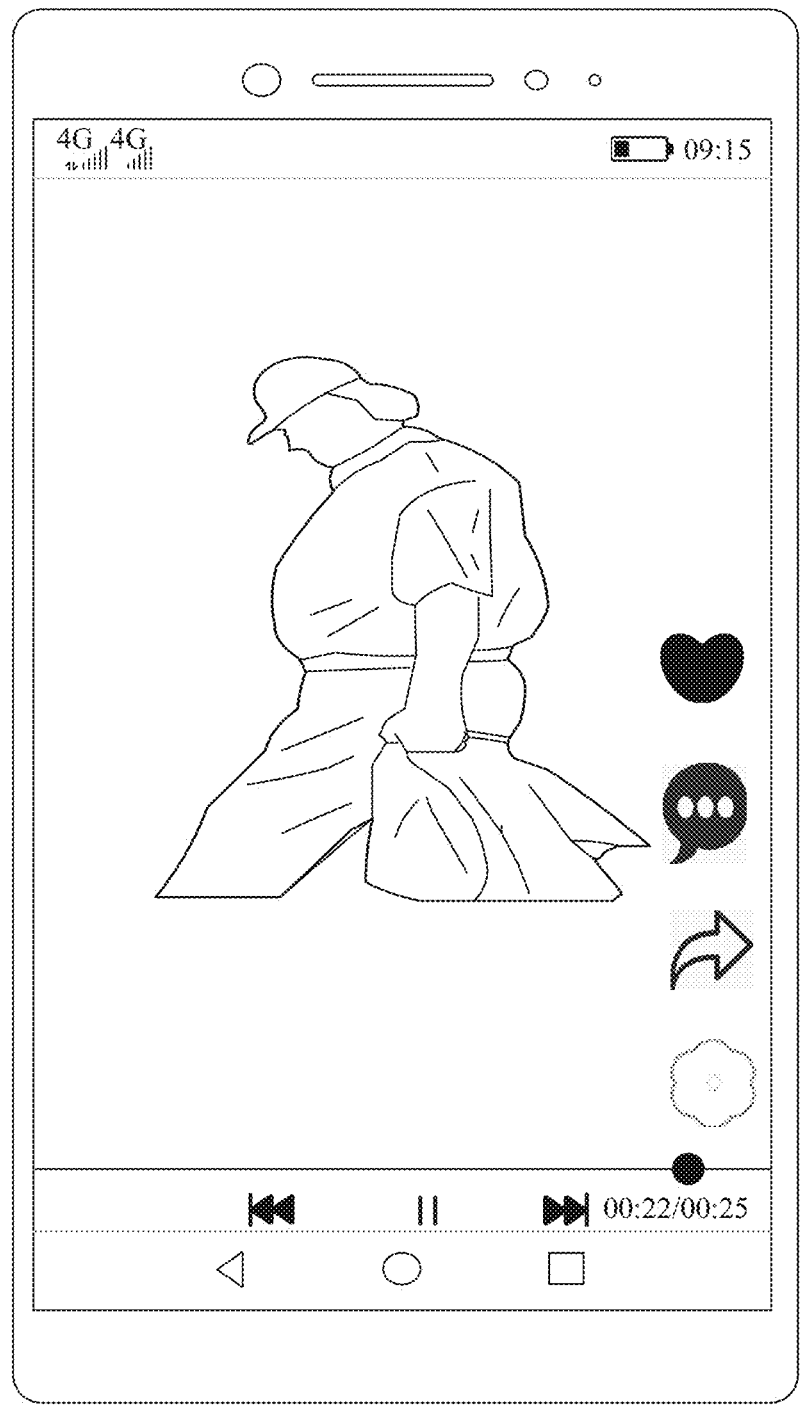

Refer to FIG. 3(j). When the signal strength of the card 1 is greater than the first preset value, or the signal strength of the card 2 is less than the second preset value, the mobile phone may automatically perform network access card switching from the card 2 to the card 1. In other words, the mobile phone switches back to the default mobile data card (the card 1) to transmit the video service.

In an embodiment, when the mobile phone automatically performs network access card switching from the card 2 to the card 1, the mobile phone may further remind the user "Switch back to the card 1 to access the network" in the video playing interface.

It should be understood that, in this embodiment of this application, when the mobile phone transmits the data service by using the card 1, the card 1 may camp on a cell of a first operator (for example, China Mobile), and transmit the data service in the cell, and the card 1 is in a data service activation state. In this case, the card 2 may camp on a cell of a second operator (for example, China Telecom), and the card 2 is in a data service deactivation state in the cell. When the mobile phone performs network access card switching from the card 1 to the card 2, the card 1 may camp on the cell of the first operator, and the card 1 is in a data service deactivation state in the cell. In this case, the card 2 may camp on the cell of the second operator, and transmit the data service in the cell, and the card 2 is in a data service activation state.

It should be further understood that, in this embodiment of this application, when the card 1 and the card 2 belong to a same operator, the card 1 and the card 2 may camp on a same cell of the operator. When the mobile phone transmits the data service by using the card 1, the card 1 may camp on the cell, and transmit the data service in the cell, and the card 1 is in a data service activation state. In this case, the card 2 can also camp on the cell, and the card 2 is in a data service deactivation state in the cell.

In this embodiment of this application, the card 1 and the card 2 in the mobile phone may be subscriber identity module (subscriber identity module, SIM) cards, virtual cards, or embedded-SIM (embedded-SIM) cards.

In this embodiment of this application, for the mobile phone with a plurality of cards, when a network of a card in the mobile phone deteriorates, the user does not need to manually switch a network access card, but the mobile phone automatically switches to a card with a relatively good network to access a network. This can fully utilize an advantage of the plurality of cards to ensure continuity of a communications service, avoid a cumbersome manual switching operation of the user, and help improve user experience.

Figure 4A:
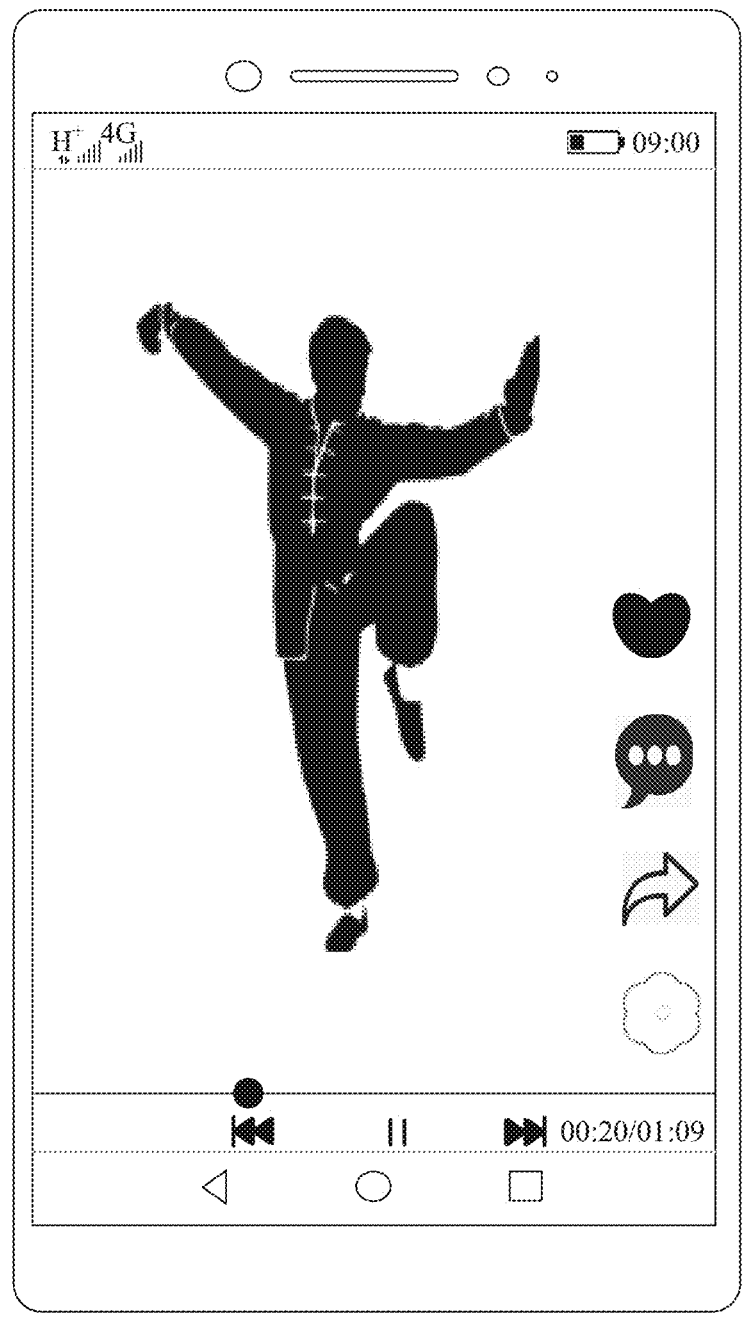
FIG. 4(a) and FIG. 4(b) are schematic diagrams of another network access card switching method according to an embodiment of this application.
Figure 4B:
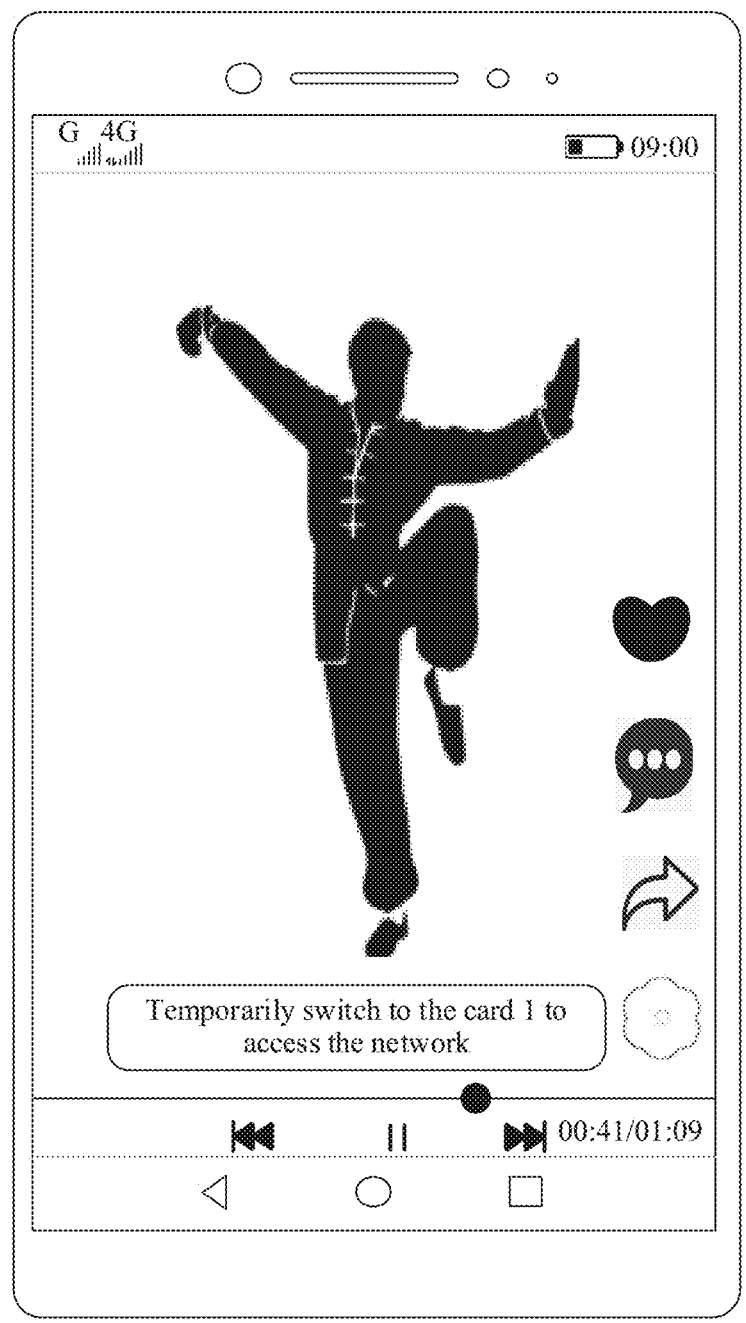

FIG. 4(a) and FIG. 4(b) are schematic diagrams of another network access card switching method according to an embodiment of this application.

Refer to a GUI shown in FIG. 4(a). The GUI is a video playing interface of a video application on a mobile phone. In the GUI, a signal indication component of a card 1 indicates that the card 1 has five signal bars, and a signal indication component of a card 2 indicates that the card 2 has five signal bars. The card 1 corresponds to a network standard of H+, and the card 2 corresponds to a network standard of 4G. The card 1 may be a default mobile data card, and the mobile phone is using the card 1 to transmit a video service.

Refer to a GUI shown in FIG. 4(b). In a process in which a user watches a video, if the network standard corresponding to the card 1 changes from H+ to G, the mobile phone may automatically perform network access card switching from the card 1 to the card 2. At the same time, the mobile phone may remind the user "Temporarily switch to the card 2 to access the network" in the video playing interface, and the mobile phone transmits the video service by using the card 1.

In this embodiment of this application, when the network standard corresponding to the card 1 changes from a first-priority network standard to a second-priority network standard, the mobile phone may perform network access card switching from the card 1 to the card 2.

In an embodiment, the first-priority network standard corresponding to the card 1 is 3G, and the second-priority network standard corresponding to the card 1 is 2G. When the network standard corresponding to the card 1 changes from 3G to 2G, the mobile phone may automatically perform network access card switching from the card 1 to the card 2.

In an embodiment, the first-priority network standard corresponding to the card 1 is 5G, and the second-priority network standard corresponding to the card 1 is 4G, 3G, or 2G. When the network standard corresponding to the card 1 changes from 5G to 4G, 3G, or 2G, the mobile phone may automatically perform network access card switching from the card 1 to the card 2.

In an embodiment, the first-priority network standard corresponding to the card 1 is 4G, and the second-priority network standard corresponding to the card 1 is 3G, or 2G. When the network standard corresponding to the card 1 changes from 4G to 3G, or 2G, the mobile phone may automatically perform network access card switching from the card 1 to the card 2.

It should be understood that H is a high speed downlink packet access (high speed downlink packet access, HSDPA) network of China Unicom, and may also be referred to as a 3.5G network. H+ is an upgraded version of H and may also be referred to as a 3.75G network.

Figure 5A:
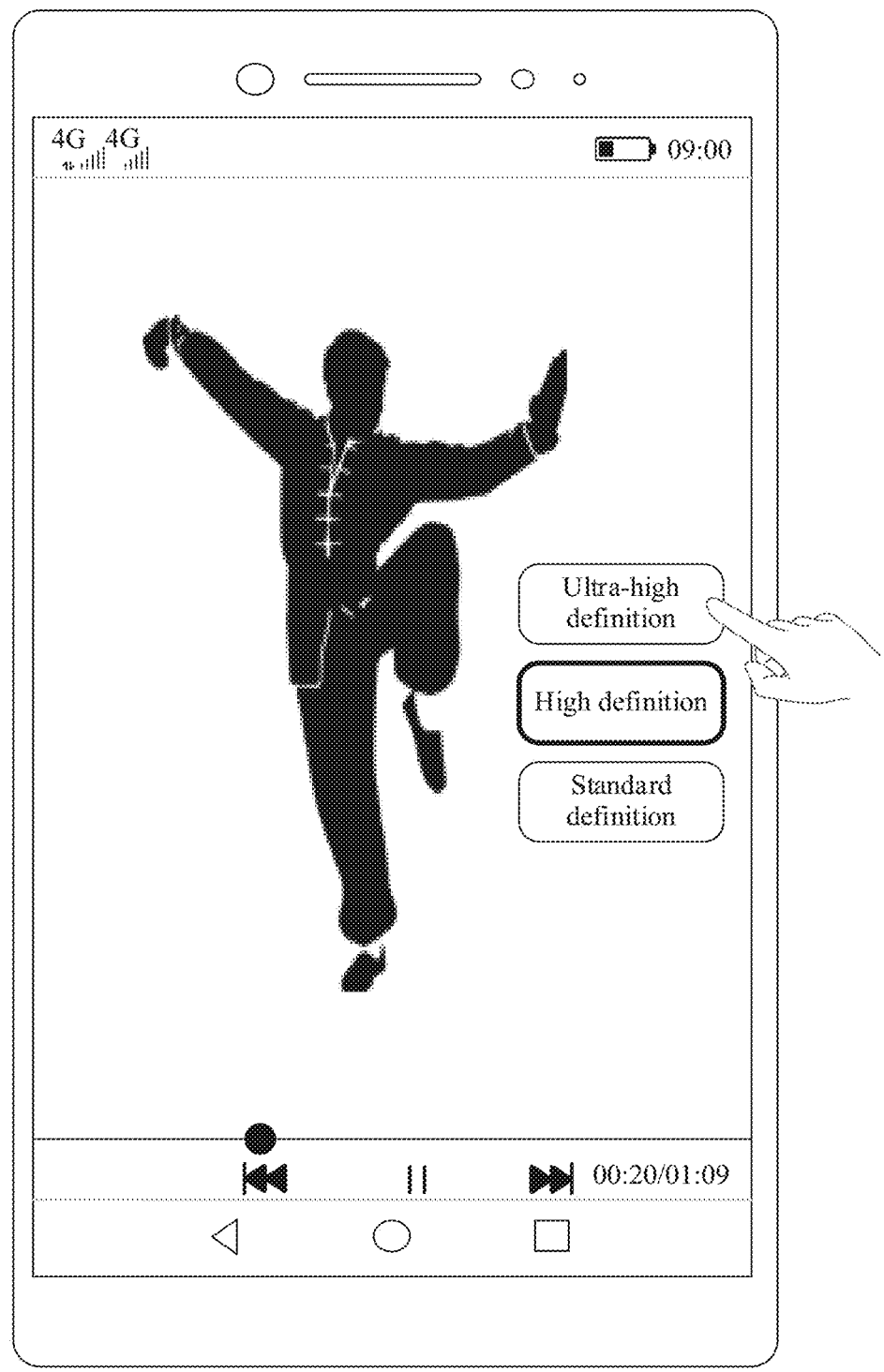
FIG. 5(a) and FIG. 5(b) are schematic diagrams of another network access card switching method according to an embodiment of this application.
Figure 5B:
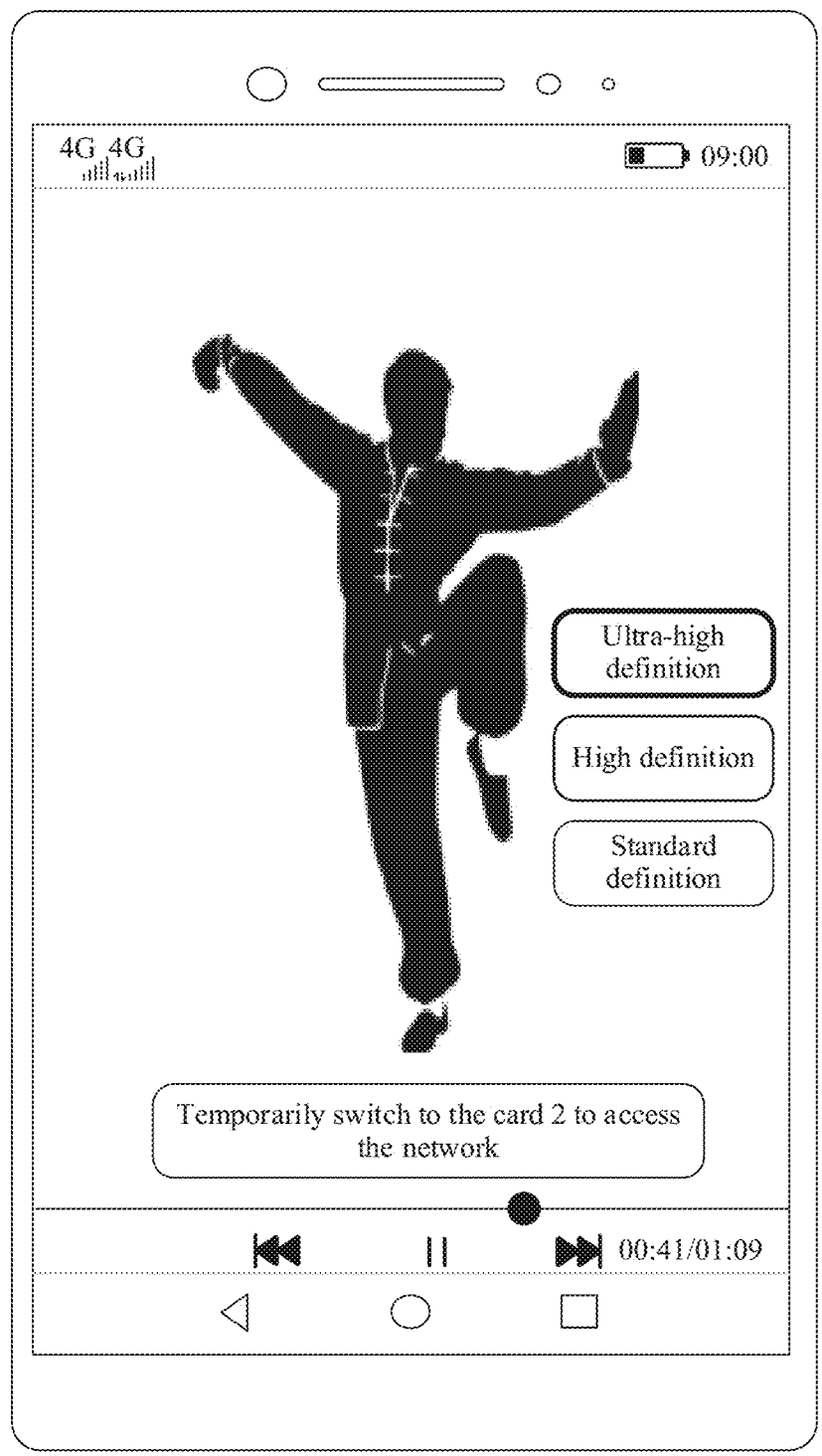

FIG. 5(a) and FIG. 5(b) are schematic diagrams of another network access card switching method according to an embodiment of this application.

Refer to a GUI shown in FIG. 5(a). The GUI is a video playing interface of a video application on a mobile phone. In the GUI, a signal indication component of a card 1 indicates that the card 1 has five signal bars, and a signal indication component of a card 2 indicates that the card 2 has five signal bars. The card 1 corresponds to a network standard of 4G, and the card 2 corresponds to a network standard of 4G. The mobile phone is using the card 1 to transmit a data service. In a process of watching a video, a user may adjust definition of the video from high definition to ultra-high definition. In this case, although the signal indication component of the card 1 indicates that the card 1 has five bars, the mobile phone cannot meet a requirement of the ultra-high definition video service. As a result, frame freezing occurs when the user watches the video.

Refer to a GUI shown in FIG. 5(b). The GUI includes a prompt window. The mobile phone may remind, in the prompt window, the user "Switch to the card 2 to access the network", and the mobile phone transmits the video service by using the card 2. In this case, the mobile phone may automatically perform network access card switching from the card 1 to the card 2.

In an embodiment, after the mobile phone performs network access card switching from a default mobile data card to the other card, if a network speed of the other card is limited, the mobile phone may immediately perform network access card switching from the card 2 back to the card 1. In addition, the following operations may be performed.

(1) Stop using an intelligent network access card switching function within preset time.

For example, the mobile phone suspends the intelligent network access card switching function in a current month.

For example, when the mobile phone uses the intelligent network access card switching function and switches from the card 1 to the card 2, the mobile phone determines that the network speed of the card 2 is limited. In this case, the mobile phone may disable the intelligent network access card switching function in a current month, and automatically enable the intelligent network access card switching function on the first day of a next month.

For example, the mobile phone may suspend the intelligent network access card switching function within 24 hours after detecting that the network speed of the other card is limited, and automatically resume the intelligent network access card switching function after 24 hours.

For example, the mobile phone determines, at 7:00 a.m. on the first day of a current month, that signal strength of the card 1 is less than a first preset value. When automatically performing network access card switching from the card 1 to the card 2, the mobile phone determines that the network speed of the card 2 is limited. In this case, the mobile phone may immediately switch from the card 2 back to the card 1, disable the automatic network access card switching function within 24 hours, and know that the intelligent network access card switching function is to be resumed at 7:00 a.m. on the second day of the current month.

(2) After it is detected that the network speed of the other card is limited, when signal strength or signal quality deteriorates (for example, the strength of the card 1 is less than the first preset value) or a data latency occurs after a network standard corresponding to the default mobile data card changes from a first-priority network to a second-priority network for the first time, suspend an intelligent network access card switching function; and when the foregoing case occurs on the default mobile data card for the second time, automatically resume the intelligent network access card switching function.

For example, the mobile phone determines, at 7:00 am, on the first day of a current month, that signal strength of the card 1 is less than a first preset value. After automatically performing network access card switching from the card 1 to the card 2, the mobile phone determines that the network speed of the card 2 is limited. In this case, the mobile phone may immediately switch from the card 2 back to the card 1. Then, the mobile phone determines, at 12:00 a.m. on the second day of the current month, that the signal strength of the card 1 is less than the first preset value. In this case, although a switching condition is met, the mobile phone may not perform switching because the mobile phone has determined, when switching from the card 1 to the card 2 on the first day, that the network speed of the card 2 has been limited, and the mobile phone continues transmitting the data service by using the card 1. Then, the mobile phone determines, at 6:00 p.m. on the third day of the current month, that the network standard corresponding to the card 1 changes from 4G to 3G. In this case, the mobile phone may perform network access card switching from the card 1 to the card 2.

With reference to the intelligent network access card switching methods in FIG. 3(a) to FIG. 3(j), to FIG. 5(a) and FIG. 5(b), the foregoing describes a process in which the mobile phone may automatically switch a network access card to another card when signal strength of the card in the mobile phone is relatively poor, a network standard corresponding to the card changes, or a current mobile phone service has a data latency.

In the embodiments of this application, the mobile phone may alternatively perform the foregoing operations when the network speed of the other card is limited or when the data service is not activated because the other card is in arrears. This is not limited, and the embodiments of this application are not limited to the foregoing examples.

In an embodiment, when the mobile phone determines that the user enables the intelligent network access card switching function and that the default mobile data card is using a virtual private network (virtual private network, VPN) service, the mobile phone may suspend the intelligent network access card switching function. For example, the mobile phone determines that the user enables the intelligent network access card switching function. When determining to start to transmit the VPN service by using the card 1, the mobile phone suspends the intelligent network access card switching function. Then, when determining that the card 1 is used to transmit a non-VPN service, the mobile phone automatically resumes the intelligent network access card switching function. When the signal quality or the signal strength of the card 1 is less than a preset value, or the network standard changes from the first-priority network standard to the second-priority network standard, or the data latency occurs, the mobile phone may perform network access card switching from the card 1 to the card 2.

For example, when the mobile phone determines that the user enables the intelligent network access card switching function and that the card 2 is in a roaming state, the mobile phone may suspend the intelligent network access card switching function. For example, after the mobile phone determines that the user enables the intelligent network access card selection function for a period of time, the user subscribes to an international traffic package for the card 1 but does not subscribe to an international traffic package for the card 2 when traveling abroad. In this case, the mobile phone may suspend the intelligent network access card switching function. When the user comes back home, or when the user subscribes to the international traffic package for the card 2, the mobile phone may automatically resume the intelligent network access card switching function.

In an embodiment, the mobile phone may automatically adjust, based on a moving state of the mobile phone, a time interval for switching from the other card back to the default mobile data card.

For example, the mobile phone detects, by using an acceleration sensor (for example, the acceleration sensor 180E in FIG. 1), that the mobile phone is in a high-speed moving state. When the mobile phone performs network access card switching from the default mobile data card to the other card, the mobile phone determines that it takes a relatively long time to restore the default mobile data card to a normal state. After first preset duration, the mobile phone may perform network access card switching from the other card back to the default mobile data card.

For example, the mobile phone detects, by using the acceleration sensor, that the mobile phone is in a low-speed running state or a static state. When the mobile phone performs network access card switching from the default mobile data card to the other card, the mobile phone determines that it takes a relatively short time to restore the default mobile data card to the normal state. After second preset duration, the mobile phone may perform network access card switching from the other card back to the default mobile data card. The first preset duration is longer than the second preset duration.

For example, when the user drives on a high-speed road, and the mobile phone determines that a speed of the mobile phone is greater than or equal to 80 km/h, and may determine that the mobile phone is in a high-speed moving state. If the signal quality of the card 1 deteriorates (for example, the strength of the card 1 is less than the first preset value), the mobile phone may switch from the card 1 to the card 2, and may not detect the signal quality of the card 1 within 30 minutes, or may suspend the intelligent network access card switching function within 30 minutes. After 30 minutes, if the mobile phone determines that a speed is less than 8 km/h, the mobile phone may continue to start to detect the signal quality of the card 1, or re-enable the intelligent network access card switching function.

In an embodiment, the mobile phone may automatically adjust, based on location information of the mobile phone, the time interval time for switching from the other card back to the default mobile data card.

For example, the mobile phone may obtain the location information (for example, the home of the user) of the mobile phone. At the home of the user, signal strength of the default mobile data card is less than the first preset value, and the mobile phone usually performs network access card switching from the default mobile data card to the other card. When the mobile phone performs network access card switching from the default mobile data card to the other card at a location 1, the mobile phone determines that it takes a relatively long time to restore the default mobile data card to a normal state. After third preset duration, the mobile phone may perform network access card switching from the other card back to the default mobile data card.

For example, the mobile phone may obtain the location information (for example, the company of the user) of the mobile phone. In the company of the user, signal quality of the default mobile data card is relatively good, and the mobile phone does not frequently perform network access card switching from the default mobile data card to the other card. At a moment, when the mobile phone performs network access card switching from the default mobile data card to the other card at a location 2, the mobile phone determines that it takes a relatively short time to restore the default mobile data card to the normal state. After second preset duration, the mobile phone may perform network access card switching from the other card back to the default mobile data card. The third preset duration is greater than the fourth preset duration.

In an embodiment, when the mobile phone automatically switches from the card 1 to the card 2 to access a network, and traffic used from the card 2 exceeds a preset traffic threshold, the mobile phone may remind, in a system window 601, the user whether to switch to the card 1.

FIG. 6(*a*) to FIG. 6(*c*) are schematic diagrams of another network access card switching method according to an embodiment of this application.

Refer to a GUI shown in FIG. 6(*a*). The GUI is a video playing interface of a video application. When traffic used by a user from a card 2 exceeds 800 MB in a current month, a mobile phone provides the user with "Traffic consumed in this month reaches the threshold 800 MB" in a system window 601. After detecting an operation that the user taps a control 602, the mobile phone displays a GUI shown in FIG. 6(*b*).

It should be understood that, when determining a package limit of the card 2, the mobile phone may remind the user when the traffic consumed from the card 2 reaches 80% of the package limit. In an embodiment, the user may adjust the threshold. For example, when the traffic consumed by the mobile phone from the card 2 reaches 70% of the package limit (that is, the traffic consumed by the mobile phone from the card 2 reaches 700 MB), the mobile phone reminds the user.

In an embodiment, after the traffic used by the mobile phone from the card 2 reaches the threshold, the mobile phone may further remind the user by using a text "Remaining traffic of the card 2 is 200 MB".

Refer to the GUI shown in FIG. 6(*b*). After detecting the operation that the user taps the control 602, the mobile phone may perform network access card switching back to a card 1, to watch a video by using traffic of the card 1.

Refer to a GUI shown in FIG. 6(*c*). The GUI is a dual-card management setting interface. After detecting an operation that the user taps the window 601, the mobile phone may display the GUI shown in FIG. 6(*c*). When the mobile phone detects an operation that the user slides a control 603 to the left or taps a control 603, the mobile phone may disable an intelligent network access card switching function.

It should be understood that, after detecting the operation that the user taps the control 602, the mobile phone may perform network access card switching from the card 2 back to the card 1. In this case, the mobile phone may not disable the intelligent network access card switching function. Then, when signal strength of the card 1 is less than a first preset value, the mobile phone may further perform network access card switching from the card 1 to the card 2. The mobile phone may further remind that the traffic of the card 2 exceeds the limit in a current month. For example, when the traffic consumed from the card 2 reaches 850 MB, 900 MB, or 950 MB, the mobile phone reminds the user about switching to the card 1 or reminds the user to disable the intelligent network access card switching function.

It should be further understood that, when the mobile phone detects that the user taps a control "Ignore", the mobile phone may continue using the card 2 to access a network. Then, when the signal strength of the card 1 is greater than the first preset value, the mobile phone may automatically switch from the card 2 back to the card 1. Alternatively, when the mobile phone continues using the traffic of the card 2 and the traffic exceeds a specific limit, the mobile phone also reminds the user. For example, when the traffic consumed from the card 2 reaches 850 MB, 900 MB, or 950 MB, the mobile phone reminds the user about switching back to the card 1 or reminds the user to disable the intelligent network access card switching function.

FIG. 7(*a*) to FIG. 7(*c*) are schematic diagrams of another network access card switching method according to an embodiment of this application.

Refer to FIG. 7(*a*). A GUI is a video playing interface of a video application. When traffic used by a user from a card 2 reaches the threshold 100 MB on a current day, a mobile phone may remind the user "Traffic consumed today reaches the threshold 100 MB" in a system window 701. After detecting an operation that the user taps a control 702, the mobile phone displays a GUI shown in FIG. 7(*b*). After detecting an operation that the user taps the system window 701, the mobile phone displays a GUI shown in FIG. 7(*c*).

In an embodiment, after the traffic used by the mobile phone from the card 2 reaches the threshold, the mobile phone may further remind the user "Traffic consumed today reaches a threshold of 100 MB, and remaining traffic from the card 2 is 900 MB".

Refer to the GUI shown in FIG. 7(*b*). After the mobile phone detects the operation that the user taps the control 702, the mobile phone performs network access card switching from the card 2 to a card 1.

Refer to the GUI shown in FIG. 7(*c*). The GUI is a dual-card management setting interface of the mobile phone. After detecting the operation that the user taps the window 701, the mobile phone may display the GUI shown in FIG. 7(*c*). When the mobile phone detects an operation that the user slides a control 703 to the left or taps a control 703, the mobile phone may disable an intelligent network access card switching function.

It should be understood that, after detecting the operation that the user taps the control 702, the mobile phone may perform network access card switching from the card 2 back to the card 1. In this case, the mobile phone may not disable the intelligent network access card switching function. Then, when signal strength of the card 1 is less than a first preset value, the mobile phone may further perform network access card switching from the card 1 to the card 2. The mobile phone may further remind that the traffic of the card 2 exceeds the limit in a current month. For example, when the traffic consumed from the card 2 on a current day reaches 150 MB, 200 MB, or the like, the mobile phone may also remind the user about switching back to the card 1 or remind the user to disable the intelligent network access card switching function.

It should be further understood that, when the mobile phone detects that the user taps a control "Ignore", the mobile phone may continue using the card 2 to access a network. Then, when the signal strength of the card 1 is greater than the first preset value, the mobile phone may automatically switch from the card 2 back to the card 1. Alternatively, when the mobile phone continues using the traffic of the card 2 and the traffic exceeds a specific limit, the mobile phone also reminds the user. For example, when the traffic consumed from the card 2 on a current day reaches 150 MB, 200 MB, or the like, the mobile phone may also remind the user about switching back to the card 1 or remind the user to disable the intelligent network access card switching function.

Figure 8A:
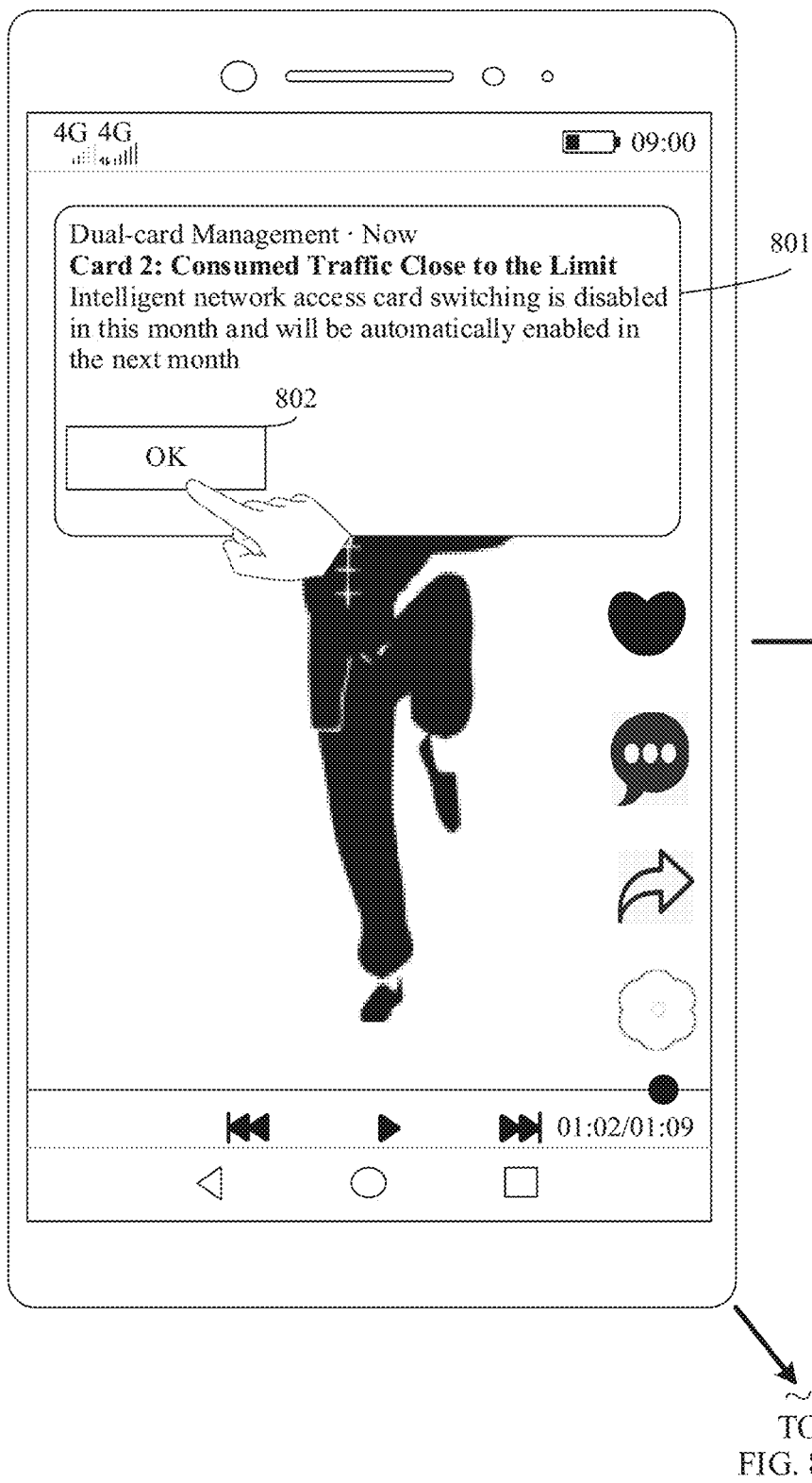
FIG. 8(a) to FIG. 8(c) are schematic diagrams of another network access card switching method according to an embodiment of this application.
Figure 8B:
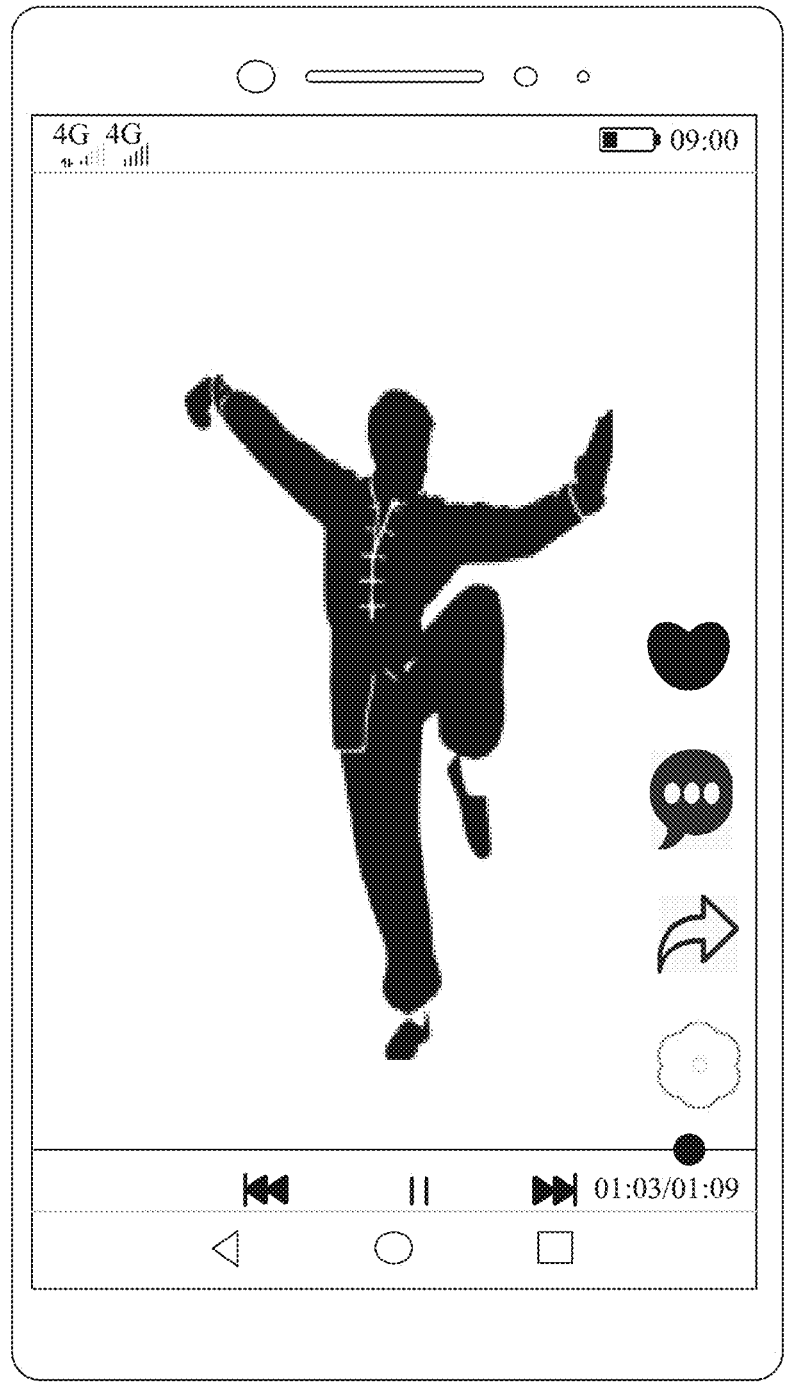
Figure 8C:
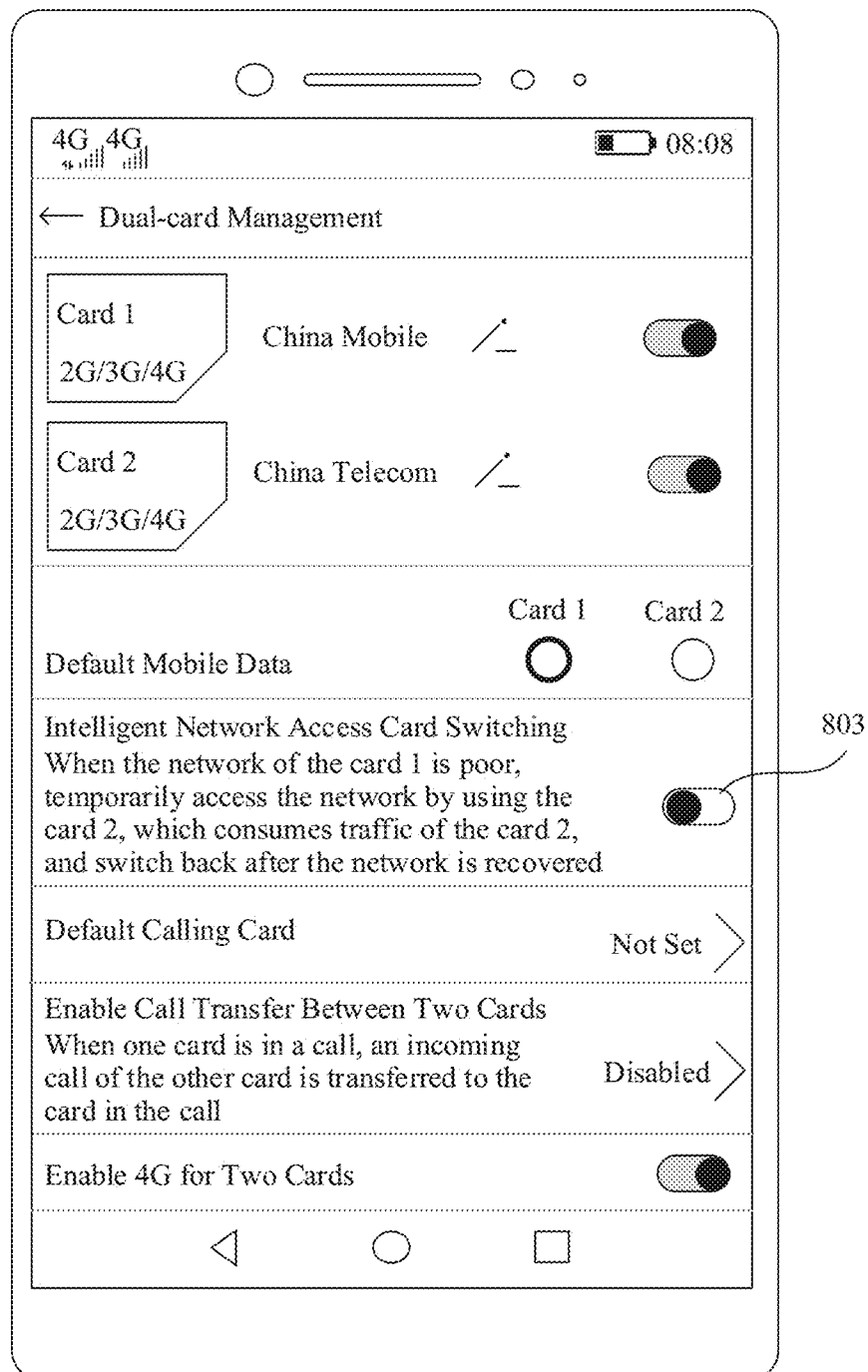

FIG. 8(a) to FIG. 8(c) are schematic diagrams of another network access card switching method according to an embodiment of this application.

Refer to a GUI shown in FIG. 8(a). The GUI is a video playing interface of a video application. When traffic consumed from a card 2 is close to a package limit of the card 2, a mobile phone may automatically disable an intelligent network access card switching function and remind a user "Intelligent network access card switching is disabled in this month and will be automatically enabled in the next month" in a system window 801. After detecting an operation that the user taps a control 802, the mobile phone displays a GUI shown in FIG. 8(b). After detecting an operation that the user taps the system window 801, the mobile phone displays a GUI shown in FIG. 8(c).

Refer to the GUI shown in FIG. 8(b). The mobile phone may perform network access card switching from the card 2 back to a card 1, and the user may continue to watch a video by using traffic of the card 1.

Refer to the GUI shown in FIG. 8(c). The GUI is a dual-card management setting interface of the mobile phone. After detecting the operation that the user taps the window 801, the mobile phone may display the GUI shown in FIG. 8(c). A difference between FIG. 8(c) and FIG. 6(c) or FIG. 7(c) lies in: the intelligent network access card switching function in FIG. 8(c) is disabled. If the user wants to continue to use the traffic of the card 2, the user may select to re-enable the function.

It should be understood that, when the user enables "Unlimited traffic" in the package setting interface for the card 2 shown in FIG. 3(f), the mobile phone may not remind a traffic usage status of the card 2 in a process of consuming the traffic from the card 2.

With reference to FIG. 6(a) to FIG. 6(c), to FIG. 8(a) to FIG. 8(c), the foregoing provides a description that, after the user sets the package limit of the card 2, the mobile phone may remind the user about switching back to the card 1 or remind the user to disable the intelligent network access card switching function when the traffic consumed from the card 2 in a current month reaches the threshold, the traffic consumed on a current day reaches the threshold, or the traffic consumed in a current month is close to the package limit. FIG. 9(a) to FIG. 9(e) are schematic diagrams of another network access card switching method according to an embodiment of this application. In the method, a manner used by a mobile phone to remind a user when the mobile phone does not learn of a package limit of a card 2 is described.

Figure 9A:
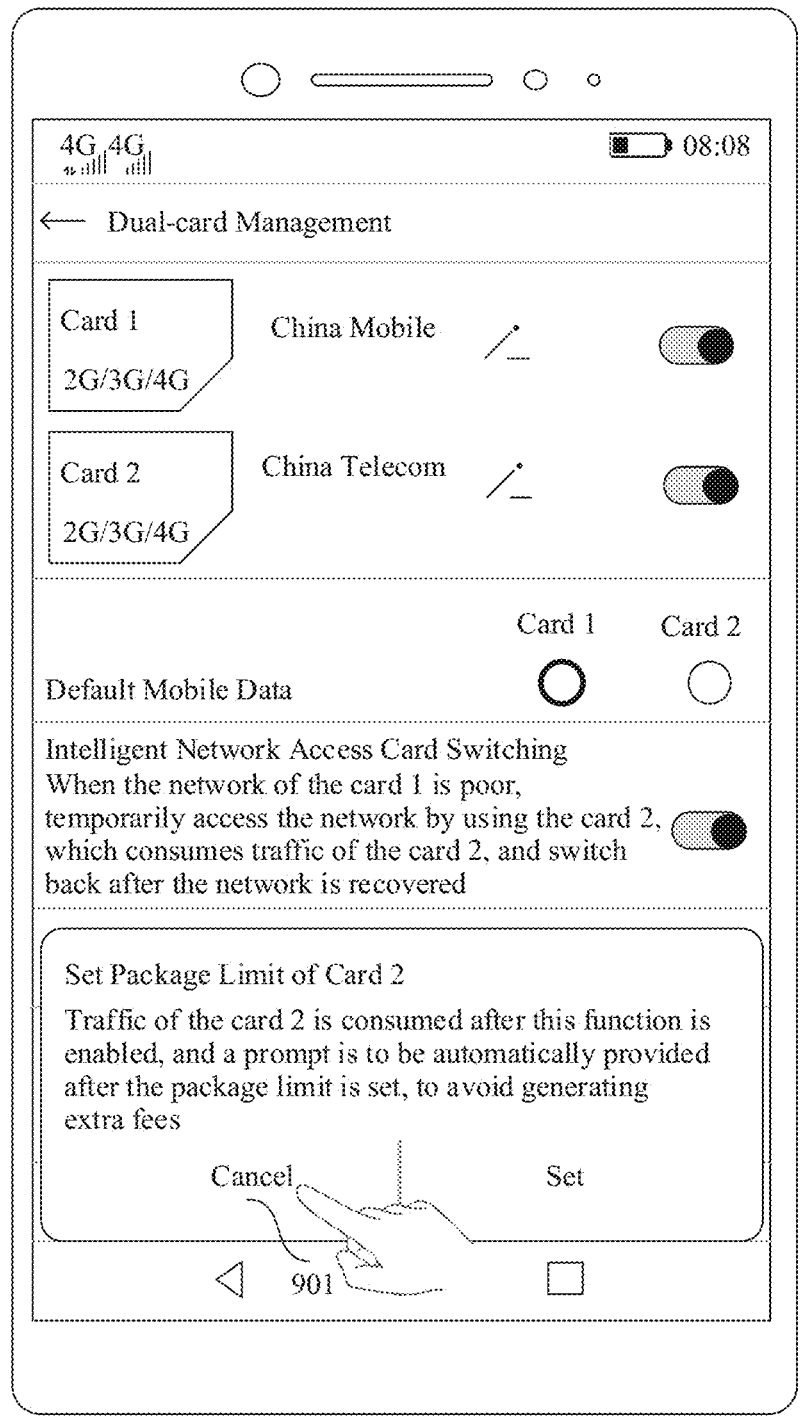
FIG. 9(a) to FIG. 9(e) are schematic diagrams of another network access card switching method according to an embodiment of this application.

Refer to a GUI shown in FIG. 9(a). The GUI is a dual-card management setting interface of the mobile phone. After the mobile phone detects that the user enables an intelligent network access card switching function, the mobile phone may remind the user to set the package traffic of the card 2. In this case, the user may not set the package limit of the card 2. After detecting an operation that the user taps a control 901, the mobile phone displays a GUI shown in FIG. 9(b).

Figure 9B:
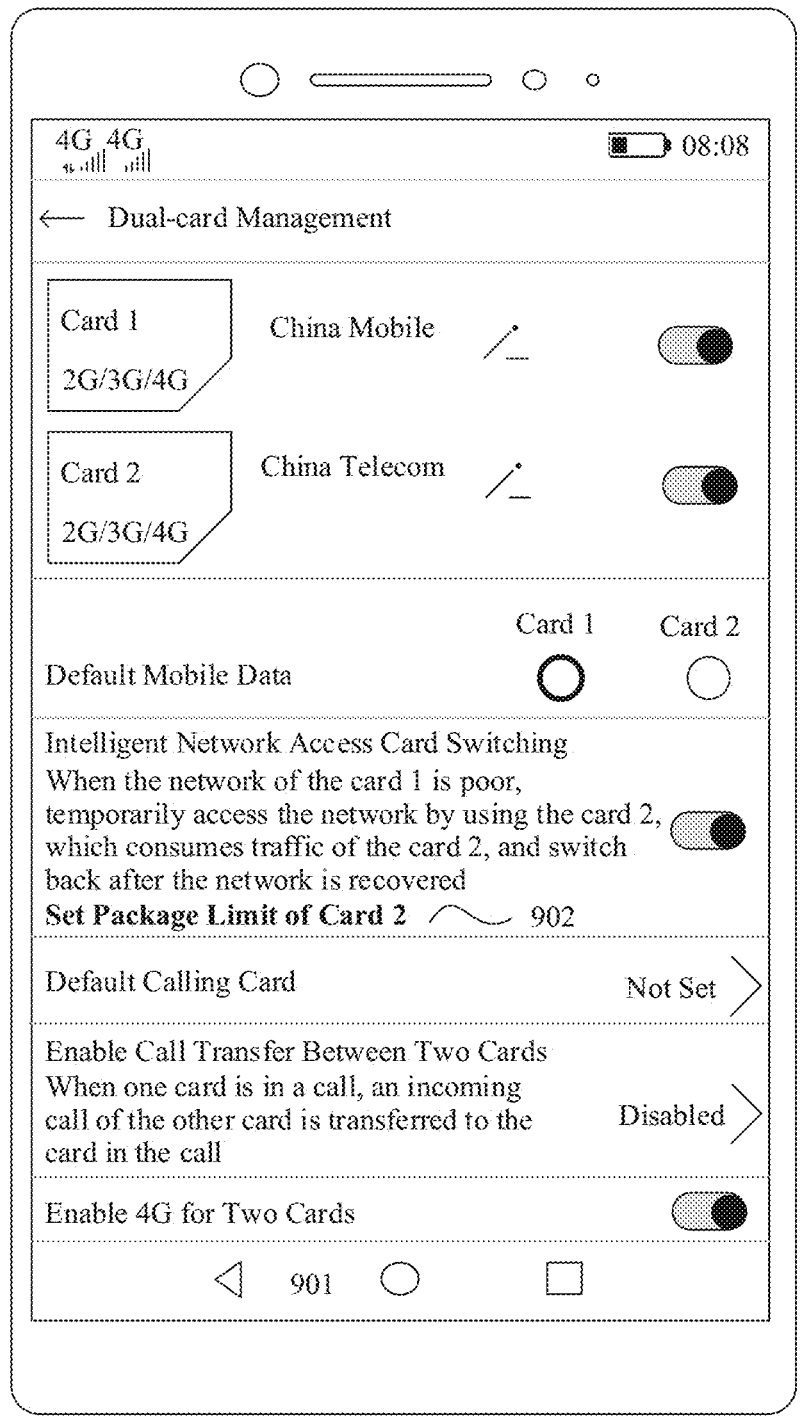

Refer to the GUI shown in FIG. 9(b). The GUI is another dual-card management interface of the mobile phone. The GUI includes a control 902 "Set package limit of card 2". When the user wants to set the package limit of the card 2, the user may tap the control 902 in the GUI. After detecting an operation that the user taps the control 902, the mobile phone may display the GUI shown in FIG. 3(f), and the user may set the package limit of the card 2 in the package setting interface for the card 2.

Figure 9C:
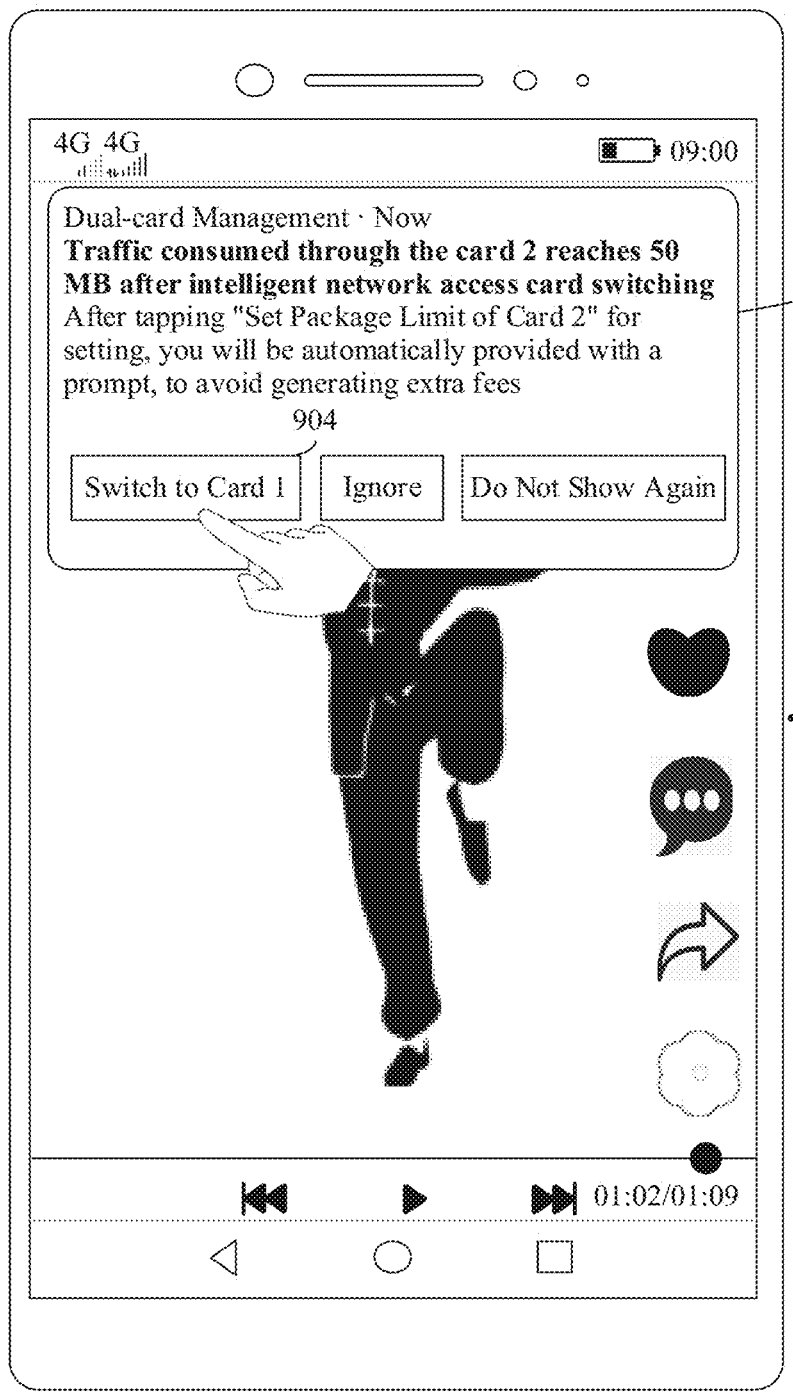

Refer to a GUI shown in FIG. 9(c). The GUI is a video playing interface of a video application. Because the user does not set the package limit of the card 2, when the traffic consumed from the card 2 reaches a threshold, the mobile phone may remind the user "Traffic consumed from the card 2 reaches 50 MB after intelligent network access card switching. After tapping 'Set package limit of the card 2', you will be automatically provided with a prompt, to avoid generating extra fees" in a system window 903. After detecting an operation that the user taps a control 904, the mobile phone displays a GUI shown in FIG. 9(d). After detecting an operation that the user taps the system window 903, the mobile phone may display a GUI shown in FIG. 9(e).

Figure 9D:
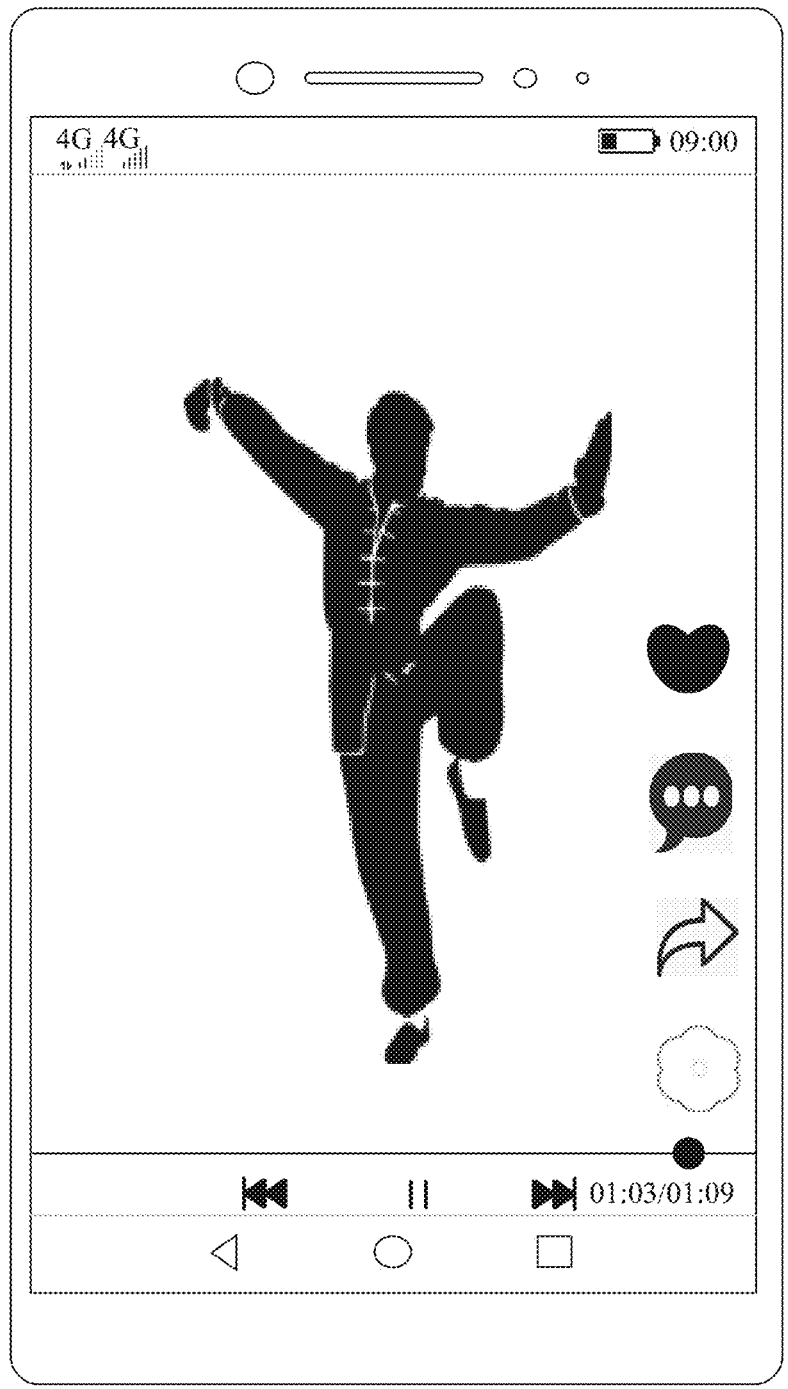

Refer to the GUI shown in FIG. 9(d). After the mobile phone detects the operation that the user taps the control 904, the mobile phone may perform network access card switching from the card 2 back to a card 1. Then, when signal strength of the card 1 is less than a first preset value, the mobile phone may further perform network access card switching from the card 1 to the card 2. The mobile phone may further remind the user about switching to the card 1 or remind the user to set the traffic limit of the card 2 when the traffic consumed from the card 2 reaches another threshold. For example, when the traffic consumed from the card 2 reaches an integer multiple of 50 MB, the mobile phone may remind the user about a traffic usage status of the card 2 in the system window.

Figure 9E:
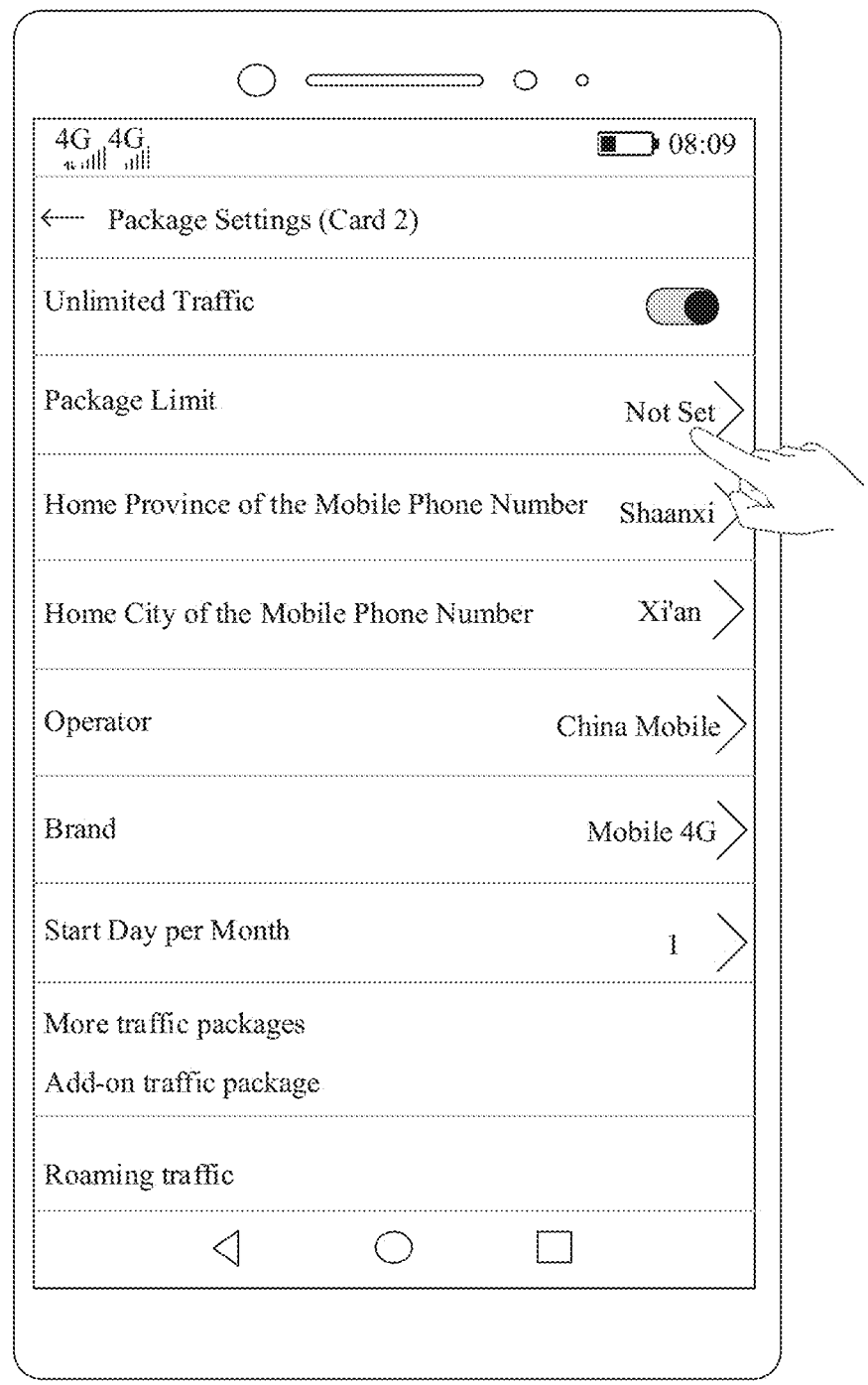

Refer to the GUI shown in FIG. 9(e). The GUI is a package setting interface for the card 2. After detecting the operation that the user taps the system window 903, the mobile phone may display the GUI, and the user may set the package limit of the card 2 in the package setting interface for the card 2.

It should be understood that, if the user sets the package limit of the card 2 in the package setting interface for the card 2, the mobile phone may remind the user about the traffic usage status of the card 2 in a manner shown in FIG. 6(a) to FIG. 6(c), FIG. 7(a) to FIG. 7(c), or FIG. 8(a) to FIG. 8(c).

It should be further understood that, in the GUI shown in FIG. 9(c), when detecting that the user taps a control "Ignore", the mobile phone may close the system window 903. Then, the mobile phone may further remind the user about switching to the card 1 or remind the user to set the traffic limit of the card 2 when the traffic consumed from the card 2 reaches the another threshold. For example, when the traffic consumed from the card 2 reaches the integer multiple of 50 MB, the mobile phone may remind the user about the traffic usage status of the card 2 in the system window.

It should be further understood that, when the mobile phone detects that the user taps a control "Do not show again", the mobile phone will no longer remind the user about the traffic usage status of the card 2.

In an embodiment, when the mobile phone performs network access card switching from the card 1 to the card 2, and the traffic used from the card 2 exceeds a preset threshold, a text (for example, a system window) prompt or a voice prompt may be used to remind the user that the traffic used from the card 2 exceeds the threshold. The preset threshold may be preset when the mobile phone is delivered from a factory. For example, the threshold may be 50 MB.

In an embodiment, the user may set the threshold in an interface provided by the mobile phone. For example, the mobile phone may add a threshold selection interface in the dual-card management interface. For example, the threshold selection interface may provide a plurality of threshold options, for example, 100 MB, 200 MB, and 300 MB. The user may select a threshold according to a requirement of the user. When detecting that the traffic consumed from the card 2 reaches the threshold, the mobile phone may remind the user about network access card switching from the card 2 to the card 1.

In an embodiment, the user may further select an application for which the user expects to enable intelligent network access card switching.

FIG. 10(a) to FIG. 10(d) are schematic diagrams of another network access card switching method according to an embodiment of this application.

Figure 10A:
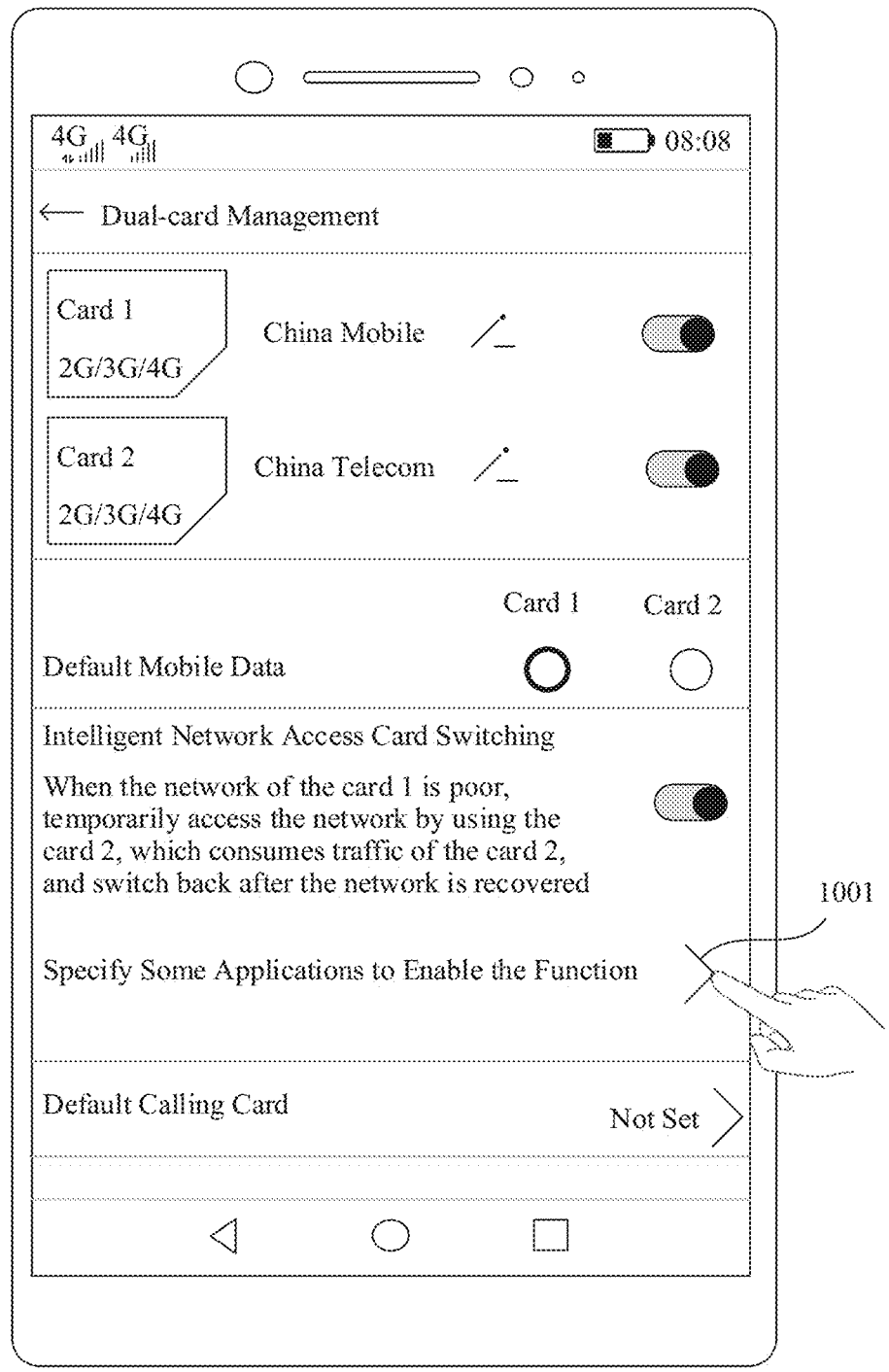
FIG. 10(a) to FIG. 10(d) are schematic diagrams of another network access card switching method according to an embodiment of this application.

Refer to a GUI shown in FIG. 10(a). The GUI is another dual-card management function setting interface of a mobile phone. Compared with the dual-card management function setting interface shown in FIG. 3(d), the interface provides another selection function for a user, and the user may select that an intelligent network access card switching function is enabled for some applications. After detecting an operation that the user taps a control 701, the mobile phone displays a GUI shown in FIG. 7(b).

Figure 10B:
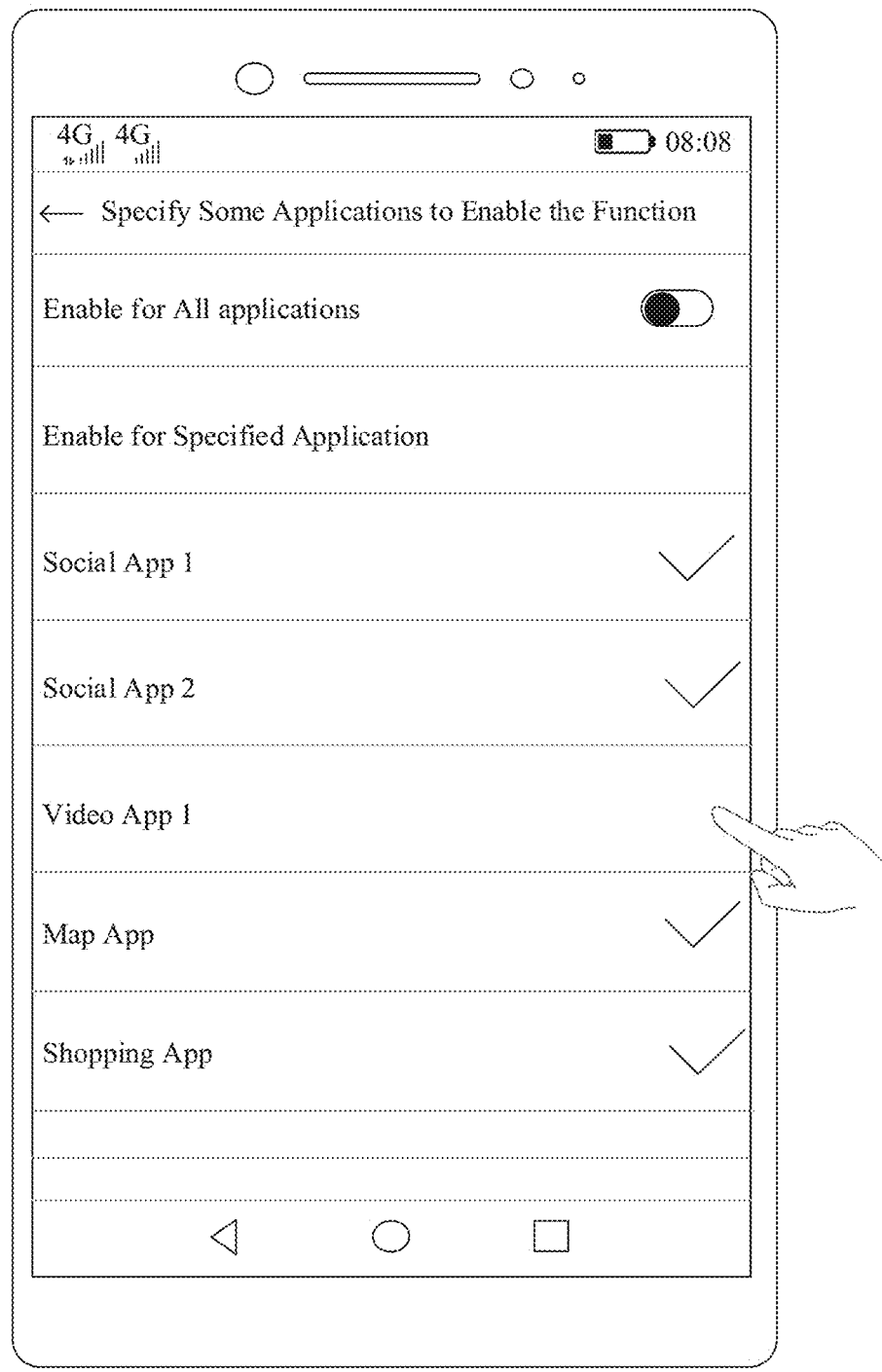

Refer to the GUI shown in FIG. 10(b). The user may enable the intelligent network access card switching function in a process of selecting one or more applications in the GUI. The user may select that the intelligent network access card switching function is enabled for all applications on the mobile phone, or is enabled for a specified application. For example, in FIG. 7(b), the user may specify that the intelligent network access card switching function is enabled for a social app 1, a social app 2, a map app, and a shopping app 1, but is disabled for a video app 1.

Figure 10C:

Refer to a GUI shown in FIG. 10(c). The GUI is a video playing interface of the video app 1.

Figure 10D:
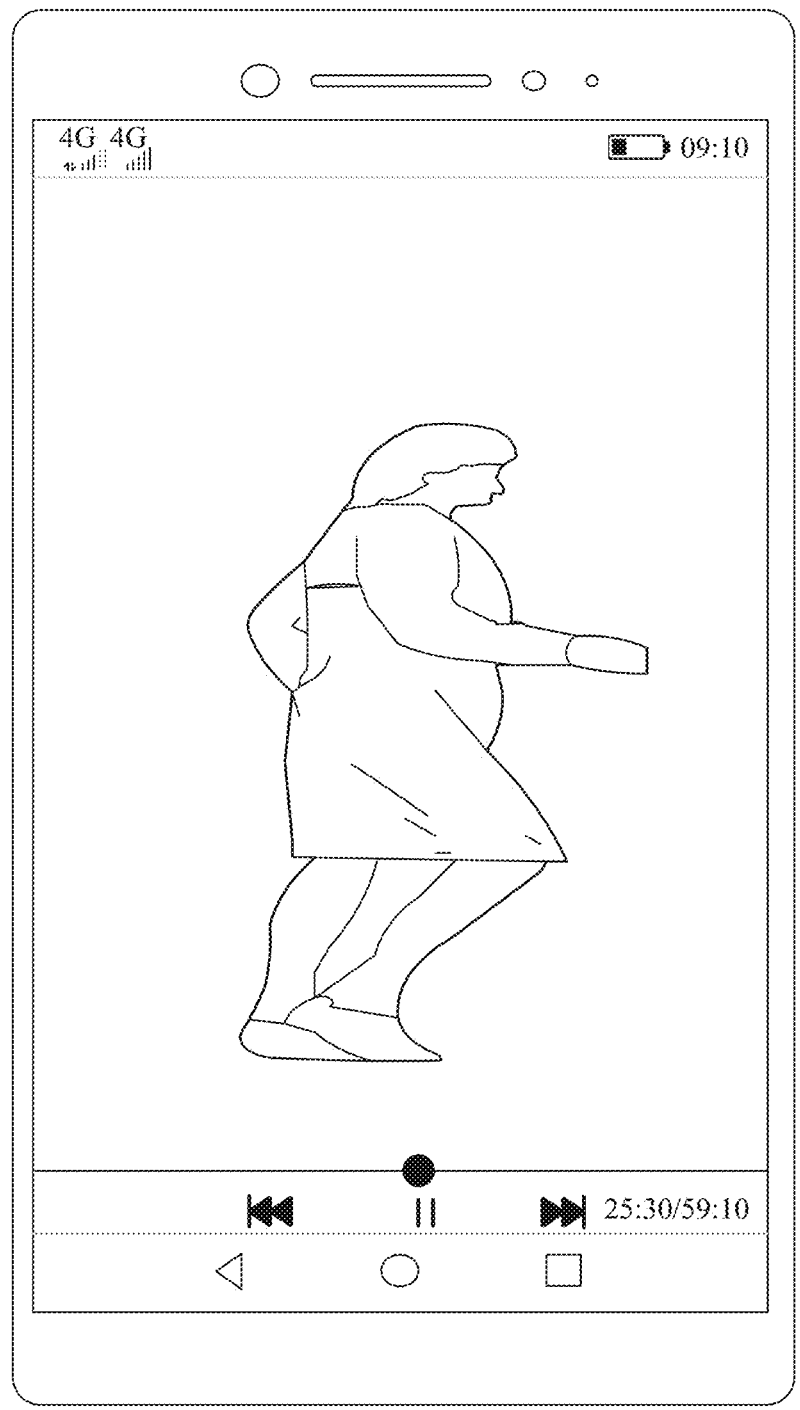

Refer to a GUI shown in FIG. 10(d). When signal strength or signal quality of a card 1 deteriorates (for example, the strength of the card 1 is less than a first preset value), and a signal indication control of the card 1 indicates that signal bars of the card 1 change from five bars to two bars, the mobile phone may not perform network access card switching from the card 1 to a card 2.

It should be understood that, in a video playing process, if the card 1 is automatically switched to the card 2, the user may need to watch information such as an advertisement again. This may affect user experience. However, when the signal strength or the signal quality of the card 1 deteriorates (for example, the strength of the card 1 is less than the first preset value), the mobile phone may have buffered a video for a period of time, and the user may still normally watch the video without being affected by the card 1. Therefore, for some specified applications, the user may select not to enable the intelligent network access card switching function.

With reference to several GUIs in FIG. 3(a) to FIG. 3(j), to FIG. 7(a) to FIG. 7(c), the foregoing describes a process in which the user enables the intelligent network access card switching function in the dual-card management function to perform automatic switching between the card 1 and the card 2. With reference to GUIs in FIG. 11(a) to FIG. 11(c), the following describes a process in which an interface prompt is used to remind a user whether to enable the intelligent network access card switching function.

Figure 11A:
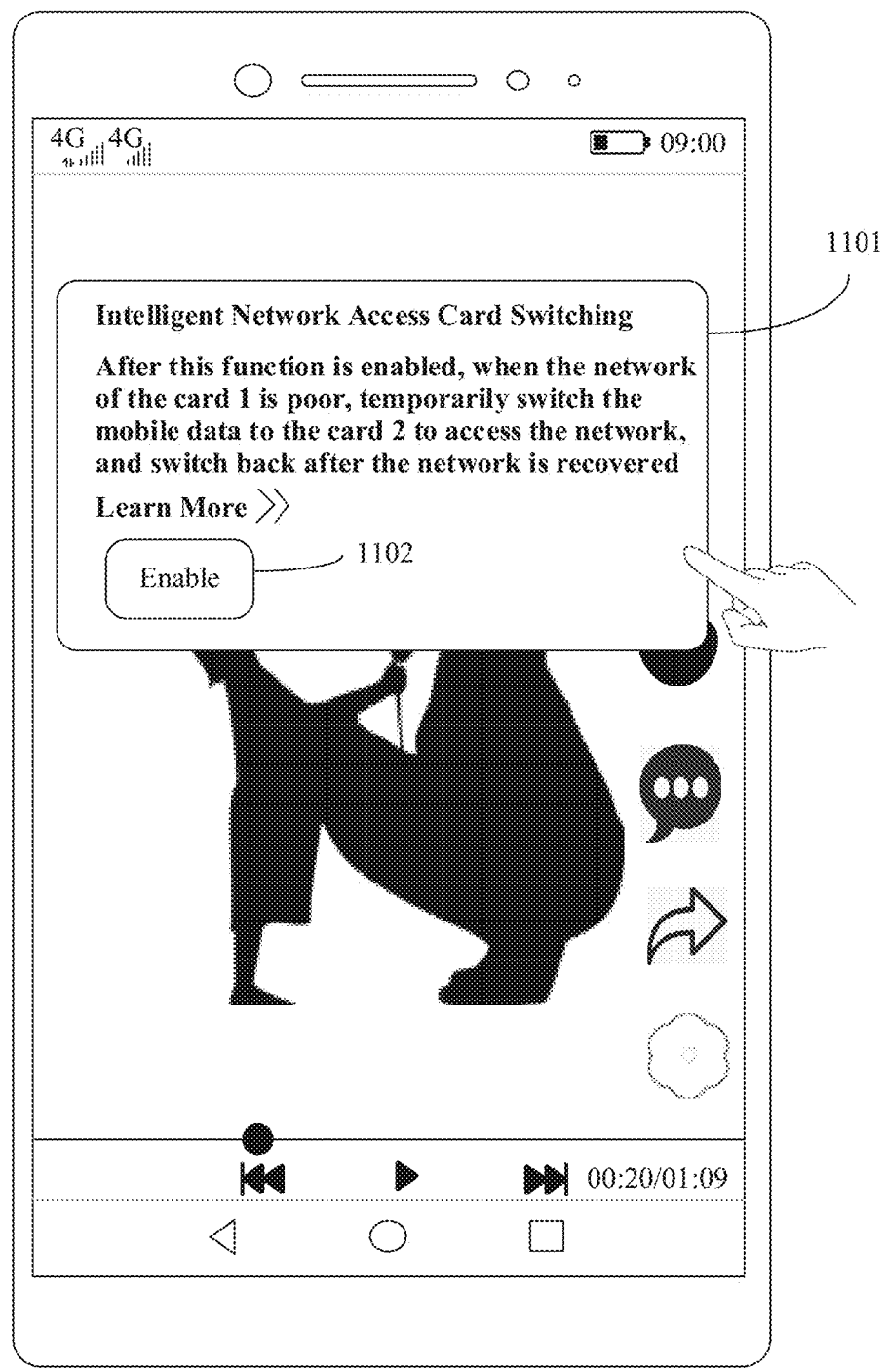
FIG. 11(a) to FIG. 11(c) are schematic diagrams of another network access card switching method according to an embodiment of this application.
Figure 11B:
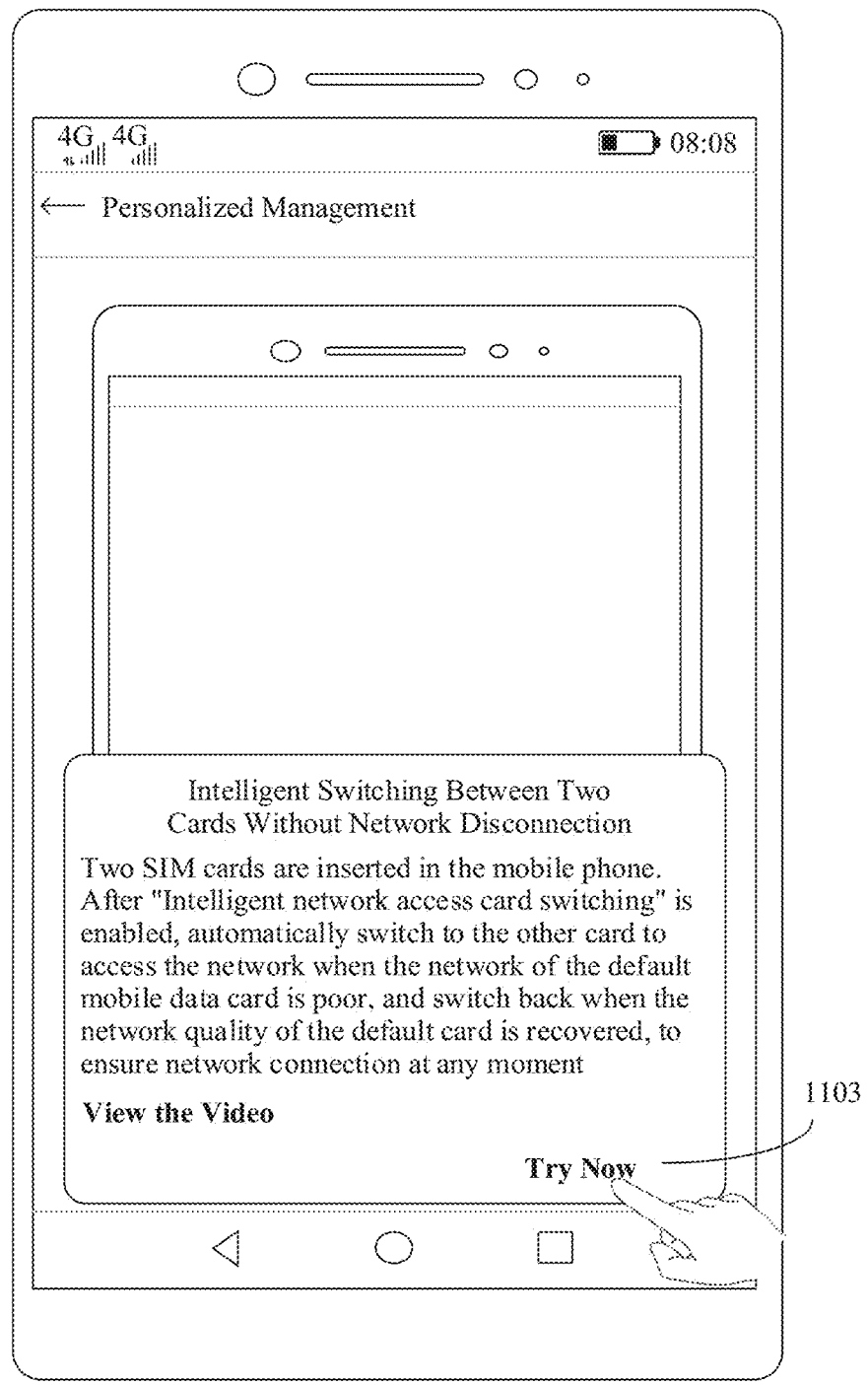
Figure 11C:
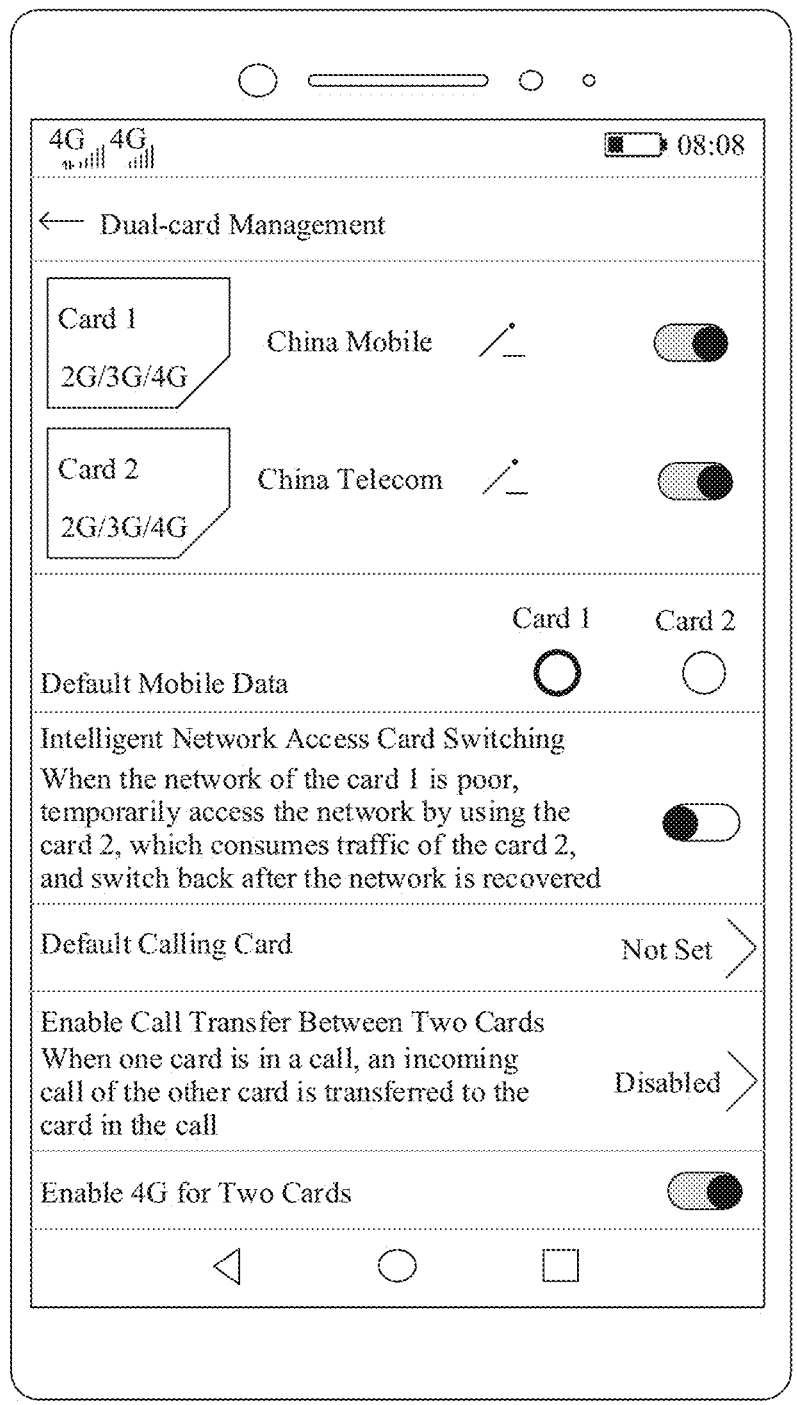

FIG. 11(a) to FIG. 11(c) are schematic diagrams of another network access card switching method according to an embodiment of this application.

Refer to a GUI shown in FIG. 11(a). The GUI is a video playing interface of a video application. When the user watches a video through the video application, a mobile phone may remind the user about the intelligent network access card switching function "After this function is enabled, when the network of the card 1 is poor, temporarily switch the mobile data card to the card 2 to access the network, and switch back after the network is recovered" in a system window 1101. After detecting an operation that the user taps the system window 1101, the mobile phone may display a GUI shown in FIG. 11(b).

Refer to the GUI shown in FIG. 11(b). The GUI is an interface for introducing the intelligent network access card switching function. The interface for introducing the function may display a description of the intelligent network access card switching function "Two SIM cards are inserted in the mobile phone. After intelligent network access card switching is enabled, the mobile phone automatically switches to the other card to access the network when the network of the default mobile data card is poor, and switches back when the network quality of the default card is recovered, to ensure network connection at any moment". After detecting an operation that the user taps a control 1103, the mobile phone displays a GUI shown in FIG. 11(c).

Refer to the GUI shown in FIG. 11(c). The GUI is a dual-card management setting interface of the mobile phone. The user may select to enable the intelligent network access card switching function in the setting interface.

Figure 12:
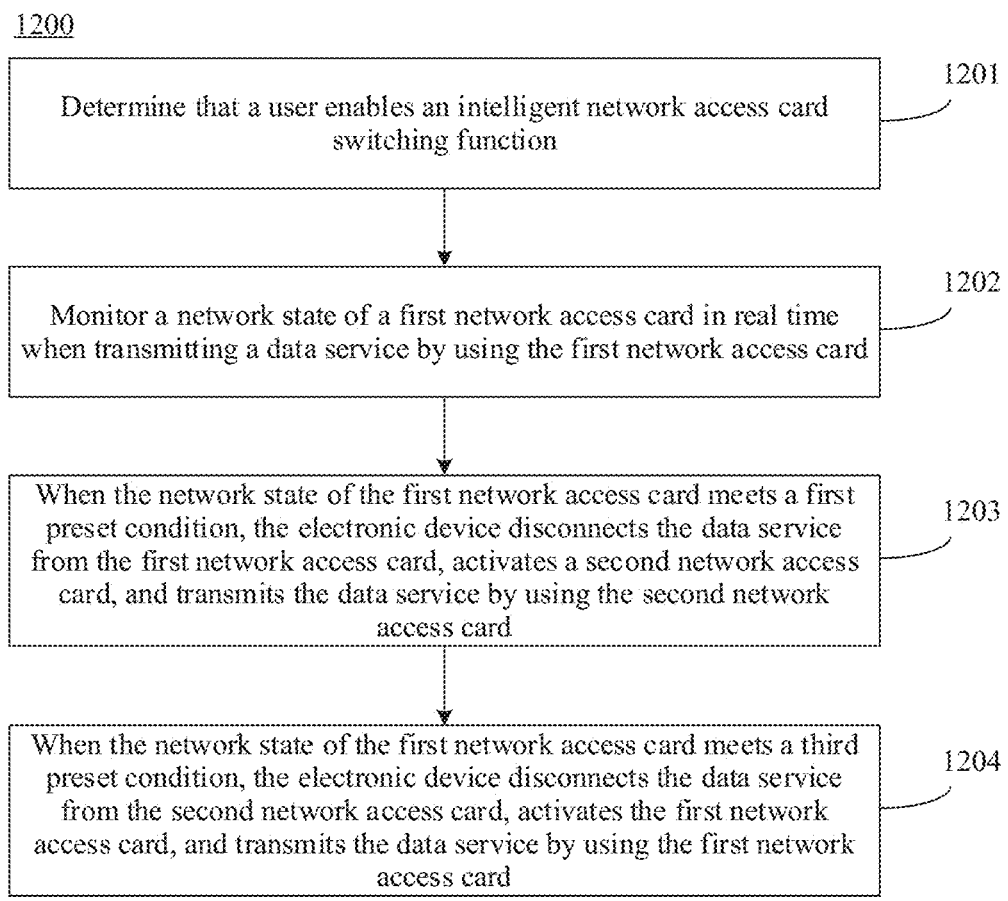
FIG. 12 is a schematic flowchart of a network access card switching method according to an embodiment of this application.

FIG. 12 is a schematic flowchart of a network access card switching method 1200 according to an embodiment of this application. The method is applied to an electronic device provided with a plurality of cards. For example, the electronic device includes a first network access card and a second network access card (for example, a card 1 and a card 2), and the electronic device uses the card 1 as a default mobile data card. As shown in FIG. 12, the method includes the following steps.

S1201: The electronic device determines that a user enables an intelligent network access card selection function.

For example, as shown in FIG. 3(d), the operation may be an operation that the user slides the control 304 to the right or taps the control 304.

For example, before a mobile phone determines that the user enables the intelligent network access card selection function, the mobile phone may perform an initialization process.

When the electronic device is started, the electronic device may determine information such as the default mobile data card selected by the user from the card 1 and the card 2, operators to which the card 1 and the card 2 belong, and package limits of the card 1 and the card 2.

For example, a process in which the electronic device performs initialization includes:

The electronic device initiates registration request information to a network through a non-access stratum (non-access stratum, NAS) layer.

For example, when the electronic device is started, the electronic device may initiate a registration request to the network (for example, a core network (core network, CN)) through the non-access stratum (non-access stratum, NAS) layer. When the electronic device receives registration request response information that is sent by the network and that is used to indicate that the electronic device is successfully registered, the electronic device may camp on the networks of the operators.

For example, the process in which the electronic device performs initialization further includes:

The electronic device sends data service activation request information to the network through the NAS layer.

When the electronic device detects that the user enables data traffic of the card 1, the electronic device may send the data service activation request information to the network through the NAS layer. If the network determines that the electronic device is not in arrears or the like, the network may send data service activation request response information to the electronic device. When receiving the data service activation request response information, the electronic device determines that the network allows the electronic device to transmit a data service. In this case, a data service of the card 1 is activated. Although the card 2 camps on a cell of the operator to which the card 2 belongs, a data service of the card 2 is in an inactivation state. In an embodiment, when the electronic device is started, the electronic device may automatically enable data traffic of the default mobile data card, and the electronic device may send the data service activation request information to the network after successfully registering with the network.

In an embodiment, when the electronic device is started, the electronic device may register with the network. After successfully registering with the network, the electronic device may perform a normal call service. In this case, the data service of the card 1 and the data service of the card 2 may be still in a deactivation state. When detecting that the user enables the traffic of the card 1, the electronic device may send the data service activation request information to the network of the operator to which the card 1 belongs. When receiving the data service activation request response information sent by the network, the electronic device may transmit the data service by using the card 1.

For example, the electronic device may obtain information about the operators to which the card 1 and the card 2 belong in the following manners.

The electronic device may determine, based on a public land mobile network (public land mobile network, PLMN) sent by a network on which the electronic device currently camps, the operator to which the card 1 or the card 2 belongs. For example, if the electronic device receives that a PLMN sent by a cell of the operator to which the card 1 belongs is 46000, the electronic device may determine that the operator to which the card 1 belongs is China Mobile. If the electronic device receives that a PLMN sent by a cell of the operator to which the card 2 belongs is 46001, the electronic device may determine that the operator to which the card 2 belongs is China Unicorn.

For example, the electronic device may determine that the card 1 is the default mobile data card used by the user, and determine the operators to which the card 1 and the card 2 belong, traffic packages of the card 1 and the card 2 in a current month, and accumulated traffic usage statuses of the card 1 and the card 2. For example, the operator of the card 1 is China Mobile, and the traffic package limit is 100 GB in the current month: and the operator of the card 2 is China Telecom, and the traffic package limit is 1 GB in the current month.

It should be understood that, for a process in which the mobile phone determines the package limits of the card 1 and the card 2, reference may be made to the descriptions in the foregoing embodiments. For brevity, details are not described herein again.

It should be further understood that in this embodiment of this application, the first network access card and the second network access card may be SIM cards, virtual cards, eSIM cards, or the like, or may be other cards having a network access function. This is not limited in this embodiment of this application.

S1202: The electronic device monitors a network state of the first network access card in real time when transmitting the data service by using the first network access card.

For example, the network state of the card 1 includes one or more parameters of signal quality, signal strength, a network standard, and a data latency during use of the card 1 by the electronic device.

The signal strength and the signal quality (the following uses a long term evolution (long term evolution, LTE) system as an example for description) in this embodiment of this application may include one or more of the following parameters.

(1) Reference signal received power (reference signal received power, RSRP). The reference signal received power is also referred to as a received signal strength absolute value and is used to measure downlink coverage. The reference signal received power is a linear value (power of each resource element (resource element, RE)) of power of a downlink common pilot in a cell within a measurement bandwidth. When there are a plurality of receive antennas, measurement results of the plurality of antennas need to be compared, and a reported value is not less than an RSRP value corresponding to any receive antenna, that is, max (RSRP00, RSRP01). The reference signal received power is signal power S. This parameter reflects path loss strength of a current channel and is used for cell coverage measurement, cell selection or reselection, cell handover, and the like. A value of the RSRP ranges from −140 dBm to −44 dBm. A larger value indicates that signal quality is better.

(2) Received signal strength indicator (received signal strength indicator, RSSI): The received signal strength indicator is total received power of all REs on an orthogonal frequency division multiplexing (orthogonal frequency division multiplexing, OFDM) symbol within a detection bandwidth of the electronic device (if a system bandwidth is 20 M, when there is no downlink data, the total received power is a sum of received power of 200 pilot REs; and when there is downlink data, the total received power is a sum of received power of 1200 REs). The total received power includes power of a serving cell and a non-serving cell, power of interference from an adjacent channel, power of a thermal noise in the system, and the like. To be specific, the total power is S+I+N, where I is the interference power and N is the noise power. This parameter reflects received signal strength and interference of a current channel.

(2) Reference signal received quality (reference signal received quality. RSRQ): The reference signal received quality is M*RSRP/RSSI, where M is a quantity of RBs within an RSSI measurement bandwidth, that is, a total quantity of RBs within a system bandwidth. This parameter reflects a signal-to-noise ratio and an interference level of current channel quality. To ensure that the measured RSRQ is a negative value and is consistent with the RSRP, the RSRP defines signal power of a single RE, and the RSSI defines total received power of all REs on an OFDM symbol. A value of the RSRQ may range from −19.5 to −3. A larger value indicates that signal quality is better.

(3) Signal-to-interference-plus-noise ratio (signal-to-interference-plus-noise ratio, SINR): The signal-to-interference-plus-noise ratio is a ratio of strength of a received wanted signal to strength of a received interference signal (noise and interference), namely, a ratio of reference power to interference noise power within a measurement bandwidth of the electronic device, that is, S/(I+N), where the signal power S is received power of a cell-specific reference signal (cell-specific reference signal, CRS), and I+N is a sum of power of a non-serving cell on a reference signal, power of interference in adjacent channels, and power of a thermal noise in the system. This parameter reflects link quality of a current channel, and is an important indicator for measuring a performance parameter of the electronic device. A value of the SINR may range from 0 to 30. A larger value indicates that signal quality is better.

It should be understood that the signal strength may include the RSRP and the RSSI, and the signal quality may include the RSRQ and the SINR For example, Table 1 shows a correspondence between a network state and a value of a corresponding parameter.

TABLE 1

A correspondence between a network state and a value of a corresponding parameter

| Network state | Value of a corresponding parameter | |
| --- | --- | --- |
| | RSRP | SINR |
| Very good | >−85 dBm | >25 dB |
| Relatively good | −95 dBm to −85 dBm | 16 dB to 25 dB |
| Medium | −105 dBm to −95 dBm | 11 dB to 15 dB |
| Relatively poor | −115 dBm to −105 dBm | 3 dB to 10 dB |
| Very poor | <−115 dBm | <3 dB | dB is a value that represents a relative value. For example, when power of A is greater than or less than power of B by a dB value, a calculation formula 10lg (the power of A/the power of B) may be used. For example, the power of A is twice the power of B. In this case, 10lg (the power of A/the power of B) is equal to 10lg2, and a value of 10lg2 is approximately 3 dB. For example, a transmission loss of a ⅞-inch GSM900 feeder is about 3.9 dB at a transmission distance of 100 m. For example, the power of A is 46 dBm, and the power of A is 40 dBm. In this case, A is 6 dBm greater than B. For example, if power of an antenna A is 12 dBm and power of an antenna B is 14 dBm, the power of antenna A is 2 dB less than the power of the antenna B.

For example, when detecting that an RSRP value is greater than −115 dBm, the electronic device may determine that the signal quality of the electronic device is relatively good; or when detecting that an RSRP value is less than or equal to −115 dBm, the electronic device may determine that the signal quality of the electronic device is relatively poor.

For example, when detecting that an RSRQ value is greater than −15 dB, the electronic device may determine that the signal quality of the electronic device is relatively good; or when detecting that an RSRQ value is less than or equal to −15 dB, the electronic device may determine that the signal quality of the electronic device is relatively poor.

For example, when detecting that a SINR value is greater than 15 dB, the electronic device may determine that the signal quality of the electronic device is relatively good; or when detecting that a SINR value is less than 15 dB, the electronic device may determine that the signal quality of the electronic device is relatively poor.

The network standard is a type of a network. Currently, network standards supported by the electronic device include a global system for mobile communications (global system for mobile communications, GSM), code division multiple access (code division multiple access, CDMA), 3G, 4G, and the like.

For example, when the electronic device supports a plurality of network standards (for example, 3G and 4G), a process in which the electronic device determines the network standard corresponding to the card 1 may be as follows.

After successfully registering with the network, the electronic device may receive a signal sent by the network. The electronic device first parses, by using 4G-related hardware or software, the signal or a parameter configured by the network. If the electronic device successfully parses the signal or the parameter configured by network, the electronic device may determine that the network standard corresponding to the card 1 is 4G.

If the electronic device fails to parse, by using the 4G-related hardware or software, the signal or the parameter configured by the network, the electronic device may continue to parse, by using 3G-related hardware or software, the signal sent by the network or the parameter configured by the network. If the electronic device successfully parses the signal or the parameter configured by network, the electronic device may determine that the network standard corresponding to the card 1 is 3G. The data latency may be a packet data convergence protocol (packet data convergence protocol, PDCP) buffer latency, a transmission control protocol (transmission control protocol. TCP) round-trip time (round-trip time, RTT) latency, an actual service latency, or the like.

The PDCP latency is a time interval from a moment at which the electronic device sends a data packet through a radio resource control (radio resource control, RRC) layer to a PDCP layer to a moment at which the PDCP layer sends a processed data packet to a radio link control (radio link control, RLC) layer. Generally, the PDCP layer may perform operations on the data packet such as encapsulation and processing based on a priority of the data packet.

The RTT includes three parts: propagation time (propagation delay) of a link, processing time of an end system, and queuing and processing time (queuing delay) in a router buffer. Values of the first two parts are relatively fixed for a TCP connection, but the queuing and processing time in the router buffer varies with a congestion degree of the entire network. Therefore, a change of the RTT reflects the congestion degree of the network to some extent.

The RTT may be a latency between a moment at which the electronic device sends a data packet to a server and a moment at which the server sends information for acknowledging receiving of the data packet to the electronic device.

For example, the actual service latency may be a data latency in an application on the electronic device. For example, when the electronic device is in a game application scenario, the data latency may be a game data latency, for example, a packet loss rate, or a frame loss status. For another example, when the electronic device is in a browser interface, the data latency may be a latency in a web page opening process. For another example, when the electronic device is in a video application scenario, the data latency may be a video download rate, a buffering speed, or the like.

For example, when the user opens a browser to search for a web page, the actual service latency may be a latency from a moment at which the user taps the web page to a moment at which the web page is opened.

It should be understood that, the actual service latency is usually greater than the RTT, and the actual service latency further includes a time interval from a moment at which the electronic device detects an operation of the user to a moment at which the electronic device sends a data packet to the server, and the like.

S1203: When the network state of the first network access card meets a first preset condition, the electronic device disconnects the data service transmitted by using the first network access card, activates the second network access card, and transmits the data service by using the second network access card.

When the network state of the card 1 meets the first preset condition, the electronic device may stop transmitting the data service by using the card 1, and keep the data service of the card 1 in a deactivation state. In addition, the electronic device sends the data service activation request information to the network of the operator to which the card 2 belongs. When receiving the data service activation request acknowledgment information for the card 2, the electronic device may transmit the data service by using the card 2.

In an embodiment, the first preset condition includes but is not limited to one or more of the following:

(1) The signal strength of the card 1 is less than or equal to a first strength threshold.

(2) The signal quality of the card 1 is less than or equal to a first quality threshold.

(2) The network standard corresponding to the card 1 changes from a first-priority network standard to a second-priority network standard.

(3) The data latency of the card 1 is greater than or equal to a first latency threshold.

For example, when the RSRP value of the card 1 is less than or equal to −115 dBm, the electronic device disconnects the data service transmitted by using the card 1, activates the card 2, and transmits the data service by using the card 2.

For example, the first-priority network standard corresponding to the card 1 is 4G, and the second-priority network standard corresponding to the card 1 is 3G. When the network standard corresponding to the card 1 changes from 4G to 3G, the electronic device disconnects the data service transmitted by using the card 1, activates the card 2, and transmits the data service by using the card 2.

For example, when the RTT of the card 1 is greater than or equal to 500 ms, the electronic device disconnects the data service transmitted by using the card 1, activates the card 2, and transmits the data service by using the card 2.

For example, when the RSRQ value of the card 1 is less than or equal to −15 dB, and the network standard corresponding to the card 1 changes from 4G to 3G, the electronic device disconnects the data service transmitted by using the card 1, activates the card 2, and transmits the data service by using the card 2.

For example, when the electronic device is in a video application scenario, the SINR value of the card 1 is less than or equal to 16, the network standard corresponding to the card 1 changes from 4G to 3G, and a speed at which the electronic device downloads the video by using the card 1 is less than or equal to a preset speed threshold, the electronic device disconnects the data service transmitted by using the card 1, activates the card 2, and transmits the data service by using the card 2.

In an embodiment, when the network state of the card 1 meets the first preset condition, and a network state of the card 2 meets a second preset condition, the electronic device disconnects the data service transmitted by using the card 1, activates the card 2, and transmits the data service by using the card 2.

In an embodiment, the second preset condition includes but is not limited to one or more of the following:

(1) Signal strength of the card 2 is greater than or equal to a second preset strength threshold.

(2) Signal quality of the card 2 is greater than or equal to a second quality threshold.

(2) A network standard corresponding to the card 2 is the first-priority network standard.

(3) A data latency of the card 2 is less than or equal to a second latency threshold.

For example, when the RSRP value of the card 1 is less than or equal to −115 dBm, and an RSRP value of the card 2 is greater than or equal to −115 dBm, the electronic device disconnects the data service transmitted by using the card 1, activates the card 2, and transmits the data service by using the card 2.

For example, when the network standard corresponding to the card 1 changes from 4G to 3G, and the network standard corresponding to the card 2 is 4G, the electronic device disconnects the data service transmitted by using the card 1, activates the card 2, and transmits the data service by using the card 2.

For example, when the RTT of the card 1 is greater than or equal to 500 ms, and the network standard corresponding to the card 2 is 4G, the electronic device disconnects the data service transmitted by using the card 1, activates the card 2, and transmits the data service by using the card 2.

It should be understood that the foregoing merely lists, by using examples, the conditions that need to be met when the electronic device performs network access card switching from the card 1 to the card 2. In this embodiment of this application, the first preset condition and the second preset condition may alternatively be other cases. This is not limited in this embodiment of this application.

S1204: When the network state of the first network access card meets a third preset condition, the electronic device disconnects the data service transmitted by using the second network access card, activates the first network access card, and transmits the data service by using the first network access card.

In an embodiment, the second preset condition includes but is not limited to one or more of the following:

(1) The signal strength of the card 1 is greater than or equal to a third strength threshold.

(2) The signal strength of the card 1 is greater than or equal to a third quality threshold.

(3) The network standard corresponding to the card 1 changes from the second-priority network standard to the first-priority network standard.

(4) The data latency of the card 1 is less than or equal to a third latency threshold.

For example, when the RSRQ value of the card 1 is greater than or equal to −15 dBm, the electronic device disconnects the data service from the card 2, activates the card 1, and transmits the data service by using the card 1.

For example, when the network standard corresponding to the card 1 changes from 3G to 4G, the electronic device disconnects the data service from the card 2, activates the card 1, and transmits the data service by using the card 1.

For example, when the PDCP layer buffer latency of the electronic device is less than or equal to 100 ms, the electronic device disconnects the data service from the card 2, activates the card 1, and transmits the data service by using the card 1.

For example, when the RSRQ value of the card 1 is greater than or equal to −15, and the network standard corresponding to the electronic device changes from 3G to 4G, the electronic device disconnects the data service from the card 2, activates the card 1, and transmits the data service by using the card 1.

In an embodiment, when one or more parameters of the card 2 meet a fourth preset condition, the electronic device disconnects the data service from the card 2, activates the card 1, and transmits the data service by using the card 1.

In an embodiment, the fourth preset condition includes but is not limited to one or more of the following:

(1) The signal strength of the card 2 is less than or equal to a fourth strength threshold.

(2) The signal quality of the card 2 is less than or equal to a fourth quality threshold.

(2) The network standard corresponding to the card 2 changes from the first-priority network standard to the second-priority network standard.

(3) The data latency of the card 2 is less than or equal to a fourth latency threshold.

In an embodiment, when the one or more parameters of the card 1 meet the third preset condition and the one or more parameters of the card 2 meet the fourth preset condition, the electronic device disconnects the data service from the card 2, activates the card 1, and transmits the data service by using the card 1.

It should be understood that the foregoing merely lists, by using examples, the conditions that need to be met when the electronic device performs network access card switching from the card 2 back to the card 1. In this embodiment of this application, the third preset condition and the fourth preset condition may alternatively be other cases. This is not limited in this embodiment of this application.

According to the network access card selection method in this embodiment of this application, after mobile data of one card is used up, the electronic device may automatically switch to another card having remaining mobile data to access a network. This avoids generating extra fees in a network access process of the user, avoids a cumbersome card switching operation of the user, and helps improve user experience.

Figure 13:
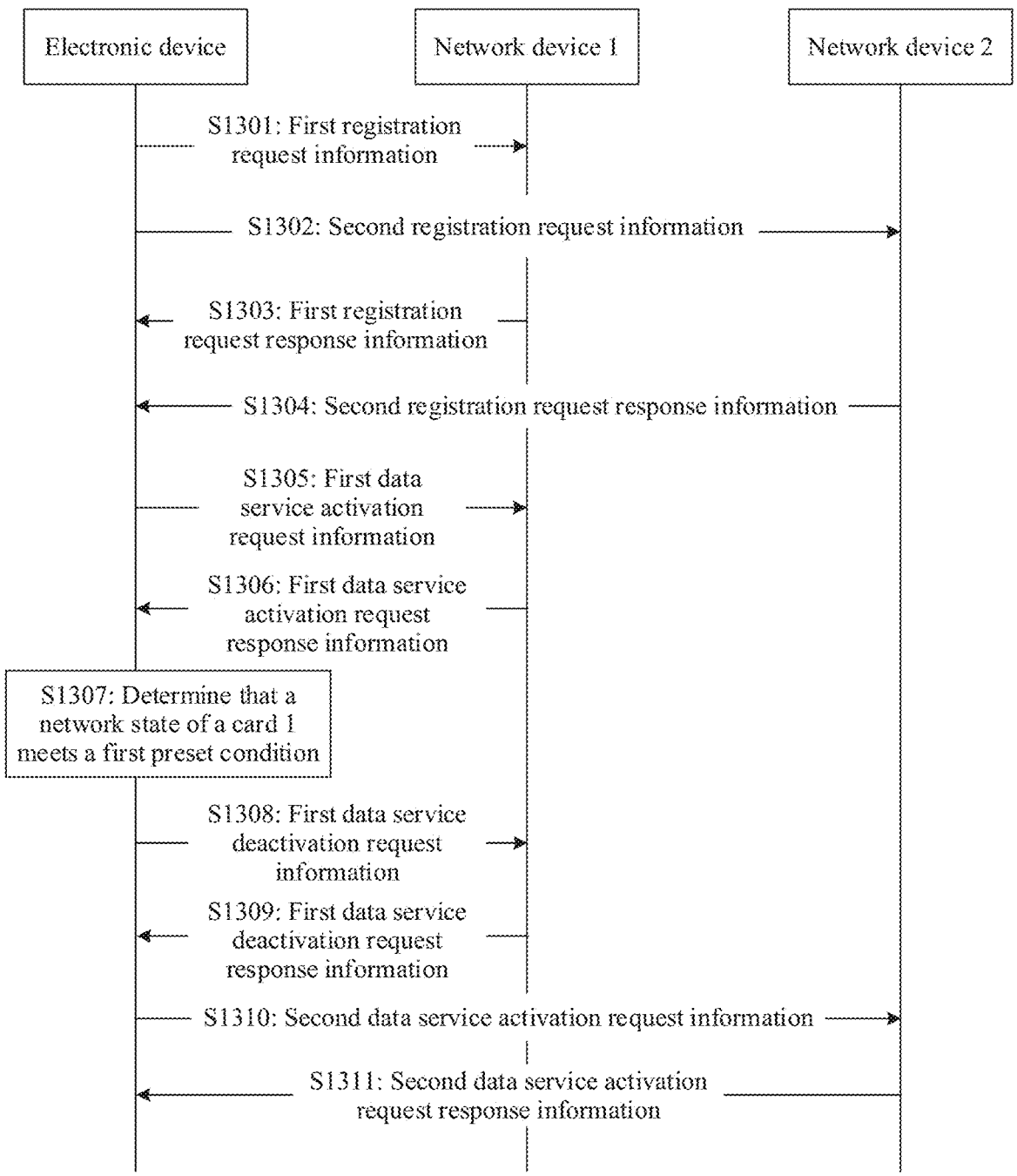
FIG. 13 is a schematic flowchart of another network access card switching method according to an embodiment of this application.

FIG. 13 is a schematic flowchart of a network access card switching method 1300 according to an embodiment of this application. As shown in FIG. 13, the method includes the following steps.

S1301: An electronic device sends first registration request information to a network device 1.

S1302: The electronic device sends second registration request information to a network device 2.

For example, after the electronic device is started, the electronic device may send the first registration request information to an operator network to which a card 1 belongs, and send the second registration request information to an operator network to which the card 2 belongs.

It should be understood that there is no actual sequence between S1301 and S1302.

S1303: The network device 1 sends first registration request response information to the electronic device.

S1304: The network device 2 sends second registration request response information to the electronic device.

For example, when the network device 1 receives the first registration request information and determines that the card 1 is not in arrears, the network device 1 may send the first registration request response information to the electronic device. The first registration request response information is used to indicate that the card 1 of the electronic device successfully registers with the network.

For example, when the network device 2 receives the first registration request information and determines that the card 2 is not in arrears, the network device 2 may send the second registration request response information to the electronic device. The second registration request response information is used to indicate that the card 2 of the electronic device successfully registers with the network.

It should be understood that there is no actual sequence between S1303 and S1304.

S1305: The electronic device sends first data service activation request information to the network device 1.

For example, after the card 1 of the electronic device successfully registers with the network, the electronic device determines that a user enables data traffic of the card 1. In this case, the electronic device may send the first data service activation request information to the network device 1. The first data service activation request information is used to request transmission of a data service between the electronic device and the network device 1.

S1306: The electronic device receives first data service activation request response information sent by the network device 1.

For example, after receiving the first data service activation request information, the network device 1 may send the first data service activation request response information to the electronic device. The first data service activation request response information is used to indicate that the electronic device can transmit the data service to the network device 1.

After the electronic device receives the first data service activation request response information sent by the network device 1, the user may use the mobile data of the card 1 to access a network.

S1307: The electronic device determines that a network state of the card 1 meets a first preset condition.

It should be understood that, for the first preset condition, reference may be made to the description in the method 1200. For brevity, details are not described herein again.

S1308: The electronic device sends first data service deactivation request information to the network device 1.

S1309; The network device 1 sends first data service deactivation request response information to the electronic device.

It should be understood that after the electronic device receives the first data service deactivation request information sent by the network device 1, the electronic device may disconnect transmission of the data service between the electronic device and the network device 1.

S1310: The electronic device sends second data service activation request information to the network device 2, where the second data service activation request information is used to request transmission of the data service between the electronic device and the network device 2.

S1311: The network device 2 sends second data service activation request response information to the electronic device.

For example, after receiving the second data service activation request information, the network device 2 may send the second data service activation request response information to the electronic device. The second data service activation request response information is used to indicate that the electronic device can transmit the data service to the network device 2.

After the electronic device receives the second data service activation request response information sent by the network device 2, the user may use mobile data of the card 2 to access the network.

For example, if the network state of the card 1 meets a third preset condition, the electronic device may perform network access card switching from the card 2 back to the card 1, that is, first disconnect the data service between the electronic device and the network device 2, and then send third data service activation request information to the network device. After receiving third data service activation request information sent by the network device 1, the user can use the mobile data of the card 1 to access the network.

Figure 14:
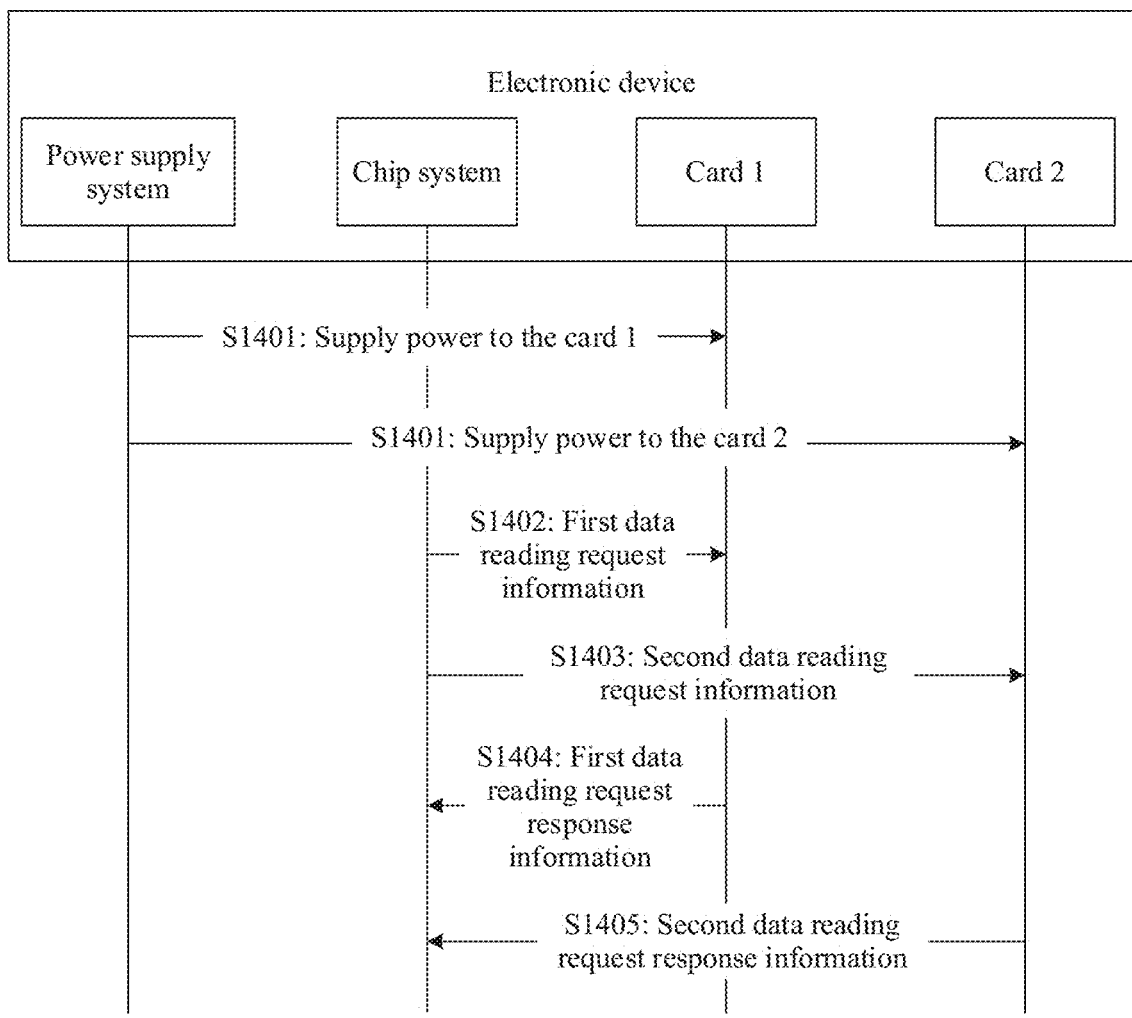
FIG. 14 is a schematic flowchart of another network access card switching method according to an embodiment of this application.
Figure 15:
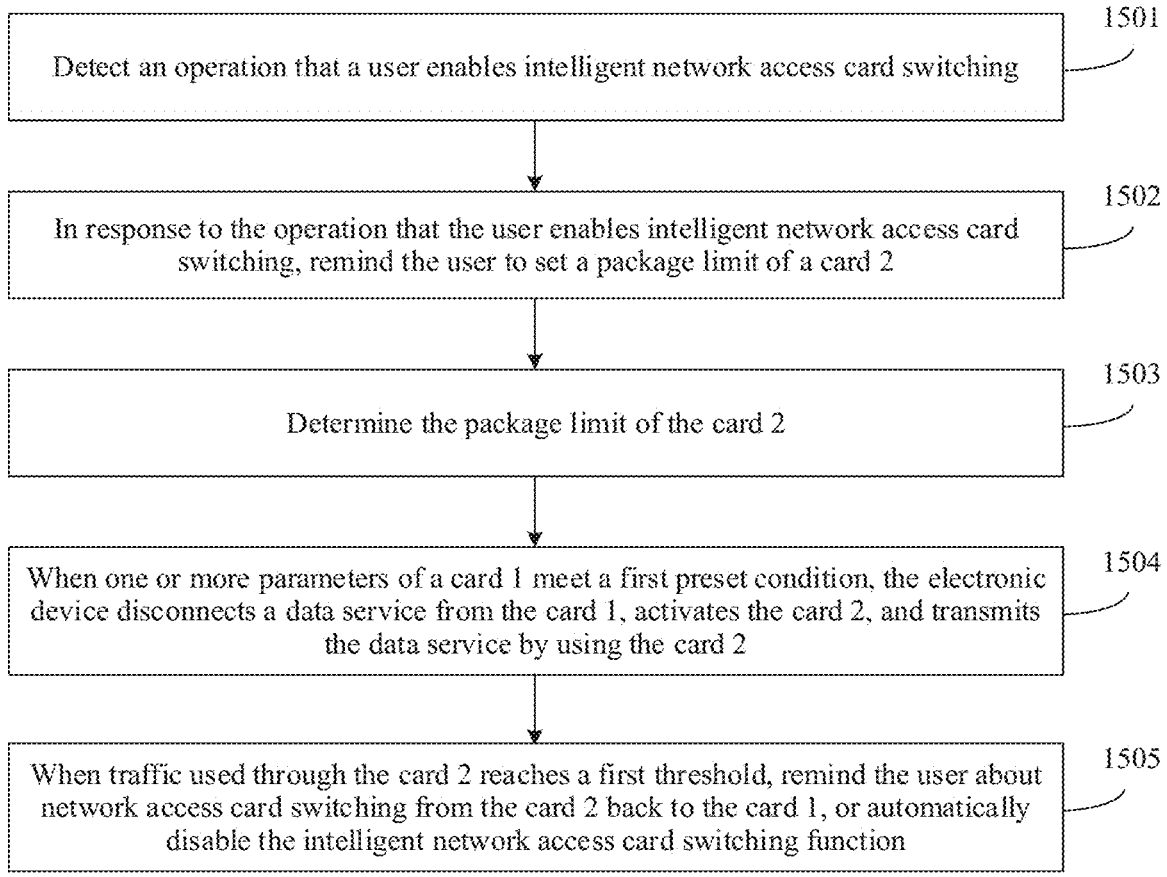
FIG. 15 is a schematic flowchart of another network access card switching method according to an embodiment of this application.

FIG. 14 is a schematic flowchart of a network access card switching method 1400 according to an embodiment of this application. The method is applied to an electronic device, and the electronic device includes a power supply system, a chip system, and a plurality of network access cards. For example, the electronic device includes two network access cards (for example, a card 1 and a card 2), and the electronic device uses the card 1 as a default mobile data card. As shown in FIG. 15, the method includes the following steps.

S1401: When the electronic device is started, the power supply system separately supplies power to the card 1 and the card 2.

S1402: The chip system sends first data reading request information to the card 1, where the first data reading request information is used to request data of the card 1.

S1403: The chip system sends second data reading request information to the card 2, where the second data reading request information is used to request data of the card 2.

For example, the data of the card 1 and the data of the card 2 each include but are not limited to one or more of a PLMN of the card 1, a network search related parameter, an international mobile subscriber identity (international mobile subscriber identity number, IMSI), and an integrated circuit card identity (integrate circuit card identity, ICCID).

It should be understood that there is no actual sequence between S1402 and S1403.

It should be further understood that, in this embodiment of this application, the chip system may include an application processor (application processor, AP) and a baseband processor (baseband processor, BP). The AP may exchange information with the card 1 or the card 2 by using the BP.

It should be further understood that the power supply system may be integrated into the chip system.

S1404. The card 1 sends first data reading request response information to the chip system, where the first data reading request response information includes the data of the card 1. S1405: The card 2 sends second data reading request response information to the chip system, where the second data reading request response information includes the data of the card 2.

It should be understood that there is no actual sequence between S1404 and S1405.

It should be further understood that S1401 to S1405 may be performed before S1301. The first registration request information sent by the electronic device to the network device 1 in S1301 may carry the IMSI of the card 1. The first registration request response information sent by the network device 1 to the electronic device in S1303 may carry a temporary mobile subscriber identity (temporary mobile subscriber identity, TMSI) of the card 1. The second registration request information sent by the electronic device to the network device 2 in S1302 may carry the IMSI of the card 2. The second registration request response information sent by the network device 2 to the electronic device in S1304 may carry a TMSI of the card 2. Then, the electronic device may transmit the data service to the network device by using the TMSI of the card 1 or the TMSI of the card 2.

It should be further understood that after S1405, the electronic device may periodically exchange information with the card 1 and the card 2, to determine whether the card 1 and the card 2 are in a working state. For example, the chip system may send information to the card 1 and the card 2 every 30 seconds. When the card 1 is taken out by a user from the electronic device at a moment, the electronic device does not receive a response after sending the information to the card 1. In this case, the electronic device may consider that the card 1 is in a non-working state.

FIG. 15 is a schematic flowchart of a network access card switching method 1500 according to an embodiment of this application. The method is applied to an electronic device provided with a plurality of cards. For example, the electronic device includes two cards (for example, a card 1 and a card 2), and the electronic device uses the card 1 as a default mobile data card. As shown in FIG. 15, the method includes the following steps.

S1501: Detect an operation that a user enables intelligent network access card switching.

For example, as shown in FIG. 3(d), the operation may be an operation that the user slides the control 304 to the right or taps the control 304.

S1502: In response to the operation that the user enables intelligent network access card switching, remind the user to set a package limit of the card 2.

For example, as shown in FIG. 3(e), after the mobile phone detects the operation that the user taps the control 304 or slides the control 304 to the right, the mobile phone may remind, in a system window, the user to set the package limit of the card 2.

S1503; Detect an operation that the user sets the package limit of the card 2, and determine the package limit of the card 2.

For example, as shown in FIG. 3(g), after detecting an operation that the user taps the control 307, the mobile phone may determine that the package limit of the card 2 is 1000 MB.

S1504: When one or more parameters of the card 1 meet a first preset condition, the electronic device disconnects a data service transmitted by using the card 1, activates the card 2, and transmits the data service by using the card 2.

It should be understood that for a process of S1504, reference may be made to the foregoing description of S1202. For brevity, details are not described herein again.

S1505: When traffic used by the electronic device from the card 2 reaches a first threshold, the electronic device reminds the user about network access card switching from the card 2 back to the card 1, or automatically disables the intelligent network access card switching function.

Figure 6A:
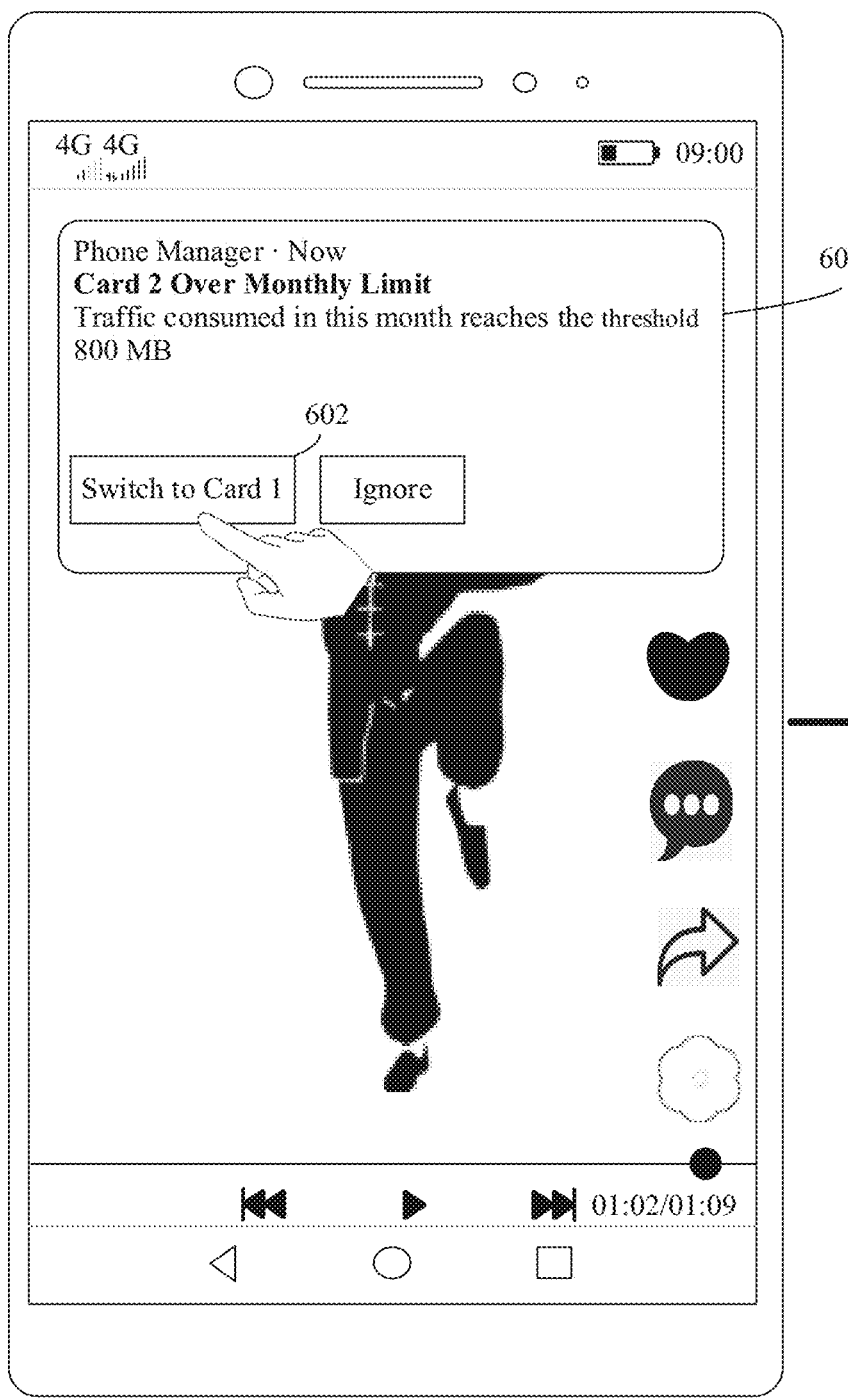
FIG. 6(a) to FIG. 6(c) are schematic diagrams of another network access card switching method according to an embodiment of this application.
Figure 6B:
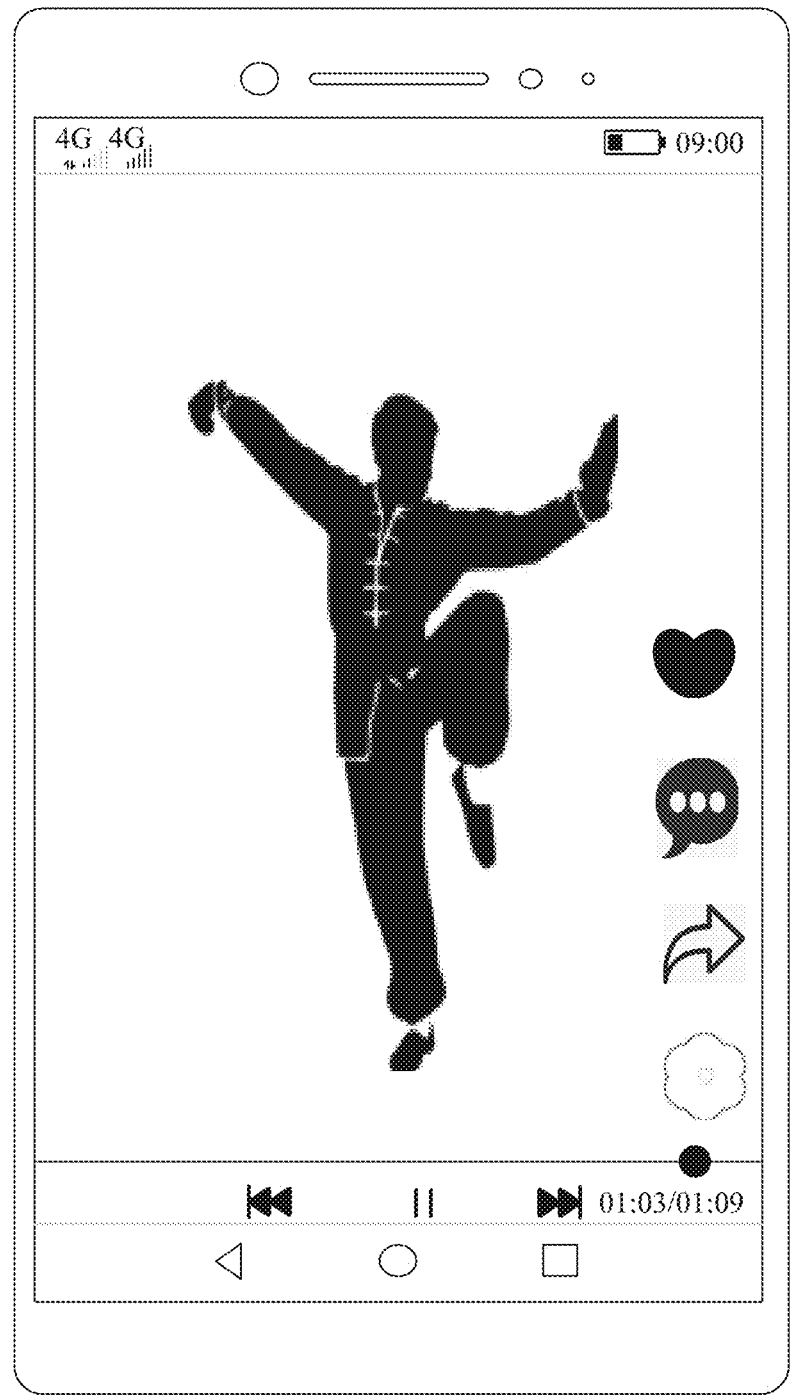
Figure 6C:
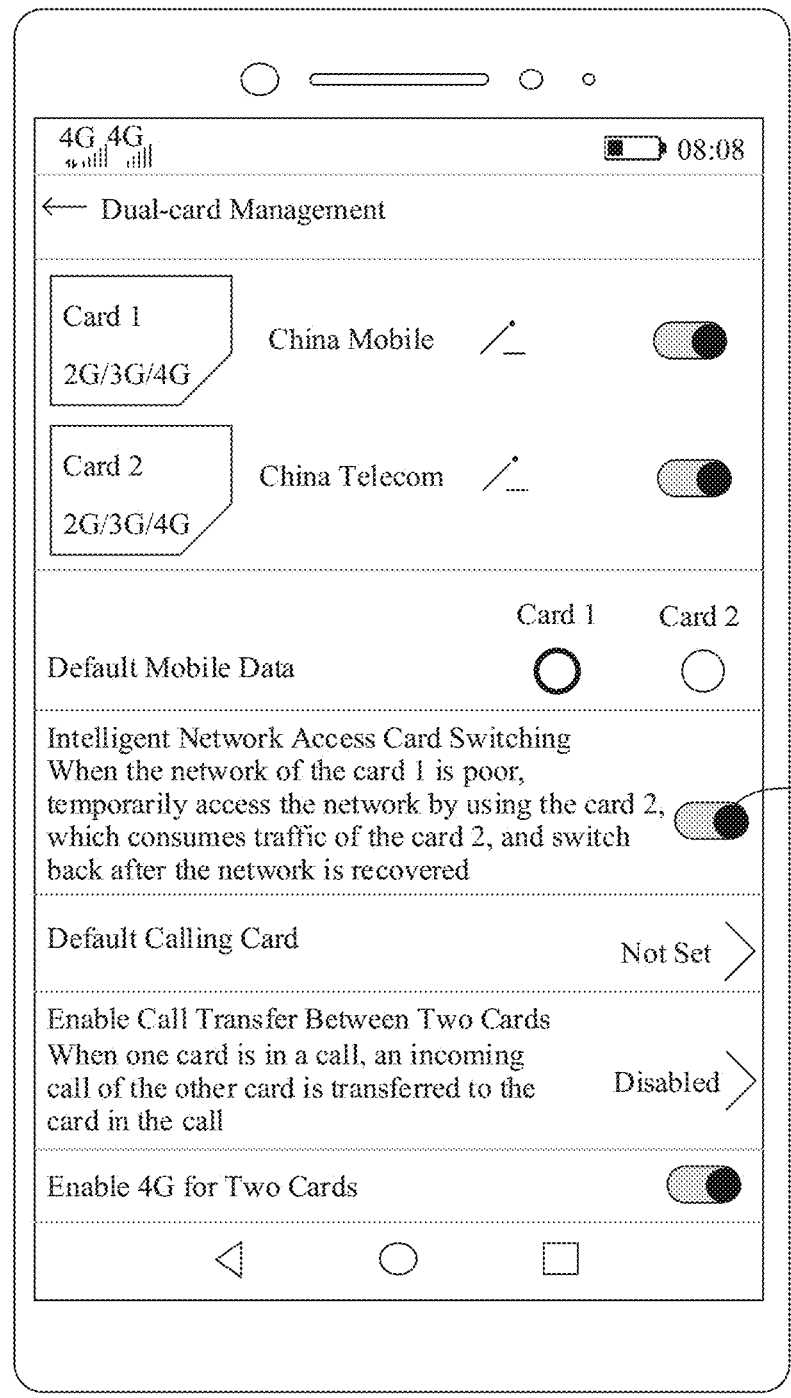

For example, as shown in FIG. 6(a), the package limit of the card 2 is 1000 MB. When the traffic consumed by the mobile phone from the card 2 in a current month reaches 80% of the package limit of the card 2, the mobile phone may remind the user "Traffic consumed in this month reaches the threshold 800 MB".

Figure 7A:
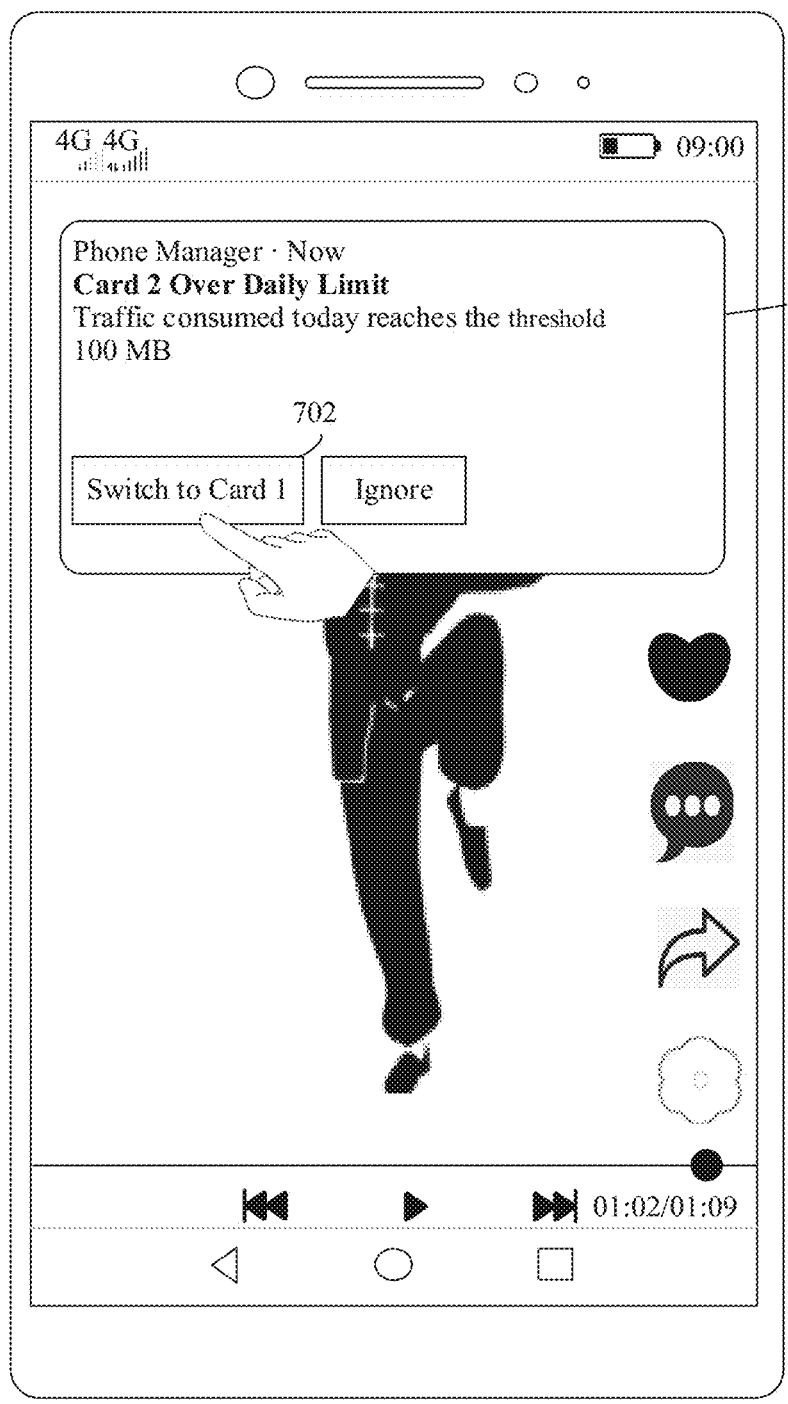
FIG. 7(a) to FIG. 7(c) are schematic diagrams of another network access card switching method according to an embodiment of this application.
Figure 7B:
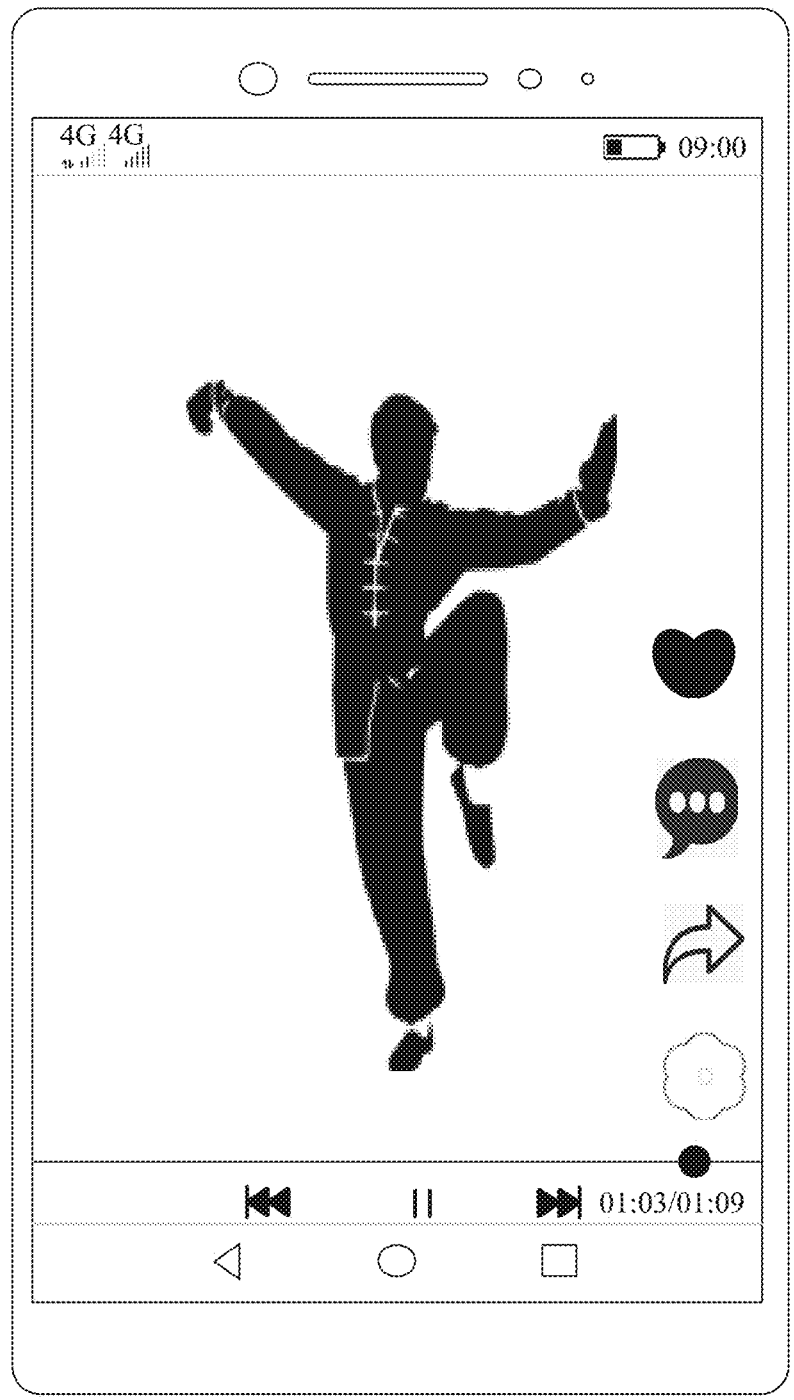
Figure 7C:
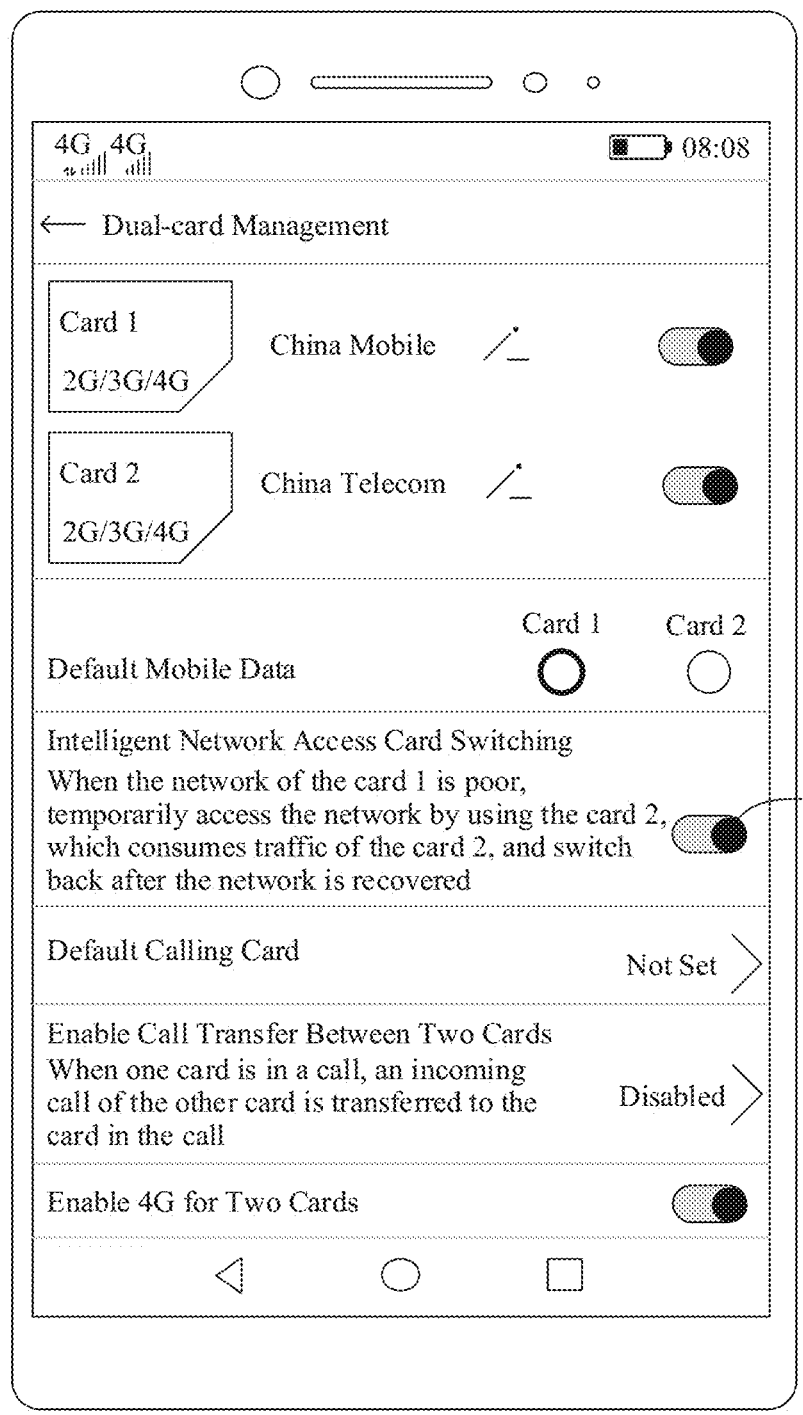

For example, as shown in FIG. 7(a), the package limit of the card 2 is 1000 MB. When the traffic consumed by the mobile phone from the card 2 on a current day reaches 10% of the package limit of the card 2, the mobile phone may remind the user "Traffic consumed in this month reaches the threshold 100 MB".

For example, as shown in FIG. 8(a), the package limit of the card 2 is 1000 MB. When the traffic consumed by the mobile phone from the card 2 in a current month reaches 95% of the package limit of the card 2, that is, the traffic consumed from the card 2 reaches 950 MB, the mobile phone may remind the user "Intelligent network access card switching is disabled in this month and will be automatically enabled in the next month", and automatically disable the intelligent network access card switching function.

According to the intelligent network access card switching method in this embodiment of this application, when the user sets a traffic limit of the card 2, the electronic device may detect remaining traffic of the card 2 at any time. When the traffic consumed in the current month or current day reaches a limit value, the electronic device may remind the user about switching back to the card 1 in time, or remind the user to disable the intelligent network access card switching function. When the traffic consumed in this month is close to the package limit, the electronic device may remind the user to switch back to the card 1, or automatically disable the intelligent network access card switching function. This avoids generating extra fees in a network access process of the user, avoids a cumbersome card switching operation of the user, and helps improve user experience.

FIG. 16 is a schematic flowchart of a network access card switching method 1600 according to an embodiment of this application. The method is applied to an electronic device including a plurality of cards. For example, the electronic device includes two cards (for example, a card 1 and a card 2), and the electronic device uses the card 1 as a default mobile data card. As shown in FIG. 16, the method includes the following steps.

S1601: Detect an operation that a user enables intelligent network access card switching.

For example, as shown in FIG. 3(d), the operation may be an operation that the user slides the control 304 to the right or taps the control 304.

S1602: In response to the operation that the user enables intelligent network access card switching, remind the user to set a package limit of the card 2.

For example, as shown in FIG. 3(e), after the mobile phone detects the operation that the user taps the control 304 or slides the control 304 to the right, the mobile phone may remind, in a system window, the user to set the package limit of the card 2.

S1603: Detect that the user does not set the package limit of the card 2.

For example, as shown in FIG. 9(a), after the mobile phone detects an operation that the user taps the control 901, the mobile phone may cancel setting of the package limit of the card 2.

S1604: When one or more parameters of the card 1 meet a first preset condition, the electronic device disconnects a data service transmitted by using the card 1, activates the card 2, and transmits the data service by using the card 2.

It should be understood that for a process of S1604, reference may be made to the foregoing description of S1202. For brevity, details are not described herein again.

S1605: When traffic used by the electronic device from the card 2 reaches a second threshold, the electronic device reminds the user about network access card switching from the card 2 back to the card 1, or reminds the user to set the package limit of the card 2.

For example, as shown in FIG. 9(c), when the mobile phone detects that the traffic consumed from the card 2 reaches 50 MB, the mobile phone may remind the user about switching to the card 1, or remind the user to tap the system prompt window 903 to set the package limit of the card 2.

According to the intelligent network access card switching method in this embodiment of this application, when the user does not set a traffic limit of the card 2, the electronic device may detect the traffic consumed from the card 2 at any time. When the consumed traffic reaches a threshold, the electronic device may remind the user about switching back to the card 1 in time, or remind the user to set the package limit of the card 2. This avoids generating extra fees in a network access process of the user, avoids a cumbersome card switching operation of the user, and helps improve user experience.

Figure 17:
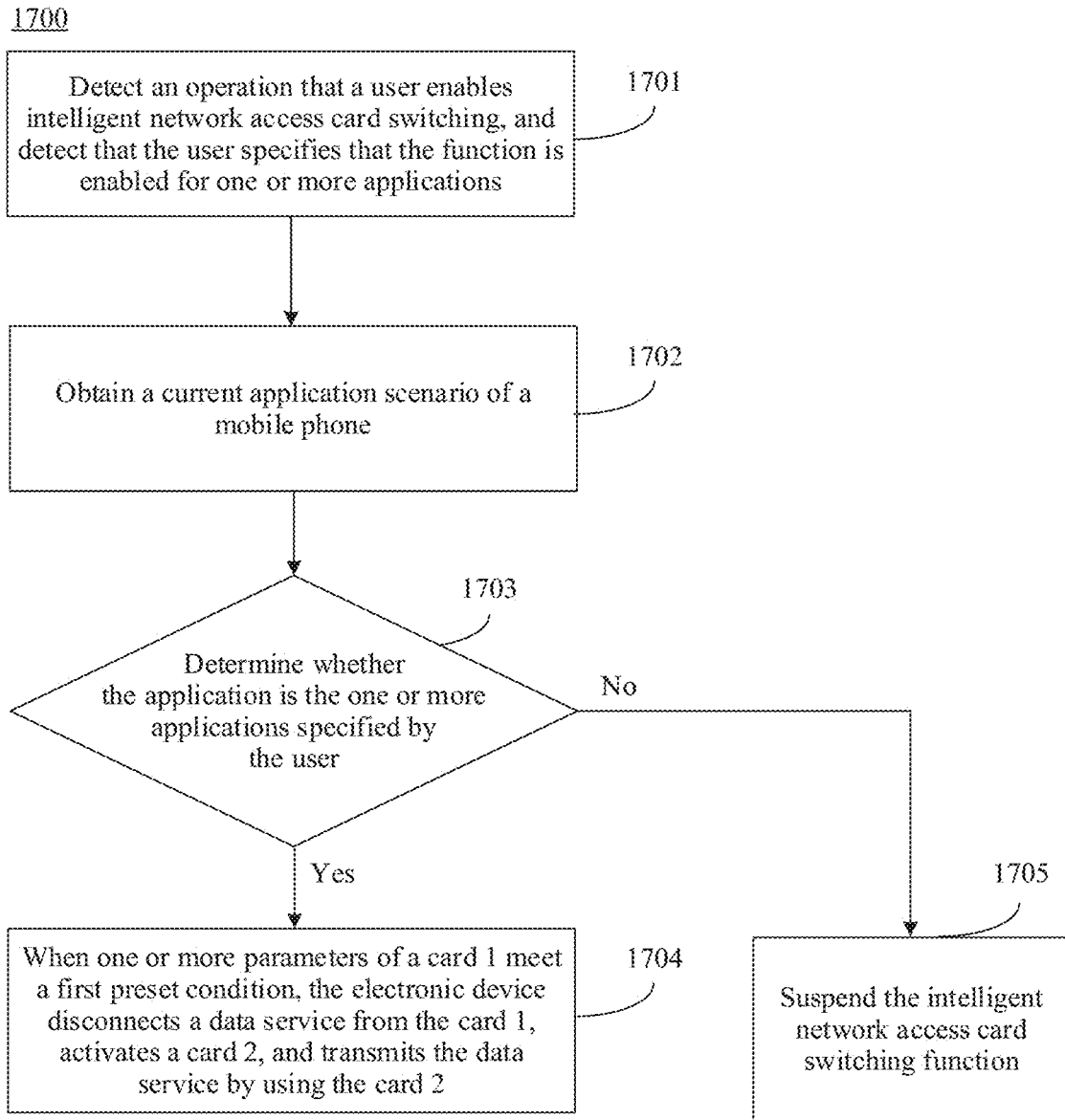
FIG. 17 is a schematic flowchart of another network access card switching method according to an embodiment of this application.

FIG. 17 is a schematic flowchart of a network access card switching method 1700 according to an embodiment of this application. The method is applied to an electronic device including a plurality of cards. For example, the electronic device includes two cards (for example, a card 1 and a card 2), and the electronic device uses the card 1 as a default mobile data card. As shown in FIG. 17, the method includes the following steps.

S1701: Detect an operation that a user enables intelligent network access card switching, and detect that the user specifies that the function is enabled for one or more applications.

For example, as shown in FIG. 10(a) and FIG. 10(b), after detecting an operation of sliding the control "Intelligent network access card switching" to the right or tapping the control "Intelligent network access card switching", the mobile phone further detects that the user specifies that the function is enabled for a specified application. The mobile phone may determine that the function is enabled for applications other than the video app 1, in other words, is disabled for the video app 1.

S1702: Obtain a current application scenario of the mobile phone.

For example, after detecting that the user taps an icon of an application on a home screen of the electronic device, the electronic device starts the application, and enters an application scenario. Specifically, after the electronic device detects that the user taps an icon of an application on the home screen of the electronic device, the application at an application layer sends a reference sign (for example, a process identifier (process identifier, PID)) corresponding to the application and a process name corresponding to the game app to a system service module at a framework layer. The system service module may determine, based on the reference sign and the process name, which application is started. For example, the electronic device determines, by determining the process identifier and the process name of the application, that the application is started.

S1703: Determine whether the application is the one or more applications specified by the user.

For example, as shown in FIG. 10(b), the mobile phone may determine whether the application is the social app 1, the social app 2, the map app, or the shopping app.

S1704: When the application is the one or more applications specified by the user, and one or more parameters of the card 1 meet a first preset condition, the electronic device disconnects a data service transmitted by using the card 1, activates the card 2, and transmits the data service by using the card 2.

For example, when the application is the map app, the mobile phone may determine to continue using the intelligent network access card switching function. In this case, if signal strength of the card 1 deteriorates, the mobile phone may perform network access card switching from the card 1 to the card 2.

S1705: When the application is not the one or more applications specified by the user, suspend the intelligent network access card switching function.

For example, when the application is the video app 1, the mobile phone may suspend the intelligent network access card switching function. When the mobile phone disables the video app 1, or when the mobile phone determines that the user re-starts the social app 1 and runs the video app 1 in background, the mobile phone may resume the intelligent network access card switching function.

It should be understood that, after S1705, if traffic consumed from the card 2 reaches a threshold, the mobile phone may further remind the user. After the mobile phone determines a package limit of the card 2, for a reminding manner of the mobile phone, reference may be made to the process of S1505. When the mobile phone does not determine the package limit of the card 2, for a reminding manner of the mobile phone, reference may be made to the process of S1605.

According to the intelligent switching method in this embodiment of this application, the user may specify that the intelligent network access card switching function is disabled for some applications. This helps improve operation efficiency of the user and intelligence of the electronic device, and helps improve user experience.

Figure 18:
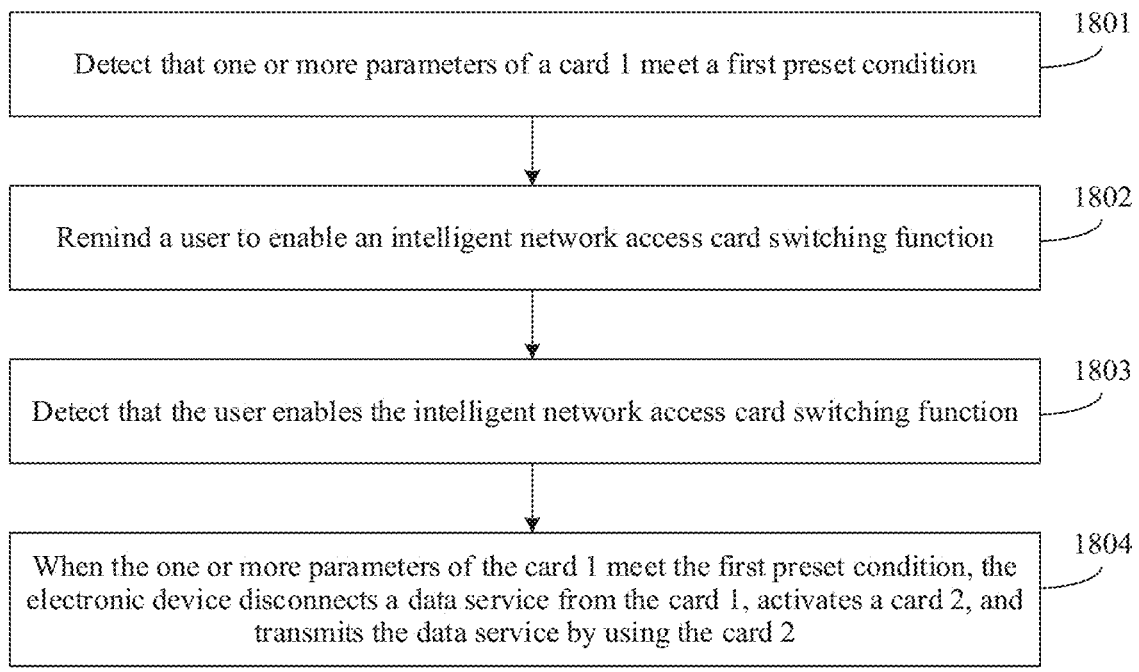
FIG. 18 is a schematic flowchart of another network access card switching method according to an embodiment of this application.

FIG. 18 is a schematic flowchart of a network access card switching method 1800 according to an embodiment of this application. The method is applied to an electronic device including a plurality of cards. For example, the electronic device includes two cards (for example, a card 1 and a card 2), and the electronic device uses the card 1 as a default mobile data card. As shown in FIG. 18, the method includes the following steps.

S1801: Detect that one or more parameters of the card 1 meet a first preset condition.

S1802. Remind a user to enable an intelligent network access card switching function.

For example, as shown in FIG. 11(a), when determining that the data latency of the video playing app is greater than or equal to the preset latency threshold, the mobile phone reminds, in the system window 1101, the user to enable the intelligent network access card switching function. The system window 1101 further includes introduction to the intelligent network access card switching function.

It should be understood that a condition 3 for triggering the user to enable the intelligent network access card switching function may be that the one or more parameters of the card 1 meet the first preset condition, may be that it is detected that the electronic device is currently in a high-traffic consumption application scenario (for example, a video application), or may be another trigger condition. This is not limited in this embodiment of this application.

S1803: Detect that the user enables the intelligent network access card switching function.

For example, as shown in FIG. 11(a), after detecting the operation that the user taps the control 1102, the mobile phone determines the operation of enabling intelligent network access card switching.

For example, as shown in FIG. 11(b), after detecting the operation that the user taps the system window 1101, the mobile phone enters a personalized management interface, and displays, to the user, introduction of the intelligent network access card switching function in the personalized management interface. After detecting that the user taps the control 1103, the mobile phone may display a dual-card management interface. After detecting the operation that the user enables the smart network access card, the mobile phone determines to enable the function.

S1804: When the one or more parameters of the card 1 meet the first preset condition, the electronic device disconnects a data service transmitted by using the card 1, activates the card 2, and transmits the data service by using the card 2.

It should be understood that for a process of S1804, reference may be made to the foregoing description of S1202. For brevity, details are not described herein again.

It should be further understood that, after S1804, if traffic consumed from the card 2 reaches a threshold, the mobile phone may further remind the user. After the mobile phone determines a package limit of the card 2, for a reminding manner of the mobile phone, reference may be made to the process of S1505. When the mobile phone does not determine the package limit of the card 2, for a reminding manner of the mobile phone, reference may be made to the process of S1605.

According to the intelligent network access card switching method in this embodiment of this application, the mobile phone may automatically remind the user whether to enable the intelligent network access card switching function. This avoids generating extra fees in a network access process of the user, avoids a cumbersome card switching operation of the user, and helps improve user experience.

Figure 19:
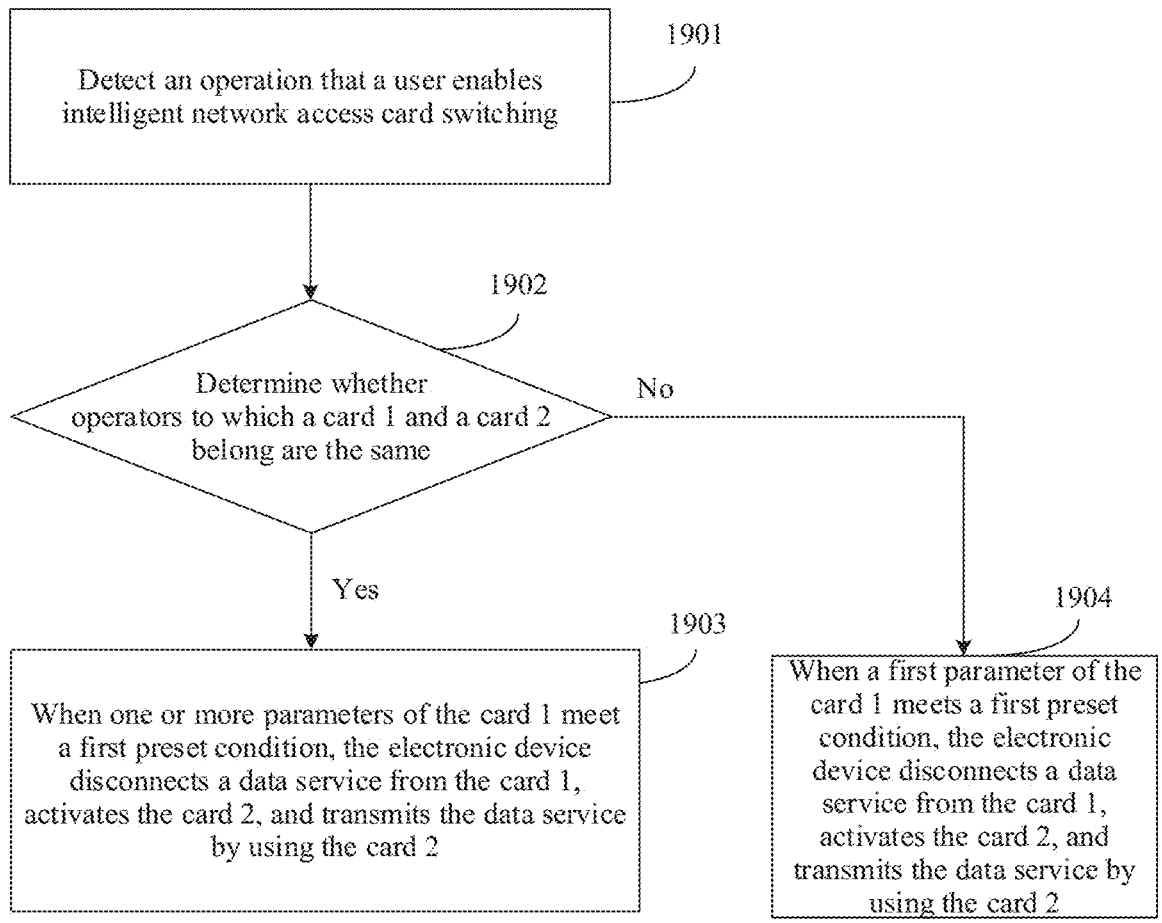
FIG. 19 is a schematic flowchart of another network access card switching method according to an embodiment of this application.

FIG. 19 is a schematic flowchart of a network access card switching method 1900 according to an embodiment of this application. The method is applied to an electronic device including a plurality of cards. For example, the electronic device includes two cards (for example, a card 1 and a card 2), and the electronic device uses the card 1 as a default mobile data card. As shown in FIG. 19, the method includes the following steps.

S1901: Detect an operation that a user enables intelligent network access card switching.

S1902: Determine whether operators to which the card 1 and the card 2 belong are the same.

It should be understood that, for a process in which the mobile phone determines the operators to which the card 1 and the card 2 belong, reference may be made to the description in S1201. For brevity, details are not described herein again.

It should be further understood that there is no actual sequence between S1901 and S1902.

S1903: When determining that the operators to which the card 1 and the card 2 belong are different, and one or more parameters of the card 1 meet a first preset condition, the electronic device disconnects a data service transmitted by using the card 1, activates the card 2, and transmits the data service by using the card 2.

It should be understood that, when the operators to which the card 1 and the card 2 belong are different, whether to perform network access card switching from the card 1 to the card 2 may be determined based on the one or more parameters of the card 1. For a specific switching process, refer to the foregoing description in S1202. For brevity, details are not described herein again.

S1904: When determining that the operators to which the card 1 and the card 2 belong are the same, and a first parameter of the card 1 meets a first preset condition, the electronic device disconnects a data service transmitted by using the card 1, activates the card 2, and transmits the data service by using the card 2.

For example, the first parameter may be a data latency.

It should be understood that, if the operators to which the card 1 and the card 2 belong are the same, when a network of the card 1 is relatively poor, a network of the card 2 may also be relatively poor. In this case, the mobile phone may not determine, based on parameters such as signal strength, signal quality, and a network standard, whether to perform network access card switching from the card 1 to the card 2, but determine, based on the data latency, whether to perform network access card switching from the card 1 to the card 2.

In an embodiment, when determining that the operators to which the card 1 and the card 2 belong are the same, the mobile phone may switch from the card 1 to the card 2 after the card 1 is in arrears or a network speed of the card 1 is limited.

It should be further understood that, after S1903 or S1904, if traffic consumed from the card 2 reaches a threshold, the mobile phone may also remind the user. After the mobile phone determines a package limit of the card 2, for a reminding manner of the mobile phone, reference may be made to the process of S1505. When the mobile phone does not determine the package limit of the card 2, for a reminding manner of the mobile phone, reference may be made to the process of S1605.

In this embodiment of this application, after determining that the intelligent network access card selection function is enabled, the electronic device may determine whether the operators to which the card 1 and the card 2 belong are the same. When the operators are the same, the mobile phone may determine, based on information such as the current data latency, a case of whether the card 1 is in arrears, or a case of whether the network speed is limited, whether to switch to the card 2. This helps avoid a case in which a network is still poor when the card 1 is switched to the card 2, improve a success rate of network recovery after the switching, and helps improve user experience.

It should be understood that the technical solutions in the embodiments of this application may be further applied to a portable mobile hotspot. A plurality of network access cards may be installed in the portable mobile hotspot. When a user uses a default mobile data card of the portable mobile hotspot to access a network, if a network state of the default mobile data card becomes poor, the portable mobile hotspot may automatically switch the network access card to another network access card. The portable mobile hotspot may support conversion of a 4G signal of the network access card into Wi-Fi. During using the portable mobile hotspot, the user may connect the electronic device (for example, a mobile phone or a PAD) to Wi-Fi provided by the default mobile data card. When the network state of the default mobile data card becomes poor, the mobile phone may automatically connect to Wi-Fi provided by the another network access card.

In an embodiment, an embodiment of this application further provides a phone card switching method. The phone card switching method may be applied to an electronic device including a plurality of telephone cards. For example, when a user A makes a call to a user B by using a card 1 in the electronic device, if the call by using the card 1 fails, the electronic device may automatically switch to a card 2 to make a call. A call failure case of the card 1 includes but is not limited to that the card 1 is in an arrear state, signal strength or signal quality of the card 1 is relatively poor, or the like.

It should be understood that, in this embodiment of this application, the phone card may be a SIM card.

It may be understood that, to implement the foregoing functions, the electronic device includes corresponding hardware and/or software modules for performing the functions. With reference to algorithm steps of each example described in the embodiments disclosed in this specification, this application can be implemented in a form of hardware or a combination of hardware and computer software. Whether a function is performed by hardware or hardware driven by computer software depends on particular applications and design constraint conditions of the technical solutions. A person skilled in the art may use different methods to implement the described functions for each particular application with reference to the embodiments, but it should not be considered that the implementation goes beyond the scope of the embodiments of this application.

In the embodiments, the electronic device may be divided into functional modules based on the examples in the foregoing method. For example, each functional module corresponding to each function may be obtained through division, or two or more functions may be integrated into one processing module. The integrated module may be implemented in a form of hardware. It should be noted that, in the embodiments, division into the modules is an example, and is merely logical function division and may be other division in an actual implementation.

Figure 20:
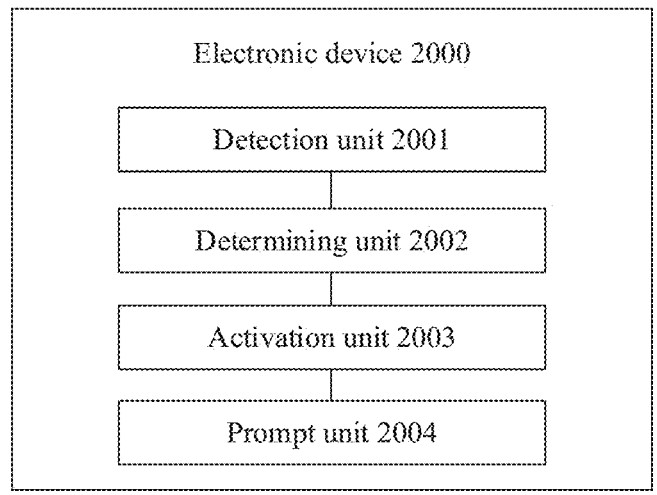
FIG. 20 is a schematic block diagram of an electronic device according to an embodiment of this application.

FIG. 20 is a schematic diagram of possible composition of an electronic device 2000 according to the foregoing embodiments. When each functional module is obtained through division based on each corresponding function, as shown in FIG. 20, the electronic device 2000 may include a detection unit 2001, a determining unit 2002, an activation unit 2003, and a prompt unit 2004.

The detection unit 2001 may be configured to support the electronic device 2000 in performing the foregoing steps such as S1501, S1503, S1601, S1603, S1701, S1801, S1803, and S1901, and/or another process used for the technology described in this specification.

The determining unit 2002 may be configured to support the electronic device 2000 in performing the foregoing steps such as S1703 and S1902, and/or another process used for the technology described in this specification.

The activation unit 2003 may be configured to support the electronic device 2000 in performing the foregoing steps such as S1504, S1604, S1704, S1804, S1903, and S1904, and/or another process used for the technology described in this specification.

The prompt unit 2004 may be configured to support the electronic device 2000 in performing the foregoing steps such as S1502, S1505, S1602, S1605, and S1802, and/or another process used for the technology described in this specification.

It should be noted that all related content of the steps in the foregoing method embodiments may be cited in function descriptions of corresponding functional modules. Details are not described herein again.

The electronic device provided in the embodiments is configured to perform the network access card switching method. Effects that are the same as those of the foregoing implementation method can be achieved.

When an integrated unit is used, the electronic device may include a processing module, a storage module, and a communications module. The processing module may be configured to control and manage actions of the electronic device, for example, may be configured to support the electronic device in performing the steps performed by the foregoing units. The storage module may be configured to support the electronic device in storing program code, data, and the like. The communications module may be configured to support communication between the electronic device and another device.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of digital signal processor (digital signal processor, DSP) and a microprocessor. The storage module may be a memory. The communications module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device having the structure shown in FIG. 1.

An embodiment further provides a computer storage medium. The computer storage medium stores computer instructions. When the computer instructions are run on an electronic device, the electronic device is enabled to perform the related method steps, to implement the network access card switching method in the foregoing embodiments.

An embodiment further provides a computer program product. When the computer program product runs on a computer, the computer is enabled to perform the related steps, to implement the network access card switching method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the network access card switching method in the foregoing method embodiments.

The electronic device, the computer storage medium, the computer program product, or the chip provided in the embodiments is configured to perform the corresponding method provided above. Therefore, for beneficial effects that can be achieved, refer to the beneficial effects achieved in the corresponding method provided above. Details are not described herein again.

Based on the foregoing descriptions about implementations, a person skilled in the art understands that, for the purpose of convenient and brief description, division into the foregoing functional modules is used as an example for illustration. In actual application, the foregoing functions may be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example.

For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, the functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes any medium that can store program code, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device configured with a first network access card and a second network access card, wherein the electronic device comprises:
   a memory configured to store one or more computer programs; and
   one or more processors coupled to the memory and configured to execute the one or more computer programs to cause the electronic device to be configured to:
   display a dual-card management function setting interface comprising a control;
   detect a first operation on the control;
   enable, in response to the first operation, an automatic network access card switching function;
   transmit a data service using the first network access card, wherein the first network access card is a default mobile data card of the electronic device;

determine that a network state of the first network access card meets a first preset condition;
based on the network state of the first network access card meeting the first preset condition:
automatically disconnect the data service transmitted using the first network access card;
activate the second network access card; and
transmit the data service using the second network access card;
determine, after activating the second network access card and transmitting the data service using the second network access card, that the network state of the first network access card meets a second preset condition;
based on the network state of the first network access card meeting the second preset condition:
automatically disconnect the data service transmitted using the second network access card;
activate the first network access card; and
transmit the data service using the first network access card;
determine, after activating the first network access card and transmitting the data service using the first network access card, that the network state of the first network access card meets the first preset condition; and
suspend, in response to the second network access card being in a roaming state, the automatic network access card switching function.

2. The electronic device of claim 1, wherein the network state of the first network access card comprises one or more of a signal strength, a signal quality, a network standard, a transmission latency for the data service, or a transmission rate for the data service during use of the first network access card by the electronic device.

3. The electronic device of claim 2, wherein the first preset condition comprises one or more of:
the signal strength is less than or equal to a first strength threshold;
the signal quality is less than or equal to a first quality threshold;
the network standard changes from a first-priority network standard to a second-priority network standard;
the transmission latency is greater than or equal to a first latency threshold; and
the transmission rate is less than or equal to a first speed threshold.

4. The electronic device of claim 2, wherein the second preset condition comprises one or more of:
the signal strength is greater than or equal to a second strength threshold;
the signal quality is greater than or equal to a second quality threshold;
the network standard changes from a second-priority network standard to a first-priority network standard;
the transmission latency is less than or equal to a second latency threshold; and
the transmission rate is greater than or equal to a second speed threshold.

5. The electronic device of claim 1, wherein the one or more processors are further configured to execute the one or more computer programs to cause the electronic device to:
display a video playing interface of a video application;
transmit a video service of the video application using the first network access card;
activate the second network access card; and
transmit the video service of the video application using the second network access card.

6. The electronic device of claim 1, wherein:
the first network access card is a first subscriber identity module (SIM) card and the second network access card is a second SIM card;
the first network access card is the first SIM card and the second network access card is a second embedded-SIM (eSIM) card;
the first network access card is a first eSIM card and the second network access card is the second SIM card; or
the first network access card is the first eSIM card and the second network access card is the second eSIM card.

7. The electronic device of claim 1, wherein the dual-card management function setting interface comprises a first option for the first network access card and a second option for the second network access card, wherein the first network access card is the default mobile data card of the electronic device when the first option is in a selected state, and wherein the second network access card is the default mobile data card of the electronic device when the second option is in the selected state.

8. The electronic device of claim 1, wherein the one or more processors are further configured to execute the one or more computer programs to cause the electronic device to measure the network state of the first network access card using a parameter used to measure downlink coverage.

9. The electronic device of claim 1, wherein to detect the first operation comprises to detect a sliding the control or a clicking the control.

10. A network access card switching method performed by an electronic device configured with a first network access card and a second network access card, wherein the first network access card is a default mobile data card of the electronic device, and wherein the method comprises:
displaying a dual-card management function setting interface comprising a control;
detecting a first operation on the control;
enabling, in response to the first operation, an automatic network access card switching function;
transmitting a data service using the first network access card;
determining that a network state of the first network access card meets a first preset condition;
based on the network state of the first network access card meeting the first preset condition:
automatically disconnecting the data service transmitted using the first network access card;
activating the second network access card; and
transmitting the data service using the second network access card;
determining, after activating the second network access card and transmitting the data service using the second network access card, that the network state of the first network access card meets a second preset condition;
based on the network state of the first network access card meeting the second preset condition:
automatically disconnecting the data service transmitted using the second network access card;
activating the first network access card; and
transmitting the data service using the first network access card;
after activating the first network access card and transmitting the data service using the first network access card:
determining that the network state of the first network access card meets the first preset condition; and suspending, when the second network access card is in a roaming state, the automatic network access card switching function.

11. The network access card switching method of claim 10, wherein the network state of the first network access card comprises one or more of a signal strength, a signal quality, a network standard, a transmission latency for the data service, or a transmission rate for the data service during use of the first network access card by the electronic device.

12. The network access card switching method of claim 10, further comprising:
  displaying a video playing interface of a video application;
  transmitting a video service of the video application using the first network access card;
  activating the second network access card; and
  transmitting the video service using the second network access card.

13. The network access card switching method of claim 10, wherein:
  the first network access card is a first subscriber identity module (SIM) card and the second network access card is a second SIM card;
  the first network access card is the first SIM card and the second network access card is a second embedded-SIM (eSIM) card;
  the first network access card is a first eSIM card and the second network access card is the second SIM card; or
  the first network access card is the first eSIM card and the second network access card is the second eSIM card.

14. The network access card switching method of claim 10, wherein the dual-card management function setting interface comprises a first option for the first network access card and a second option for the second network access card, wherein the first network access card is the default mobile data card of the electronic device when the first option is in a selected state, and wherein the second network access card is the default mobile data card of the electronic device when the second option is in the selected state.

15. The network access card switching method of claim 10, wherein the first operation comprises sliding the control or clicking the control.

16. A computer program product comprising computer executable instructions that are stored on a non-transitory computer-readable medium and that, when executed by a processor, cause an electronic device to:
  display a dual-card management function setting interface comprising a control; detect a first operation on the control; enable, in response to the first operation, an automatic network access card switching function; transmit a data service using a first network access card, wherein the first network access card is a default mobile data card of the electronic device; determine that a network state of the first network access card meets a first preset condition; based on the network state of the first network access card meeting the first preset condition: automatically disconnect the data service transmitted using the first network access card; activate a second network access card; and transmit the data service using the second network access card; determining, after activating the second network access card and transmitting the data service using the second network access card, that the network state of the first network access card meets a second preset condition; based on the network state of the first network access card meeting the second preset condition: automatically disconnect the data service transmitted by using the second network access card; activate the first network access card; and transmit the data service using the first network access card; determine, after activating the first network access card and transmitting the data service using the first network access card, that the network state of the first network access card meets the first preset condition; and suspend, in response to the second network access card being in a roaming state, the automatic network access card switching function.

* * * * *

UNITED STATES PATENT AND TRADEMARK OFFICE
CERTIFICATE OF CORRECTION

| | |
|---|---|
| PATENT NO. | : 12,120,772 B2 |
| APPLICATION NO. | : 17/438647 |
| DATED | : October 15, 2024 |
| INVENTOR(S) | : Yuanfeng Li and Bin Huang |

It is certified that error appears in the above-identified patent and that said Letters Patent is hereby corrected as shown below:

On the Title Page

(57) Abstract should read: "A network access card switching method is performed by an electronic device on which a first network access card and a second network access card are installed. The first network access card is a default network access card of the electronic device. The network access card switching method includes determining that a user enables an intelligent network access card switching function, activating the first network access card, transmitting the data service using the first network access card, monitoring a network state of the first network access card in real time, and when determining that the network state of the first network access card meets a first preset condition, disconnecting the data service transmitted using the first network access card, activating the second network access card, and transmitting the data service by using the second network access card."

Signed and Sealed this
Nineteenth Day of November, 2024

Katherine Kelly Vidal
*Director of the United States Patent and Trademark Office*